United States Patent
Miyamoto et al.

(10) Patent No.: US 8,976,154 B2
(45) Date of Patent: Mar. 10, 2015

(54) TOUCH PANEL SYSTEM AND ELECTRONIC DEVICE

(75) Inventors: Masayuki Miyamoto, Osaka (JP); Kunihiko Iizuka, Osaka (JP); Manabu Yumoto, Osaka (JP); Shinichi Yoshida, Osaka (JP); Kengo Takahama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/127,932

(22) PCT Filed: Jun. 4, 2012

(86) PCT No.: PCT/JP2012/064854
§ 371 (c)(1),
(2), (4) Date: Dec. 19, 2013

(87) PCT Pub. No.: WO2012/176638
PCT Pub. Date: Dec. 27, 2012

(65) Prior Publication Data
US 2014/0132541 A1 May 15, 2014

(30) Foreign Application Priority Data

Jun. 22, 2011 (JP) .................................. 2011-138938
Jun. 27, 2011 (JP) .................................. 2011-142164
Jul. 12, 2011 (WO) .................. PCT/JP2011/066288
Apr. 4, 2012 (WO) .................. PCT/JP2012/059823

(51) Int. Cl.
*G06F 3/045* (2006.01)
*G06F 3/041* (2006.01)
*G06F 3/044* (2006.01)

(52) U.S. Cl.
CPC .............. *G06F 3/041* (2013.01); *G06F 3/0418* (2013.01); *G06F 3/044* (2013.01)
USPC .......................................................... 345/174

(58) Field of Classification Search
None
See application file for complete search history.

(56) References Cited

U.S. PATENT DOCUMENTS

| 4,639,720 A | 1/1987 | Rympalski et al. |
| 5,905,489 A | 5/1999 | Takahama et al. |
| 6,730,863 B1 | 5/2004 | Gerpheide et al. |

(Continued)

FOREIGN PATENT DOCUMENTS

| JP | 10-20992 A | 1/1998 |
| JP | 2001-125744 A | 5/2001 |

(Continued)

OTHER PUBLICATIONS

Office Action for U.S. Appl. No. 14/127,455 dated Apr. 17, 2014.
(Continued)

*Primary Examiner* — Jason Olson
(74) *Attorney, Agent, or Firm* — Birch, Stewart, Kolasch & Birch, LLP

(57) ABSTRACT

A touch panel system (71a) includes a capacitance value distribution detection circuit (72). The capacitance value distribution detection circuit (72) switches a connection state between a first connection state and a second connection state, which first connection state makes first signal lines (HL1 to HLM) serve as drive lines (DL1 to DLM) and second signal lines (VL1 to VLM) serve as sense lines (SL1 to SLM), and which second connection state makes the second signal lines (VL1 to VLM) serve as the drive lines (DL1 to DLM) and the first signal lines (HL1 to HLM) serve as the sense lines (SL1 to SLM).

19 Claims, 43 Drawing Sheets

(56) References Cited

U.S. PATENT DOCUMENTS

| | | | |
|---|---|---|---|
| 7,102,364 B2 * | 9/2006 | Umeda et al. | 324/658 |
| 7,812,827 B2 | 10/2010 | Hotelling et al. | |
| 7,812,828 B2 | 10/2010 | Westerman et al. | |
| 8,278,571 B2 | 10/2012 | Orsley | |
| 8,330,733 B2 | 12/2012 | Petschnigg et al. | |
| 8,493,359 B2 | 7/2013 | Wright et al. | |
| 2005/0073324 A1 | 4/2005 | Umeda et al. | |
| 2005/0141263 A1 | 6/2005 | Umeda et al. | |
| 2005/0156912 A1 | 7/2005 | Taylor et al. | |
| 2006/0017709 A1 | 1/2006 | Okano | |
| 2006/0158202 A1 | 7/2006 | Umeda et al. | |
| 2007/0242053 A1 | 10/2007 | Muranaka | |
| 2009/0315858 A1 | 12/2009 | Sato et al. | |
| 2010/0026655 A1 | 2/2010 | Harley | |
| 2010/0060610 A1 | 3/2010 | Wu | |
| 2010/0085322 A1 | 4/2010 | Mamba et al. | |
| 2010/0085324 A1 | 4/2010 | Noguchi et al. | |
| 2010/0085325 A1 | 4/2010 | King-Smith et al. | |
| 2010/0307840 A1 | 12/2010 | Kobayashi et al. | |
| 2010/0309162 A1 | 12/2010 | Nakanishi et al. | |
| 2010/0321331 A1 | 12/2010 | Oda et al. | |
| 2010/0321332 A1 | 12/2010 | Oda et al. | |
| 2010/0321333 A1 | 12/2010 | Oda et al. | |
| 2010/0321334 A1 | 12/2010 | Oda et al. | |
| 2011/0043478 A1 | 2/2011 | Matsushima | |
| 2011/0084918 A1 | 4/2011 | Sung | |
| 2011/0084936 A1 * | 4/2011 | Chang et al. | 345/174 |
| 2011/0102370 A1 | 5/2011 | Kono et al. | |
| 2011/0148785 A1 | 6/2011 | Oda et al. | |
| 2011/0148806 A1 | 6/2011 | Oda et al. | |
| 2011/0153263 A1 | 6/2011 | Oda et al. | |
| 2012/0146929 A1 | 6/2012 | Oyama | |
| 2013/0271426 A1 | 10/2013 | Yumoto et al. | |

FOREIGN PATENT DOCUMENTS

| | | |
|---|---|---|
| JP | 2005-114362 A | 4/2005 |
| JP | 2005-134240 A | 5/2005 |
| JP | 2005-152223 A | 6/2005 |
| JP | 2005-157643 A | 6/2005 |
| JP | 2007-286814 A | 11/2007 |
| JP | 4364609 B2 | 11/2009 |
| JP | 4387773 B2 | 12/2009 |
| JP | 2010-3048 A | 1/2010 |
| JP | 2010-39537 A | 2/2010 |
| JP | 2010-92152 A | 4/2010 |
| JP | 2010-92275 A | 4/2010 |
| JP | 2010-282501 A | 12/2010 |
| JP | 2010-282539 A | 12/2010 |
| JP | 2011-3036 A | 1/2011 |
| JP | 2011-39990 A | 2/2011 |
| JP | 2011-81767 A | 4/2011 |
| JP | 2011-113149 A | 6/2011 |
| JP | 2011-128982 A | 6/2011 |
| JP | 2011-175412 A | 9/2011 |
| JP | 2012-150819 A | 8/2012 |
| TW | 201011620 A1 | 3/2010 |
| WO | WO 2009/107415 A1 | 9/2009 |
| WO | WO 2012/090537 A1 | 7/2012 |

OTHER PUBLICATIONS

Office Action for U.S. Appl. No. 14/128,907 dated May 8, 2014.
Quayle Office Action for U.S. Appl. No. 14/127,391 dated May 14, 2014.
Office Action for U.S. Appl. No. 14/127,455 dated Jul. 31, 2014.
Office Action for U.S. Appl. No. 14/350,510 dated Aug. 18, 2014.
Office Action for U.S. Appl. No. 14/127,455 dated Oct. 9, 2014.
Office Action for U.S. Appl. No. 13/992,204 dated Oct. 10, 2014.

* cited by examiner

|    | S1 | S2 | S3 | S4 | S5 | S6 | S7 |
|----|----|----|----|----|----|----|----|
| D1 | 0  | +  | −  | 0  | 0  | 0  | 0  |
| D2 | 0  | 0  | 0  | +  | 0  | −  | 0  |
| D3 | 0  | 0  | +  | −  | 0  | 0  | 0  |
| D4 | −  | 0  | 0  | 0  | +  | +  | 0  |
| D5 | 0  | −  | 0  | 0  | 0  | +  | 0  |

(b)

|    | S1 | S2 | S3 | S4 | S5 | S6 | S7 |
|----|----|----|----|----|----|----|----|
| D1 | 0  | 1  | 1  | 0  | 0  | 0  | 0  |
| D2 | 0  | 0  | 0  | 1  | 1  | 1  | 0  |
| D3 | 0  | 0  | 1  | 1  | 0  | 0  | 0  |
| D4 | 1  | 0  | 0  | 0  | 1  | 1  | 1  |
| D5 | 1  | 1  | 0  | 0  | 0  | 1  | 1  |

(c)

|    | S1 | S2 | S3 | S4 | S5 | S6 | S7 |
|----|----|----|----|----|----|----|----|
| D1 | 0  | 1  | 1  | 0  | 0  | 0  | 0  |
| D2 | 0  | 0  | 0  | 1  | 1  | 1  | 0  |
| D3 | 0  | 0  | 1  | 1  | 0  | 0  | 0  |
| D4 | 1  | 0  | 0  | 0  | 1  | 1  | 1  |
| D5 | 1  | 1  | 0  | 0  | 0  | 1  | 1  |

TOUCH PANEL SYSTEM AND ELECTRONIC DEVICE

TECHNICAL FIELD

The present invention relates to a touch panel system and an electronic device including the touch panel system. Particularly, the present invention relates to a touch panel system and an electronic device each of which is capable of reliably and effectively removing (canceling) a noise generated by a display device, etc.

BACKGROUND ART

Recently, introduction of touch panel systems to various kinds of electronic devices has been growing rapidly. For example, the touch panel systems are introduced to portable information devices such as smartphones and automatic vending machines such as automatic ticket machines.

The touch panel system is typically configured to include (i) a display device and (ii) a touch panel stacked on an upper side (front surface) of the display device. Therefore, a sensor provided on the touch panel is likely to be affected not only by a noise such as a clock generated in the display device but also by other noises coming from the outside. Such the noises lead to impairment in detection sensitivity for a touch operation.

Patent Literature 1 describes a touch panel system (coordinates input device) including a countermeasure against such noises. The touch panel system of Patent Literature 1 includes a noise processing section for removing a noise. FIG. 19 is a block diagram illustrating a noise processing section 100 included in the touch panel system of Patent Literature 1. As shown in FIG. 19, the noise processing section 100 includes a filter section 101, a logical inversion section 102, and an adding section 103. The filter section 101 receives an output signal (analog signal) from a sensor provided in a touch panel (not illustrated). The filter section 101 extracts, as a noise signal, an AC signal component included in the input signal. The logical inversion section 102 inverts by 180° the phase of the noise signal thus extracted. The adding section 103 adds, to the input signal which is supplied to the filter section 101 and which includes the noise signal, the noise signal whose phase has been inverted by 180°.

Thus, according to the touch panel system of Patent Literature 1, the noise signal extracted by the filter section 101 is inverted, and the signal thus inverted is added to the input signal (analog signal) supplied from the sensor. Namely, to the noise component included in the input signal supplied from the sensor, such a signal is added which has the same level as the noise component and whose phase has been inverted. This cancels the noise superimposed on the input signal supplied from the sensor. This makes it possible to reduce effects given by the noise included in the input signal supplied from the sensor.

Meanwhile, Patent Literature 2 discloses a capacitance value distribution detection circuit that detects a distribution of capacitance values of a plurality of capacitances, which capacitances are each formed at intersections of a plurality of first signal lines with a plurality of second signal lines. As shown in FIG. 1 of Patent Literature 2, a positional relationship of (i) drive lines for driving the touch panel with (ii) sense lines for reading out signals from the touch panel is fixed with respect to the touch panel.

FIG. 41 is a block diagram illustrating a configuration of a conventional touch panel system 91. FIG. 42 is a schematic view illustrating a configuration of a touch panel 93 provided in the touch panel system 91. The touch panel system 91 includes the touch panel 93 and a capacitance value distribution detection circuit 92. The touch panel 93 includes drive lines HL1 to HLM arranged parallel to each other in a horizontal direction, sense lines VL1 to VLM arranged parallel to each other in a vertical direction, and capacitances C11 to CMM each formed at intersections of the drive lines HL1 to HLM with the sense lines VL1 to VLM.

The capacitance value distribution detection circuit 92 includes a driver 95. The driver 95 applies a voltage to the drive lines HL1 to HLM in accordance with a code sequence, to drive the capacitances C11 to CMM. The capacitance value distribution detection circuit 92 includes a sense amplifier 96. The sense amplifier 96 reads out, via the sense lines VL1 to VLM, a linear sum of voltages corresponding to the capacitances C11 to CMM driven by the driver 95, and supplies this linear sum of voltages to an A/D converter 98. The A/D converter 98 converts, from analog to digital, the linear sum of voltages corresponding to the capacitances, read out via the sense lines VL1 to VLM, and supplies the converted linear sum to a capacitance value distribution calculation section 99.

The capacitance value distribution calculation section 99 calculates a capacitance value distribution on the touch panel 93 based on (i) the linear sum of voltages corresponding to the capacitances, supplied from the A/D converter 98, and (ii) the code sequence, and supplies the calculation result to a touch recognition section 90. The touch recognition section 90 recognizes a position touched on the touch panel 93 based on the capacitance value distribution supplied from the capacitance value distribution calculation section 99.

The capacitance value distribution detection circuit 92 includes a timing generator 97. The timing generator 97 generates a signal specifying an operation of the driver 95, a signal specifying an operation of the sense amplifier 96, and a signal specifying an operation of the A/D converter 98, and supplies these signals to the driver 95, the sense amplifier 96, and the A/D converter 98, respectively.

CITATION LIST

Patent Literature

Patent Literature 1
Japanese Patent Application Publication, Tokukai, No. 2001-125744 A (Publication Date: May 11, 2001)
Patent Literature 2
U.S. Pat. No. 7,812,827 (Oct. 12, 2010)

SUMMARY OF INVENTION

Technical Problem

However, the touch panel system of Patent Literature 1 has a problem of being incapable of removing noises other than an AC signal component.

Specifically, as described above, with respect to an input signal supplied from the sensor, the touch panel system of Patent Literature 1 regards as a noise an AC signal component included in the input signal. The filter section 101 extracts the AC signal, and thereafter the logical inversion section 102 inverts the phase of the AC signal by 180°. Further, the adding section 103 adds the inverted signal to the input signal which includes the AC signal component. Thus, for the noise processing according to Patent Literature 1, the process performed by the filter section 101 for extracting the AC signal component is the most important.

However, Patent Literature 1 fails to disclose details of the configuration of the filter section 101. Therefore, it is unknown how much noise the touch panel system of Patent Literature 1 can remove. Furthermore, Patent Literature 1 regards as a noise an AC signal component included in an analog signal. Namely, the touch panel system of Patent Literature 1 basically assumes removal of an impulse noise only, and does not assume, as the subject of removal, noises other than the impulse noise. Therefore, the touch panel system of Patent Literature 1 cannot reliably cancel a wide variety of noises other than the impulse noise.

Moreover, the following description considers a case in which entry is received via a touch panel 93 of a touch panel system 91 with an electrically conductive pen. FIG. 43 is a view describing phantom noise generated in the touch panel system 91. It is preferable that a tip of the electrically conductive pen is sharp having a diameter of around 1 mm to 4 mm, for preventing deterioration in the sense of use. Moreover, for easy writing, it is preferable that the pen can be used in a state in which a palm of the hand is placed on a large-sized touch panel.

In the present specification, a region in which a hand holding the electrically conductive pen for input is placed on the touch panel is called a "hand placing region".

By fabricating the capacitance value distribution detection circuit 92 so that a signal read out from a capacitance disposed in the hand placing region HDR (illustrated in FIG. 43) via a sense line is not received, it should be possible to input an entry with a pen at a pen input position P in a state in which the hand holding the electrically conductive pen for input is placed on the touch panel.

In the foregoing setting, a touch signal of a pen tip of the electrically conductive pen for input is extremely weaker than a touch signal of the hand placed on the touch panel, which hand holds the electrically conductive pen for input, and has a difference in SN ratio of around 10-fold to 20-fold.

Furthermore, a human body receives electromagnetic noise that exists in space, and this electromagnetic noise received by the human body from the space is inputted into the touch panel through the hand holding the electrically conductive pen for input. The electromagnetic noise inputted into the touch panel is superposed on a signal flowing through a sense line provided on which the hand holding the electrically conductive pen for input is placed. This causes generation of an error signal in a position of a sense line on which no hand is placed, as illustrated in FIG. 43 as the phantom noise NZ. As a result, a problem arises that it becomes difficult to detect the signal of the pen.

Moreover, not only limited to the input with use of a pen, there also is a problem with a smartphone when using a software keyboard (application) that if the electromagnetic noise received by the body of the user is great, the phantom noise generates on the sense line that the finger or the like of the user touches, thereby causing a key of the software keyboard that is not pressed to react.

In the present specification, error signals generated as such is called "phantom noise", where electromagnetic noise received by the human body from space is inputted into the touch panel via hands, fingers, or the like and is superposed on a signal flowing in the sense line that is touched by the hand, fingers, or the like. For example, as illustrated in FIG. 43, the phantom noise NZ generates in an area between circumscribing lines L1 and L2 which circumscribe the hand placing region HDR along the sense lines SL1 to SLM and which is outside the hand placing region HDR.

The present invention was made in view of the foregoing problem of the conventional technique, and an object of the present invention is to provide a touch panel system and an electronic device each of which is capable of reliably removing a wide variety of noises.

Another object of the present invention to provide a touch panel system and an electronic device, each of which enables eliminating an effect caused by phantom noise generated by touching a panel with a hand, finger and the like of the human body that has received electromagnetic noise.

Solution to Problem

In order to attain the foregoing object, a touch panel system of the present invention includes: a touch panel;
a touch panel controller for processing a signal supplied from the touch panel;
a capacitance value distribution detection circuit for detecting a distribution of capacitance values of a plurality of capacitances that are each formed on intersections of a plurality of first signal lines with a plurality of second signal lines; and
a drive line driving circuit for driving the first signal lines or the second signal lines as drive lines,
the touch panel including (i) the plurality of first signal lines, (ii) the plurality of second signal lines, (iii) the plurality of capacitances, (iv) a main sensor section for detecting a touch operation performed with respect to the touch panel and (v) a sub sensor section provided in a surface of the touch panel in which surface the main sensor section is provided,
the touch panel controller including a subtracting section for (i) receiving a signal supplied from the main sensor section and a signal supplied from the sub sensor section and (ii) subtracting, from the signal supplied from the main sensor section, the signal supplied from the sub sensor section,
the main sensor section being provided with a plurality of sense lines,
the sub sensor section being provided with a sub sense line extending along a direction in which the sense lines extend,
the capacitance value distribution detection circuit switching a connection state between a first connection state and a second connection state, the first connection state being a state in which the first signal lines are driven to make the first signal lines serve as the drive lines and the second signal lines are made to output electric charges corresponding to the capacitances to make the second signal lines serve as the sense lines and the sub sense line, and the second connection state being a state in which the second signal lines are driven to make the second signal lines serve as the drive lines, and the first signal lines are made to output the electric charges corresponding to the capacitances to make the first signal lines serve as the sense lines and the sub sense line,
the subtracting section, during the first connection state and the second connection state, finding a first difference which is expressed by (Sn+1)−Sn, the first difference corresponding to a difference between (i) a signal of a sense line Sn which is selected from the plurality of sense lines and (ii) a signal of a sense line Sn+1, which is one of two sense lines adjacent to the sense line Sn, the two sense lines being the sense line Sn+1 and a sense line Sn−1 each of which is included in the plurality of sense lines,
the subtracting section finding a second difference which is expressed by Sn−(Sn−1), the second difference corresponding to a difference between (i) the signal of the sense line Sn and (ii) a signal of the sense line Sn−1, which is the other one of the two sense lines,
the subtracting section finding a third difference, the third difference corresponding to a difference between (i) a signal of the sub sense line and (ii) a signal of a sense line adjacent to the sub sense line which sense line is included in the plurality of sense lines, and the touch panel controller including an adding section for adding up the first difference, the second difference, and the third difference.

According to the above configuration, the main sensor section and the sub sensor section are provided in (on) the same surface of the touch panel. This allows both of (i) an output signal supplied from the main sensor section and (ii) an output signal supplied from the sub sensor section to include various kinds of noise signals reflected in the touch panel. Furthermore, the subtracting section finds a difference between (i) the output signal supplied from the main sensor section which signal includes a signal derived from the touch operation and the noise signals and (ii) the output signal supplied from the sub sensor section which signal includes the noise signals. This removes the noise components from the output signal supplied from the main sensor section, thereby extracting the signal derived from the touch operation itself. This makes it possible to reliably remove (cancel) a wide variety of noises reflected in the touch panel.

Furthermore, the capacitance value distribution detection circuit switches between a first connection state and a second connection, which first connection state has the first signal lines serve as the drive lines and the second signal lines serve as the sense lines and the sub sense line, and which second connection state has the second signal lines serve as the drive lines and the first signal lines serve as the sense lines and the sub sense line. This allows for outputting the electric charges corresponding to the capacitances from both the first signal lines and the second signal lines. As a result, it is possible to eliminate the effect caused by electromagnetic noise that is inputted into the touch panel via the hands, fingers and the like and is superposed on the signal of a sense line.

Moreover, according to the configuration, during the first connection state and the second connection state, the subtracting section obtains a difference signal value between adjacent sense lines. Namely, a difference between adjacent sense lines, which have a higher correlation with noise is obtained. Furthermore, signals (noise signals) from the sub sense line is being eliminated from the output signals of the sense lines. Thus, it is possible to more securely eliminate noise.

In order to attain the foregoing object, another touch panel system of the present invention includes: a touch panel;

a touch panel controller for processing a signal supplied from the touch panel;

a capacitance value distribution detection circuit for detecting a distribution of capacitance values of a plurality of capacitances that are each formed on intersections of a plurality of first signal lines with a plurality of second signal lines; and a drive line driving circuit for driving the first signal lines or the second signal lines as drive lines, the touch panel including (i) the plurality of first signal lines, (ii) the plurality of second signal lines, (iii) the plurality of capacitances, and (iv) a sensor section for detecting a touch operation performed with respect to the touch panel, the touch panel controller including a subtracting section for (i) receiving signals from the sensor section and (ii) finding differences in signal between, among the sense lines, respective pairs of sense lines adjacent to each other, the drive line driving circuit driving the drive lines in parallel, the capacitance value distribution detection circuit switching a connection state between a first connection state and a second connection state, the first connection state being a state in which the first signal lines are driven to make the first signal lines serve as the drive lines and the second signal lines are made to output electric charges corresponding to the capacitances to make the second signal lines serve as the sense lines and the sub sense line, and the second connection state being a state in which the second signal lines are driven to make the second signal lines serve as the drive lines, and the first signal lines are made to output the electric charges corresponding to the capacitances to make the first signal lines serve as the sense lines and the sub sense lines, the subtracting section, during the first connection state and the second connection state, receiving output signals from the sense lines, and finding differences between the capacitances on each of the drive lines in a direction in which the each of the drive lines extends, the differences being found as the differences in signal between the respective pairs of the sense lines adjacent to each other, the touch panel system further including:

a decoding section for decoding the values of the differences between the capacitances, which differences are found by the subtracting section, the decoding being carried out in such a manner that an inner product of each of code sequences for driving the drive lines in parallel and each of difference output sequences of the sense lines, which difference output sequences correspond to the code sequences, is calculated; and a switch for switching a signal to be supplied to the subtracting section so that the subtracting section finds a first difference which is expressed by $(S_{n+1})-S_n$ or a second difference which is expressed by $S_n-(S_{n-1})$, the first difference corresponding to a difference between (i) a signal of a sense line $S_n$ which is selected from the plurality of sense lines and (ii) a signal of a sense line $S_{n+1}$, which is one of two sense lines adjacent to the sense line $S_n$, the two sense lines being the sense line $S_{n+1}$ and a sense line $S_{n-1}$ each of which is included in the plurality of sense lines, the second difference corresponding to a difference between (i) the signal of the sense line $S_n$ and (ii) a signal of the sense line $S_{n-1}$, which is the other one of the two sense lines.

In order to attain the foregoing object, another touch panel system of the present invention includes: a touch panel;

a touch panel controller for processing a signal supplied from the touch panel;

a capacitance value distribution detection circuit for detecting a distribution of capacitance values of a plurality of capacitances that are each formed on intersections of a plurality of first signal lines with a plurality of second signal lines; and a drive line driving circuit for driving the first signal lines or the second signal lines as drive lines, the touch panel including (i) the plurality of first signal lines, (ii) the plurality of second signal lines, (iii) the plurality of capacitances, and (iv) a sensor section for detecting a touch operation performed with respect to the touch panel, the touch panel controller including a subtracting section for (i) receiving signals from the sensor section and (ii) finding differences in signal between, among the sense lines, respective pairs of sense lines adjacent to each other, the drive line driving circuit driving the drive lines in parallel, the capacitance value distribution detection circuit switching a connection state between a first connection state and a second connection state, the first connection state being a state in which the first signal lines are driven to make the first signal lines serve as the drive lines and the second signal lines are made to output electric charges corresponding to the capacitances to have the second signal lines serve as the sense lines and the sub sense lines, and the second connection state being a state in which the second signal lines are driven to make the second signal lines serve as the drive lines, and the first signal lines are made to output the electric charges corresponding to the capacitances to make the first signal lines serve as the sense lines and the sub sense lines, the subtracting section, during the first connection state and the second connection state, receiving output signals from the sense lines, and finding differences between the capacitances on each of the drive lines in a direction in which the each of the drive lines extends, the differences being found as the differences in signal between the respective pairs of the sense lines adjacent to each other, the touch panel system further including:

a decoding section for decoding the values of the differences between the capacitances, which differences are found by the subtracting section, the decoding being carried out in such a manner that an inner product of each of code sequences for driving the drive lines in parallel and each of difference output sequences of the sense lines, which difference output sequences correspond to the code sequences, is calculated.

According to each of the above configurations, the subtracting section obtains difference in signal values between the respective pairs of the sense lines adjacent to each other. Namely, each difference is found between the adjacent sense lines, which have a higher correlation in terms of noise. This removes a noise component from the output signal supplied from the main sensor, thereby extracting a signal derived from the touch operation itself. This makes it possible to reliably remove (cancel) a wide variety of noises reflected in the touch panel.

Furthermore, the capacitance value distribution detection circuit switches between a first connection state and a second connection, which first connection state has the first signal lines serve as the drive lines and the second signal lines serve as the sense lines and the sub sense line, and which second connection state has the second signal lines serve as the drive lines and the first signal lines serve as the sense lines and the sub sense line. This allows for outputting the electric charges corresponding to the capacitances from both the first signal lines and the second signal lines. As a result, it is possible to eliminate the effect caused by electromagnetic noise that is inputted into the touch panel via the hands, fingers and the like and is superposed on the signal of a sense line.

Moreover, according to each of the foregoing configurations, the touch panel is driven in parallel, and the decoding section decodes a difference value of the capacitance value calculated by the subtracting section. This makes the signal of the capacitance be found multiplied by a code length (multiplied by N), thereby increasing the signal intensity of the capacitance, without depending on the number of drive lines. Moreover, if the signal intensity is sufficient as being similar to the conventional method, it is possible to reduce the number of times the drive line is driven, thereby allowing for low electricity consumption.

In order to attain the foregoing object, an electronic device of the present invention includes a touch panel system of the present invention.

Accordingly, it is possible to provide an electronic device capable of reliably removing (canceling) a wide variety of noises reflected in a touch panel. Furthermore, this allows for outputting the electric charges that correspond to the capacitances from both the first signal lines and the second signal lines. As a result, it is possible to provide an electronic device that is capable of eliminating the effect caused by electromagnetic noise that is inputted into the touch panel via the hands, fingers and the like and is superposed on the signal of the sense line.

Advantageous Effects of Invention

As described above, a touch panel system of the present invention is configured so that the capacitance value distribution detection circuit switches a connection state between a first connection state and a second connection state, the first connection state being a state in which the first signal lines are driven to make the first signal lines serve as the drive lines and the second signal lines are made to output electric charges corresponding to the capacitances to make the second signal lines serve as the sense lines and the sub sense lines, and the second connection state being a state in which the second signal lines are driven to make the second signal lines serve as the drive lines, and the first signal lines are made to output the electric charges corresponding to the capacitances to make the first signal lines serve as the sense lines and the sub sense lines. Accordingly, the present invention provides an effect of reliably removing (canceling) a wide variety of noises reflected in a touch panel. Furthermore, the present invention provides an effect of eliminating the effect caused by electromagnetic noise that is inputted into the touch panel via the hands, fingers and the like and is superposed on the signal of the sense line

BRIEF DESCRIPTION OF DRAWINGS

FIG. 28 is a view schematically illustrating a method of recognizing touch information in the flow chart shown in FIG. 27.

DESCRIPTION OF EMBODIMENTS

The following will describe embodiments of the present invention with reference to drawings.

Embodiment 1

(1) Configuration of Touch Panel System 1

Figure 1:
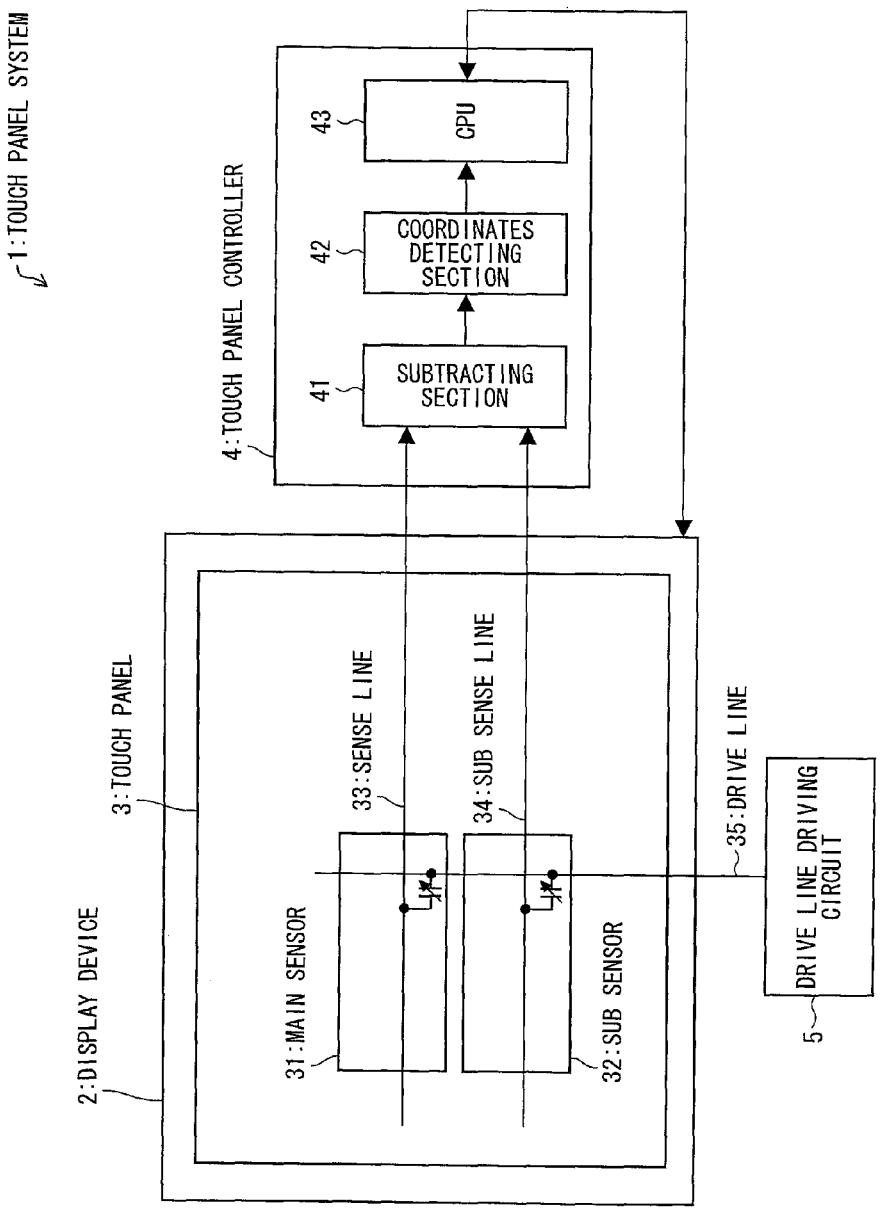
FIG. 1 is a view schematically illustrating a basic configuration of a touch panel system according to the present invention.

FIG. 1 is a view schematically illustrating a basic configuration of a touch panel system 1 according to one embodiment of the present invention. The touch panel system 1 includes a display device 2, a touch panel 3, a touch panel controller 4, and a drive line driving circuit 5. Further, the touch panel system 1 has a noise canceling function. In the descriptions below, a side used by a user is referred to as a "front surface" (or an "upper side").

The display device 2 includes a display screen (display section), which is not illustrated in FIG. 1. The display screen displays, e.g., various kinds of icons for operation and text information corresponding to operation instructions for the user. The display device 2 is made of, e.g., a liquid crystal display, a plasma display, an organic EL display, or a field emission display (FED). These displays are used in many generally-used electronic devices. Therefore, making the display device 2 of such the display provides a touch panel system 1 having a great versatility. The display device 2 may have any configuration, and is not limited to any particular configuration.

The touch panel 3 is configured to allow the user to perform a touch (press) operation on a surface of the touch panel 3 by his/her finger, a stylus, or the like so as to enter various kinds of operation instructions. The touch panel 3 is stacked on a front surface (upper side) of the display device 2 so as to cover the display screen.

The touch panel 3 includes two sensors (one main sensor 31 and one sub sensor 32) which are provided on (in) the same surface. The main sensor 31 and the sub sensor 32 are provided so as to be adjacent to each other. Each of the main sensor 31 and the sub sensor 32 is a capacitive type sensor. The touch panel 3, which is provided with the capacitive type sensors, has an advantage of having high transmittance and having durability.

The main sensor (main sensor section) 31 is provided in a region (touched region) of the touch panel 3 in which region a touch operation is performed. The main sensor 31 detects a touch operation that the user performs with respect to the touch panel 3. The touch operation is, for example, double-click, sliding, single-click, or dragging. The main sensor 31 is provided with a sense line 33 which is made of a linear electrode. The sense line 33 has an end which is connected with the touch panel controller 4. With this, a signal detected by the main sensor 31 is outputted to the touch panel controller 4 via the sense line 33. Namely, a signal corresponding to a touch operation detected by the main sensor 31 is outputted to the touch panel controller 4.

The sub sensor (sub sensor section) 32 detects a noise component reflected in the touch panel 3. The sub sensor 32 is provided in a region (non-touched region) of the touch panel 3 in which region no touch operation is performed. Therefore, the sub sensor 32 is not touched by the user in a touch operation, and the sub sensor 32 detects various kinds of noises generated in the touch panel system 1. Thus, unlike the main sensor 31, the sub sensor 32 does not detect a signal corresponding to a touch operation. Namely, the sub sensor 32 is configured not to be touched by the user in a touch operation and to detect a noise generated in the touch panel 3.

The sub sensor 32 is provided with a sub sense line 34 which is made of a linear electrode. The sub sense line 34 is provided so as to extend in parallel with the sense line 33 (i.e., to extend along a direction in which the sense line 33 extends). The sub sense line 34 has an end which is connected with the touch panel controller 4. With this, a signal detected by the sub sensor 32 is outputted to the touch panel controller 4 via the sub sense line 34.

Meanwhile, the touch panel 3 includes a drive line 35 provided so as to intersect the sense line 33 and the sub sense line 34 at right angles. The drive line 35 is made of a linear electrode. A capacitance is formed in an intersection of the sense line 33 or the sub sense line 34 and the drive line 35. Namely, a capacitance is formed in an intersection of the sense line 33 and the drive line 35, and another capacitance is formed in an intersection of the sub sense line 34 and the drive line 35. The drive line 35 is connected with the drive line driving circuit (sensor driving section) 5. Upon activation of the touch panel system 1, the drive line 35 is supplied with an electric potential at a certain interval.

Each of the sense line 33, the sub sense line 34, and the drive line 35 can be made of, e.g., a transparent wire material such as ITO (Indium Tin Oxide). In other words, each of the sense line 33, the sub sense line 34, and the drive line 35 is a sensor electrode in the touch panel 3.

Note that the drive line 35 is provided on a transparent substrate or a transparent film (not illustrated). Further, the drive line 35 is covered with an insulative layer (not illustrated). On the insulative layer, the sense line 33 and the sub sense line 34 are provided. Thus, the sense line 33 or the sub sense line 34 and the drive line 35 are isolated from each other via the insulative layer, and the sense line 33 or the sub sense line 34 and the drive line 35 are coupled to each other via the capacitance. The sense line 33 and the sub sense line 34 are covered with a protective layer (not illustrated). Namely, in the touch panel 3, the protective layer is positioned so as to be the closest to the front surface side (the user's side).

The touch panel controller 4 reads signals (data) supplied from the main sensor 31 and the sub sensor 32 of the touch panel 3. Since the touch panel system 1 includes the capacitive type sensors, the touch panel controller 4 detects a capacitance generated in the touch panel 3. Concretely, the touch panel controller 4 detects (i) a change in the capacitance between the sense line 33 and the drive line 35 and (ii) a change in the capacitance between the sub sense line 34 and the drive line 35. The touch panel controller 4 includes a subtracting section 41, a coordinates detecting section 42, and a CPU 43.

The subtracting section 41 includes (i) an input terminal (i.e., an input terminal for a main sensor output) for receiving a signal outputted by the main sensor 31 and (ii) an input terminal (i.e., an input terminal for a sub sensor output) for receiving a signal outputted by the sub sensor 32. The subtracting section 41 subtracts (i) the signal supplied to the input terminal for the sub sensor output from (ii) the signal supplied to the input terminal for the main sensor output. The signal obtained as a result of the subtracting operation by the subtracting section 41 is outputted to the coordinates detecting section 42. Note that the signal supplied to the subtracting section 41 may be either of a digital signal and an analog signal. Namely, the input signal supplied to the subtracting section 41 may be any signal, as long as it suits with the configuration of the subtracting section 41.

According to the signal obtained as a result of the subtracting operation by the subtracting section 41, the coordinates detecting section 42 detects information indicative of the presence or absence of a touch operation. For example, if a value of the output signal supplied from the subtracting section 41 is equal to or greater than a predetermined threshold value, the coordinates detecting section 42 outputs, to the CPU 43, a signal indicative of the presence of a touch operation. Note that the touch panel system 1 includes a single main sensor 31; therefore, the coordinates detecting section 42 detects information indicative of the presence or absence of a touch operation. Meanwhile, if a touch panel system 1 is configured to include a plurality of main sensors 31, a coordinates detecting section 42 determines, in addition to the presence or absence of a touch operation, coordinates values indicative of a position touched by the user.

The CPU 43 obtains, at a certain interval, information outputted by the coordinates detecting section 42. Further, according to the information thus obtained, the CPU 43 performs an operation such as output of the information to the display device 2.

The drive line driving circuit 5 is connected with the drive line 35. Upon activation of the touch panel system 1, the drive line driving circuit 5 applies an electric potential to the drive line 35 at a certain interval.

(2) Noise Processing Performed by Touch Panel System 1

The touch panel system 1 determines, according to a change in the capacitance which change is detected by the touch panel controller 4, the presence or absence of a touch operation. However, since the touch panel 3 is bonded to the front surface (the user's side) of the display device 2, the touch panel system 1 is likely to be affected not only by a noise such as a clock generated in the display device 2 but also by other noises coming from the outside. This leads to impairment in detection sensitivity for a touch operation (i.e., detection sensitivity of the coordinates detecting section 42).

Figure 2:
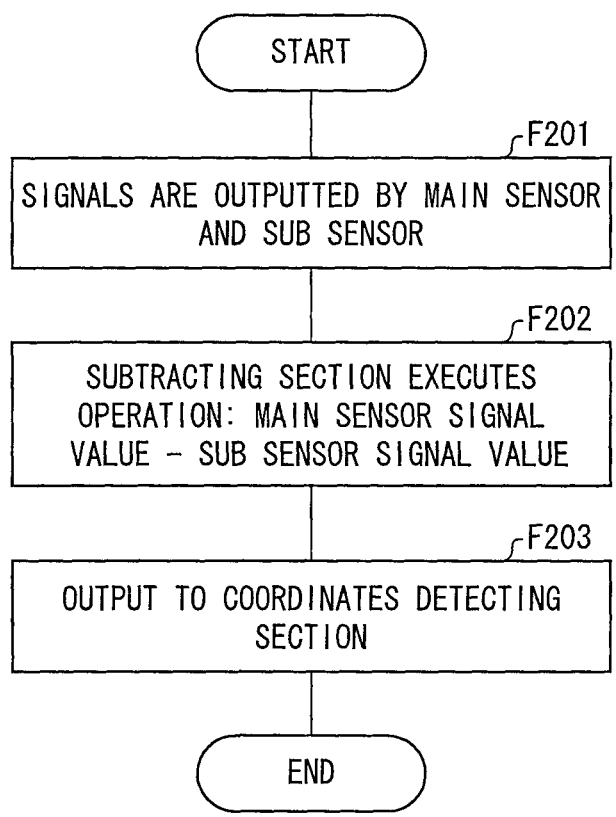
FIG. 2 is a flow chart illustrating a basic process of the touch panel system shown in FIG. 1.

In order to address this, as a measure for removing such the noises, the touch panel system 1 includes the sub sensor 32 and the subtracting section 41. With reference to FIG. 2, a noise canceling process of the touch panel system 1 will be described. FIG. 2 is a flow chart illustrating a noise canceling process, which is a basic process of the touch panel system 1.

Upon activation of the touch panel system 1, the drive line driving circuit 5 applies an electric potential to the drive line 35 at a certain interval. When the user performs a touch operation on the touch panel 3, both of the main sensor 31 and the sub sensor 32 output signals to the subtracting section 41.

Here, (i) a noise such as a clock generated in the display device 2 and (ii) other noises coming from the outside are reflected in the touch panel 3. Therefore, various kinds of noise components are detected by the main sensor 31 and the sub sensor 32. Namely, the output signal supplied from the main sensor 31 includes not only a signal derived from the touch operation itself but also a noise signal (noise component). Meanwhile, since the sub sensor 32 is configured not to detect any touch operation, the output signal supplied from the sub sensor 32 includes a noise signal (noise component), but does not include a signal derived from the touch operation (F201).

In the touch panel system 1, the main sensor 31 and the sub sensor 32 are provided in the same surface so as to be adjacent to each other. Therefore, (i) a value of the noise signal included in the output signal supplied from the main sensor 31 and (ii) a value of the noise signal included in the output signal supplied from the sub sensor 32 can be regarded as being basically the same. In view of this, the subtracting section 41 included in the touch panel controller 4 executes an operation for subtracting (i) the input signal (signal value) supplied from the sub sensor 32 from (ii) the input signal (signal value) supplied from the main sensor 31 (F202). Namely, the subtracting section 41 finds a difference between the sense line 33 and the sub sense line 34. This removes the noise signal from the output signal supplied from the main sensor 31. This provides the signal value derived from the touch operation itself, which signal value is generated in response to the touch operation.

The signal thus obtained by the subtracting operation (the signal derived from the touch operation itself) is outputted to the coordinates detecting section 42 included in the touch panel controller 4 (F203). Namely, the signal derived from the touch operation itself is outputted to the coordinates detecting section 42. According to the signal derived from the touch operation itself, the coordinates detecting section 42 determines the presence or absence of a touch operation. With this configuration, it is possible to prevent impairment in detection sensitivity of the coordinates detecting section 42 (e.g., detection sensitivity as to the presence or absence of a touch operation).

Thus, according to the touch panel system 1, the subtracting section 41 finds a difference between the sense line 33 and the sub sense line 34, so as to cancel, from an input signal which is supplied from the sense line 33 and includes a wide variety of noise components, the noise components. Namely, the subtracting section 41 cancels a noise signal from an input signal supplied from the sense line 33, so as to extract a signal derived from a touch operation itself. Thus, it is possible to provide the touch panel system 1 capable of reliably canceling a wide variety of noises.

Figure 3:
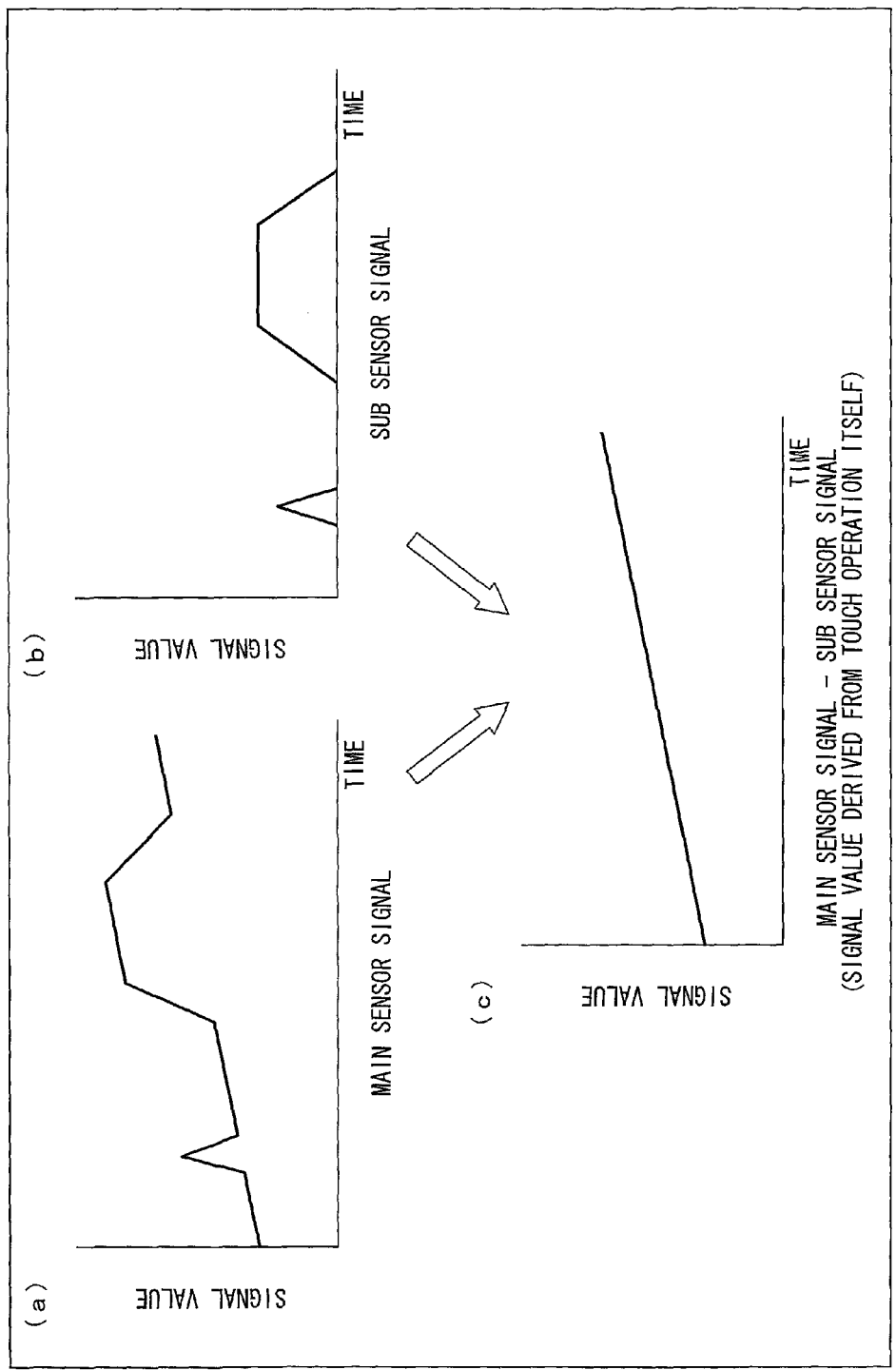
FIG. 3 is a view illustrating waveforms of respective signals which are to be processed by a subtracting section in the touch panel system shown in FIG. 1.

The noise canceling process of the touch panel system 1 is visually illustrated in FIG. 3. FIG. 3 is a view illustrating waveforms of respective signals which are to be processed by the subtracting section 41 in the touch panel system 1. (a) of FIG. 3 shows an output signal supplied from the main sensor 31, (b) of FIG. 3 shows an output signal supplied from the sub sensor 32, and (c) of FIG. 3 is a signal processed by the subtracting section 41. Each signal shown in FIG. 3 is a signal generated in response to a touch operation performed by the user.

The touch panel system 1 is configured such that the user's performing a touch operation increases the capacitance of the main sensor 31 which detects a touch operation ((a) of FIG. 3). Namely, the user's performing a touch operation increases a value of an output signal supplied from the main sensor 31 (the sense line 33). However, the output signal supplied from the main sensor 31 in response to the touch operation includes not only (i) a signal derived from the touch operation itself but also (ii) various kinds of noise signals (e.g., a noise such as a clock generated in the display device 2 and/or a noise coming from the outside).

Meanwhile, since the sub sensor 32 does not detect a touch operation, the capacitance of the sub sensor 32 (the sub sense line) is not increased by the touch operation. Namely, an output signal supplied from the sub sensor 32 does not include a signal derived from the touch operation, but includes a noise component reflected in the touch panel 3 ((b) of FIG. 3).

The subtracting section 41 subtracts (i) the output signal supplied from the sub sensor 32 from (ii) the output signal supplied from the main sensor 31 (i.e., the signal value of (a) of FIG. 3—the signal value of (b) of FIG. 3). As shown in (c) of FIG. 3, this subtracting operation removes (i) the noise component outputted by the sub sensor 32 from (ii) the output signal supplied from the main sensor 31. This provides the signal derived from the touch operation itself, which signal is generated in response to the touch operation. Furthermore, since the coordinates detecting section 42 is supplied with the signal derived from the touch operation itself, detection accuracy for a touch operation is not impaired.

As described above, according to the touch panel system 1 of the present embodiment, the main sensor 31 and the sub sensor 32 are provided in (on) the same surface of the touch panel 3. Consequently, each of (i) an output signal supplied from the main sensor 31 and (ii) an output signal supplied from the sub sensor 32 includes various kinds of noise signals reflected in the touch panel 3. Furthermore, the subtracting section 41 finds a difference between (i) the output signal supplied from the main sensor 31 which signal includes a signal derived from a touch operation and a noise signal and (ii) the output signal supplied from the sub sensor 32 which signal includes a noise signal. This removes the noise component from the output signal supplied from the main sensor 31, thereby extracting the signal derived from the touch operation itself. Therefore, it is possible to reliably remove (cancel) a wide variety of noises reflected in the touch panel 3.

Note that, according to the touch panel system of Patent Literature 1, a noise component which is the subject of removal is an AC signal component included in a signal which includes noise components. On the other hand, according to the touch panel system 1, each of (i) an output signal supplied from the main sensor 31 and (ii) an output signal supplied from the sub sensor 32 includes various kinds of noise components. Therefore, according to the touch panel system 1, a noise component which is the subject of removal is not limited to an AC signal component. Thus, the touch panel system 1 can cancel all noises reflected in the touch panel 3.

In the touch panel system 1, the sub sensor 32 only needs to be provided in a surface of the touch panel 3 in which surface the main sensor 31 is also provided. With this configuration, both of the main sensor 31 and the sub sensor 32 can detect a noise component (noise signal) reflected in the touch panel 3. Note that the sub sensor 32 is preferably configured not to detect a touch operation performed on the touch panel 3. With this configuration, the sub sensor 32 does not detect a signal derived from a touch operation; therefore, an output signal supplied from the sub sensor 32 does not include the signal derived from the touch operation. This prevents a case where the signal value derived from the touch operation is reduced by the subtracting operation performed by the subtracting section 41. Namely, the noise component is removed without reducing the signal derived from the touch operation which signal is detected by the main sensor 31. Therefore, it is possible to further enhance detection sensitivity for a touch operation.

The touch panel system 1 is configured such that the sub sensor 32 is provided in the region (non-touched region) of the touch panel 3 in which region no touch operation is performed by the user. In such a configuration, a signal derived from a touch operation is not detected by the sub sensor 32. Therefore, on the sub sensor 32, the user would not perform a touch operation. Accordingly, although the sub sensor 32 detects a noise reflected in the touch panel, the sub sensor 32 does not detect the signal derived from the touch operation. Thus, it is possible to reliably prevent the sub sensor 32 from detecting a touch operation.

In order that the sub sensor 32 detects a noise component, the sub sensor 32 is preferably provided as close to the main sensor 31 as possible. More preferably, the sub sensor 32 and the main sensor 31 are arranged side by side so as to be in contact with each other. With this configuration, the main sensor 31 and the sub sensor 32 are provided under almost the same condition. Particularly in a configuration in which the sub sensor 32 and the main sensor 31 are arranged side by side so as to be in contact with each other, the main sensor 31 and the sub sensor 32 are arranged so that a distance therebetween is shortest. Therefore, a value of a noise signal included in an output signal supplied from the sub sensor 32 can be regarded as being the same as that of a noise signal included in an output signal supplied from the main sensor 31. Therefore, by the subtracting operation performed by the subtracting section 41, it is possible to more reliably remove a noise component reflected in the touch panel 3. This makes it possible to further enhance detection sensitivity for a touch operation.

The present embodiment has dealt with the touch panel system 1 including the touch panel 3 of capacitive type. However, the principle of operation of the touch panel 3 (i.e., the method of operating the sensor) is not limited to the capacitive type. For example, the noise canceling function can be achieved similarly by a touch panel system including a touch panel of resistance film type, infrared type, ultrasonic wave type, or electromagnetic induction coupling type. Further, regardless of the type of the display device 2, the touch panel system 1 of the present embodiment provides the noise canceling function.

The touch panel system 1 of the present embodiment is applicable to various kinds of electronic devices provided with touch panels. Examples of such the electronic device encompass televisions, personal computers, mobile phones, digital cameras, portable game devices, electronic photo frames, personal digital assistants (PDAs), electronic books, home electronic appliances (e.g., microwave ovens, washing machines), ticket vending machines, automatic teller machines (ATM), and car navigation systems. Thus, it is possible to provide an electronic device which is capable of effectively preventing impairment in detection sensitivity for a touch operation.

Embodiment 2

(1) Configuration of Touch Panel System 1a

Figure 4:
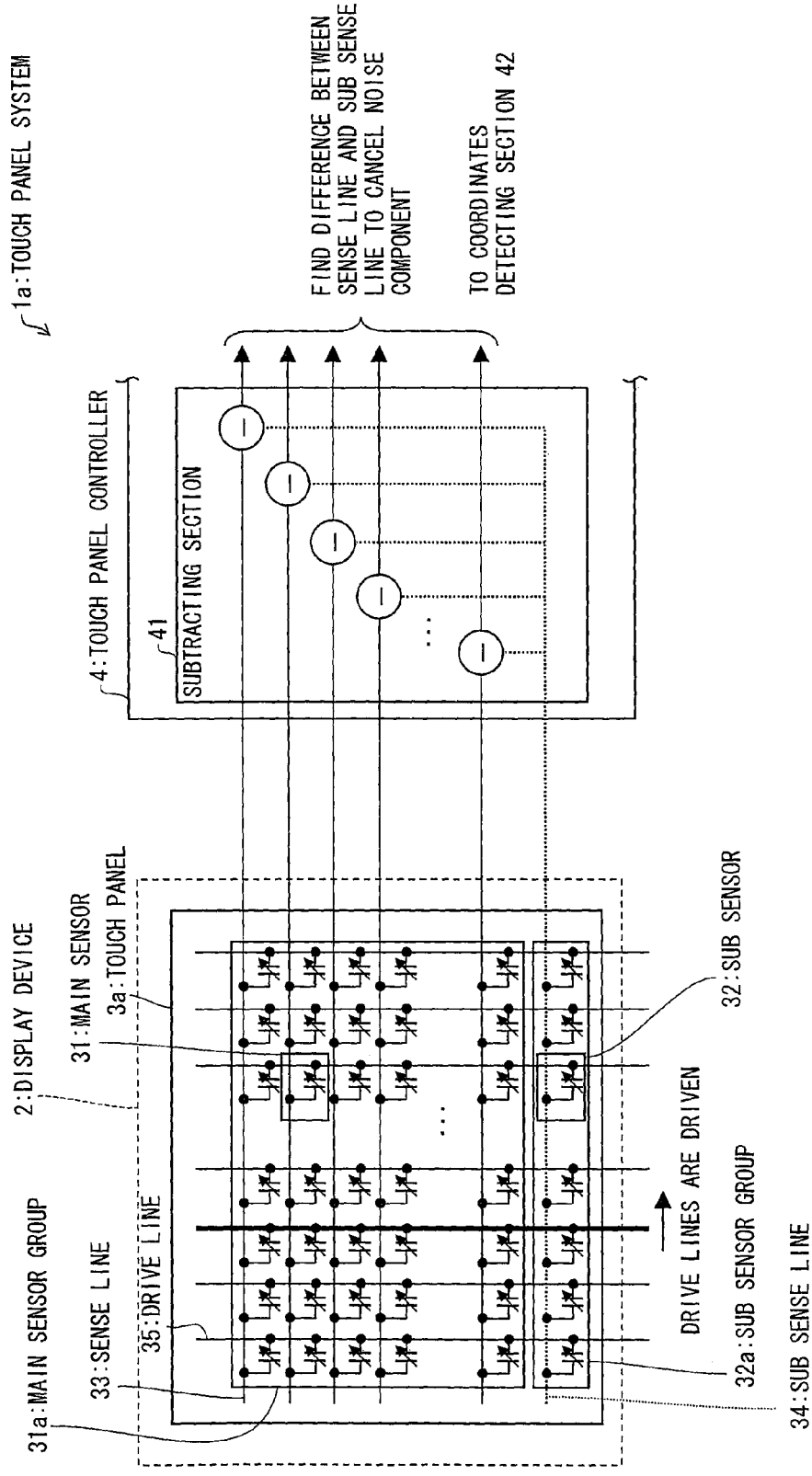
FIG. 4 is a view schematically illustrating a basic configuration of another touch panel system according to the present invention.

FIG. 4 is a view schematically illustrating a basic configuration of a touch panel system 1a according to another embodiment of the present invention. A basic configuration of the touch panel system 1a is substantially the same as that of the touch panel system 1 of Embodiment 1. The following will describe the touch panel system 1a, focusing on differences between the touch panel system 1a and the touch panel system 1. For convenience of explanation, members having the same functions as those explained in the drawings described in Embodiment 1 are given the same reference signs, and explanations thereof are omitted here.

The touch panel system 1a differs from the touch panel system 1 in terms of configurations of sensors provided in a touch panel 3a. Specifically, the touch panel 3a includes (i) a main sensor group 31a made of a plurality of main sensors 31 and (ii) a sub sensor group 32a made of a plurality of sub sensors 32. The touch panel system 1a detects not only (i) the presence or absence of a touch operation performed by the user but also (ii) positional information (coordinates) indicative of a position where the user performs the touch operation.

Specifically, according to the touch panel system 1a, the touch panel 3a includes the main sensor group 31a and the sub sensor group 32a which are provided on (in) the same surface of the touch panel 3a. The main sensor group 31a and the sub sensor group 32a are provided so as to be adjacent to each other. Each of the main sensor group 31a and the sub sensor group 32a is made of capacitive type sensors.

The main sensor group (main sensor section) 31a is provided in a region (touched region) of the touch panel 3a in which region a touch operation is performed. The main sensor group 31a detects a touch operation that the user performs with respect to the touch panel 3a. The main sensor group 31a is made of the plurality of main sensors 31 which are arranged in a matrix. The main sensor group 31a is provided with L sense lines 33 (L is an integer of 2 or greater). The sense lines 33 are provided so as to be parallel with each other and evenly spaced. On each of the sense lines 33, M main sensors 31 are provided (M is an integer of 2 or greater).

Each of the sense lines 33 has an end which is connected with a subtracting section 41 of a touch panel controller 4. With this, a signal detected by each main sensor is outputted to the subtracting section 41 via its corresponding sense line 33. Namely, a signal corresponding to a touch operation detected by the main sensor 31 is outputted to the subtracting section 41.

The sub sensor group (sub sensor section) 32a detects a noise component reflected in the touch panel 3a. The sub sensor group 32a is provided in a region (non-touched region) of the touch panel 3a in which region no touch operation is performed. Therefore, the sub sensor group 32a is not touched by the user in a touch operation, and the sub sensor group 32a detects various kinds of noises generated in the touch panel system 1a. Thus, unlike the main sensor group 31a, the sub sensor group 32a does not detect a signal corresponding to a touch operation. Namely, the sub sensor group 32a is configured not to be touched by the user in a touch operation but to detect a noise generated in the sensor. The sub sensor group 32a is provided with one sub sense line 34. The sub sense line 34 is provided so as to extend in parallel with the sense lines 33 (i.e., to extend along a direction in which the sense lines 33 extend). On the sub sense line 34, M sub sensors 32 are provided (M is an integer of 2 or greater). Namely, the number of main sensors 31 provided on each sense line 33 is equal to the number of sub sensors 32 provided on the sub sense line 34.

The sub sense line 34 has an end which is connected with the subtracting section 41 of the touch panel controller 4. With this, a signal detected by the sub sensor group 32a is outputted to the subtracting section 41 via the sub sense line 34.

Meanwhile, the touch panel 3a includes M drive lines 35 provided so as to intersect the sense lines 33 and the sub sense line 34 at right angles (M is an integer of 2 or greater). The drive lines 35 are provided so as to extend in parallel with each other and to be evenly spaced. On each of the drive lines 35, L main sensors 31 and one sub sensor 32 are provided (L is an integer of 2 or greater). Further, a capacitance is formed in an intersection of each of the sense lines 33 or the sub sense line 34 and a corresponding one of the drive lines 35. Namely, capacitances are formed in intersections of the sense lines 33 and the drive lines 35, and capacitances are formed in intersections of the sub sense line 34 and the drive lines 35. The drive lines 35 are connected with a drive line driving circuit (not illustrated). Upon activation of the touch panel system 1a, the drive lines 35 are supplied with electric potentials at a certain interval.

Thus, in the touch panel 3a, (i) the sense lines 33 and the sub sense line 34, which are provided in a horizontal direction, and (ii) the drive lines 35, which are provided in a vertical direction, are arranged in a two-dimensional matrix. For the sense line 33, the sub sense lines 34, and the drive line 35, the number thereof, a length thereof, a width thereof, a space therebetween, and/or the like can be arbitrarily set according to the intended purpose of the touch panel system 1a, the size of the touch panel 3a, and/or the like.

(2) Noise Processing Performed by Touch Panel System 1a

Figure 5:
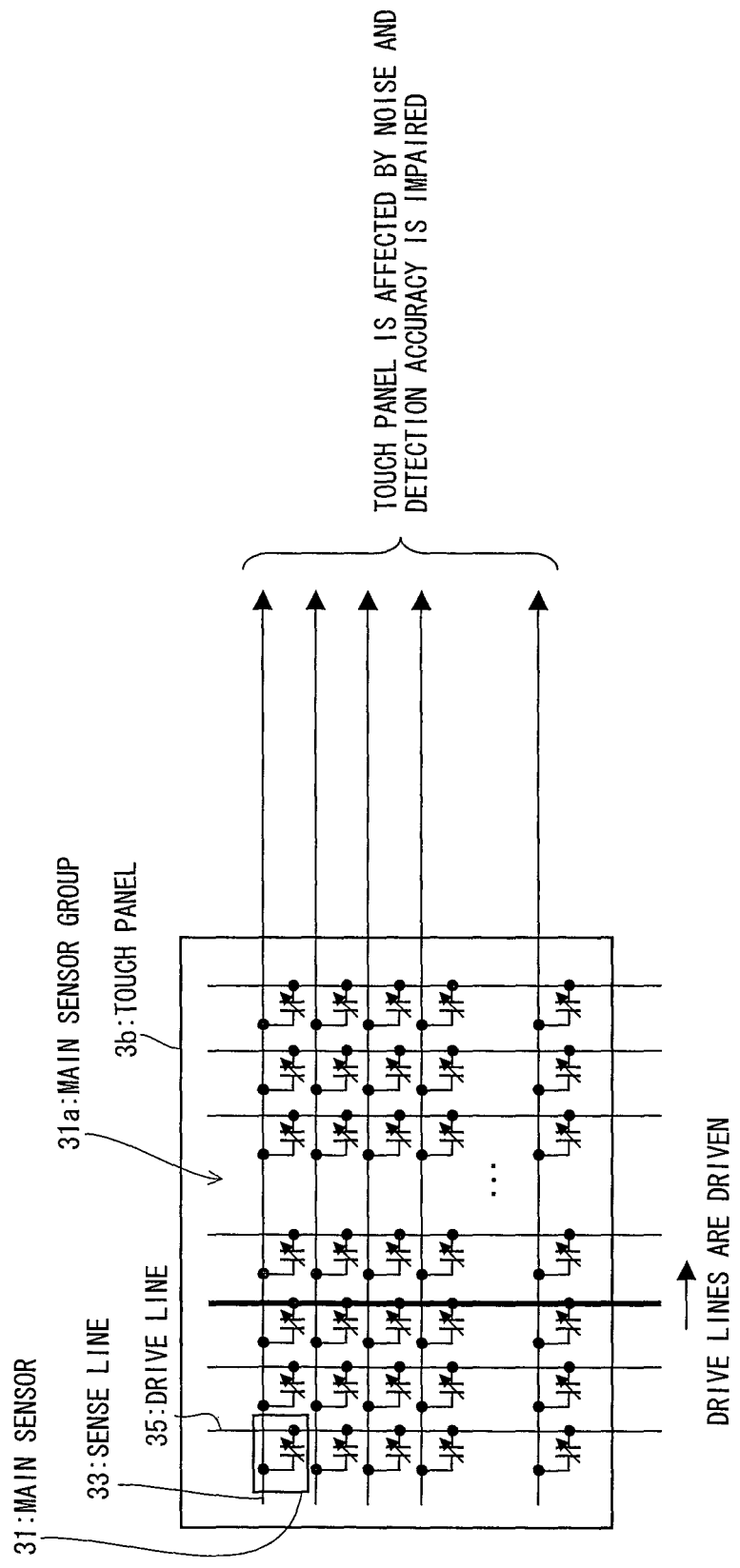
FIG. 5 is a view schematically illustrating a touch panel which is included in another version of the touch panel system shown in FIG. 4 and does not include a sub sensor group.

The touch panel system 1a determines, according to a change in the capacitance which change is detected by the touch panel controller 4, (i) the presence or absence of a touch operation and (ii) a touched position. However, similarly to the touch panel system 1, the touch panel system 1a is likely to be affected by various kinds of noises. This leads to impairment in detection sensitivity for a touch operation (i.e., detection sensitivity of the coordinates detecting section). Specifically, FIG. 5 is a view schematically illustrating a touch panel 3b, which is made by modifying the touch panel of the touch panel system 1a shown in FIG. 4 so that it does not include the sub sensor group 32a. As shown in FIG. 5, the touch panel 3b includes only a main sensor group 31a but does not include a sub sensor group 32a. Namely, the touch panel 3b shown in FIG. 5 has a configuration which is not provided with a countermeasure against noises yet. According to this configuration, the touch panel 3b is affected by various kinds of noises. Accordingly, a signal outputted by each sense line 33 includes various kinds of noises, and thus detection sensitivity for a touch operation is impaired.

Figure 6:
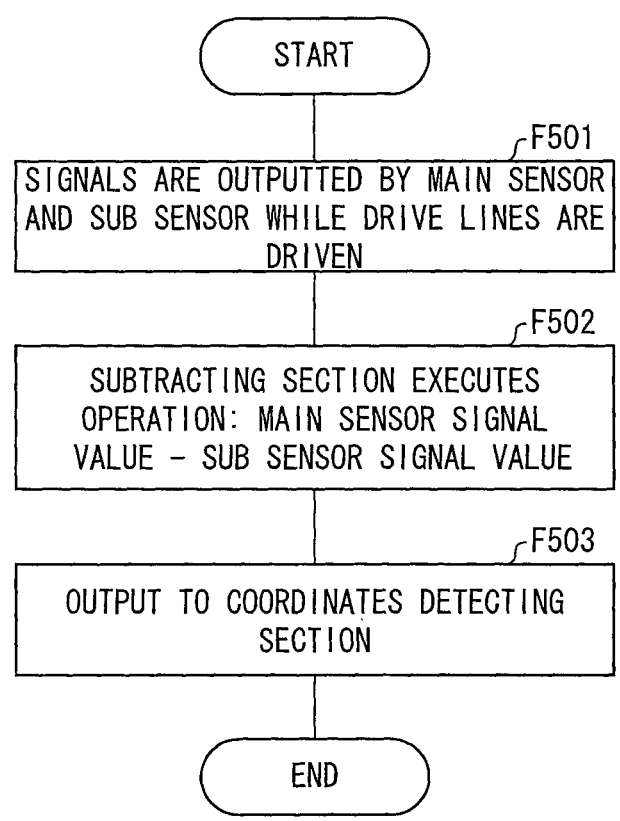
FIG. 6 is a flow chart illustrating a basic process of the touch panel system shown in FIG. 4.

In order to avoid this, the touch panel system 1a includes, as a measure for removing such the noises, the sub sensor group 32a and the subtracting section 41. With reference to FIG. 6, the following will describe a noise canceling process performed by the touch panel system 1a. FIG. 6 is a flow chart illustrating a noise canceling process, which is a basic process of the touch panel system 1a.

Upon activation of the touch panel system 1a, the drive line 35 is supplied with an electric potential at a certain interval. When the user performs a touch operation on the touch panel 3a, both of the main sensor group 31a and the sub sensor group 32a output signals to the subtracting section 41. Specifically, the user's performing the touch operation increases a capacitance of a specific main sensor 31 corresponding to the touched position. Namely, the user's performing the touch operation increases a value of an output signal supplied from that main sensor 31 (sense line 33). The touch panel system 1a outputs, to the subtracting section 41, output signals supplied from the sense line 33 and the sub sense line 34, while driving the drive lines 35.

To be more specific, a noise such as a clock generated in the display device 2 and other noises coming from the outside are reflected in the touch panel 3a. Therefore, the main sensor group 31a and the sub sensor group 32a detect various kinds of noise components. Specifically, the output signal supplied from the main sensor group 31a includes not only a signal derived from the touch operation itself but also a noise signal (noise component). Meanwhile, the sub sensor group 32a is configured not to detect a touch operation. Therefore, the output signal supplied from the sub sensor group 32a includes a noise signal (noise component), but does not include a signal derived from the touch operation (F501).

In the touch panel system 1a, the main sensor group 31a and the sub sensor group 32a are provided in the same surface so as to be adjacent to each other. Therefore, (i) a value of a noise signal included in the output signal supplied from the main sensor group 31a and (ii) a value of a noise signal included in the output signal supplied from the sub sensor group 32a can be regarded as being basically the same. In view of this, the subtracting section 41 in the touch panel controller 4 executes an operation for subtracting (i) the input signal (signal value) supplied from the sub sensor group 32a from (ii) the input signal (signal value) supplied from the main sensor group 31a (F502). Namely, the subtracting section 41 finds a difference between each sense line 33 and the sub sense line 34. This removes the noise signal from the output signal supplied from the main sensor group 31a. This provides the signal value derived from the touch operation itself, which signal is generated in response to the touch operation.

The signal thus obtained by the subtracting operation is outputted to the coordinates detecting section 42 included in the touch panel controller 4 (F503). Thus, the signal derived from the touch operation itself is outputted to the coordinates detecting section 42. According to the signal derived from the touch operation itself, the coordinates detecting section 42 detects (i) the presence or absence of a touch operation and (ii) a touched position (coordinates). With this configuration, it is possible to prevent impairment in detection sensitivity of the coordinates detecting section 42 (e.g., detection accuracy as to the presence or absence of a touch operation, detection sensitivity as to a touched position).

Note that, according to the touch panel system 1a, an output signal of the sense line 33 provided with the specific main sensor 31 corresponding to the touched position has a waveform as shown in (a) of FIG. 3, whereas an output signal of the sub sensor group 32a (sub sense line 34) has a waveform as shown in (b) of FIG. 3. The subtracting section 41 subtracts, from the output signal supplied from the main sensor group 31a, the output signal supplied from the sub sensor group 32a. As shown in (c) of FIG. 3, this subtracting operation removes, from the output signal supplied from the main sensor group 31a, the noise component outputted by the sub sensor group 32a. This provides the signal derived from the touch operation itself, which signal is generated in response to the touch operation. Furthermore, since the coordinates detecting section 42 is supplied with the signal derived from the touch operation itself, detection accuracy for a touch operation is not impaired. Therefore, it is possible to reduce a difference between (i) the actual touched position and (ii) the detected position which is detected by the coordinates detecting section 42.

As described above, while driving the drive lines 35, the touch panel system 1a reads, from the sense line 33, a change in a capacitance value of the main sensor group 31a which change is caused by the touch operation performed by the user. Furthermore, the touch panel system 1a reads a noise component from the sub sense line 34. Moreover, the touch panel system 1a allows the subtracting section 41 to find a difference between the sense line 33 and the sub sense line 34, so as to remove (cancel) the noise component.

The touch panel system 1a includes the main sensor group 31a made of the plurality of main sensors 31 arranged vertically and horizontally in the form of a matrix. Thanks to this configuration, in addition to the same effects as those given by the touch panel system 1, the touch panel system 1a can detect, by the coordinates detecting section 42, coordinates indicative of a touched position. Namely, the touch panel system 1a can detect a touched position (coordinates value) in addition to the presence or absence of a touch operation.

As with the case of the touch panel system 1, for the touch panel system 1a, a noise component which is the subject of removal is not limited to an AC signal component. Accordingly, the touch panel system 1a also can cancel all noises reflected in the touch panel 3a.

Embodiment 3

(1) Configuration of Touch Panel System 1b

Figure 7:
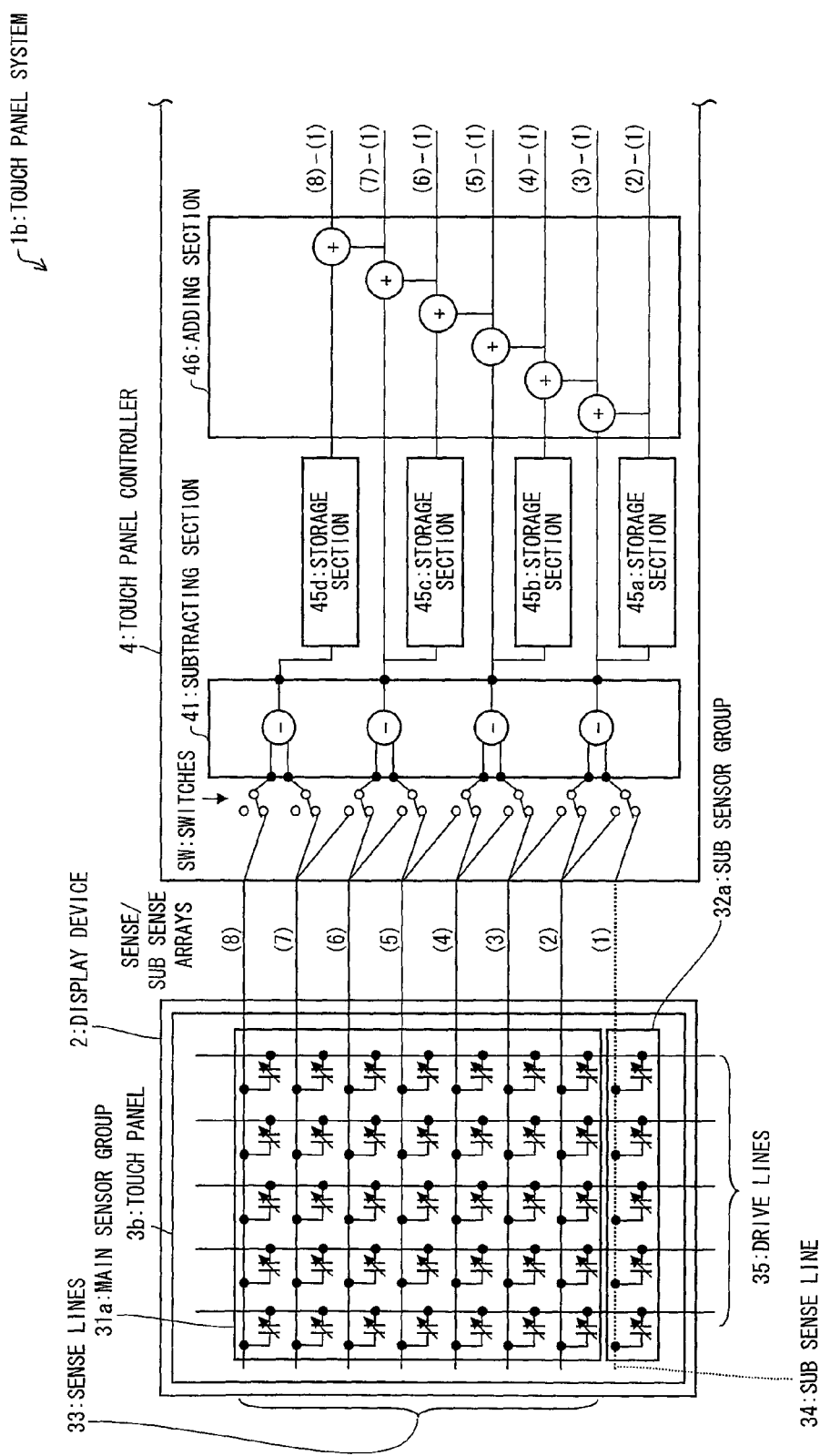
FIG. 7 is a view schematically illustrating a basic configuration of another touch panel system according to the present invention.

FIG. 7 is a view schematically illustrating a basic configuration of a touch panel system 1b according to another embodiment of the present invention. A basic configuration of the touch panel system 1b is substantially the same as that of the touch panel system 1a of Embodiment 2. The following will describe the touch panel system 1b, focusing on differences between the touch panel system 1a and the touch panel system 1b. For convenience of explanation, members having the same functions as those explained in the drawings described in Embodiments 1 and 2 are given the same reference signs, and explanations thereof are omitted here.

A touch panel 3b has the same configuration of that of the touch panel 3a in the touch panel system 1a of Embodiment 2. Namely, the touch panel 3b includes (i) a plurality of drive lines 35 (in FIG. 7, five drive lines 35), (ii) a plurality of sense lines 33 (in FIG. 7, seven sense lines 33) intersecting the drive lines 35, and (iii) one sub sense line 34 which intersects the drive lines 35 at right angles and extends in parallel with the sense lines 33. The sense lines 33 and the drive lines 35 are isolated from each other, and are coupled to each other via capacitances. The sub sense line 34 and the drive lines 35 are isolated from each other, and are coupled to each other via capacitances.

In the following description, eight sense/sub sense arrays, including the one sub sense line 34 and the seven sense lines 33, are referred to as Arrays (1) through (8), respectively.

A touch panel controller 4 includes switches SW, a subtracting section 41, storage sections 45a through 45d, and an adding section 46, which are arranged in this order from an input-receiving side of the touch panel controller 4. Note that the touch panel controller 4 also includes a coordinates detecting section 42 (not illustrated) and a CPU 43 (not illustrated) (FIG. 1). Thus, the touch panel system 1b differs from the touch panel systems 1 and 1a in terms of the configuration of the touch panel controller 4.

The switches SW select, from signals supplied from the sense lines 33 and the sub sense line 34, signals to be supplied to the subtracting section 41. More specifically, each of the switches SW includes two terminals (upper and lower terminals), and selects one of the upper and lower terminals. FIG. 7 shows a state where the switches SW select the lower terminals.

The subtracting section 41 performs difference signal operations on, out of signals supplied from Arrays (1) through (8), signals selected by the switches SW. Specifically, the subtracting section 41 performs difference signal operations between sense lines 33 which are adjacent to each other, and between a sense line 33 and the sub sense line 34 which are adjacent to each other. For example, in a case where the switches SW select the lower terminals as shown in FIG. 7, the subtracting section 41 performs the following difference signal operations: Array (8)–Array (7); Array (6)–Array (5); Array (4)–Array (3); and Array (2)–Array (1). On the other hand, in a case where the switches SW select the upper terminals (not illustrated), the subtracting section 41 performs the following difference signal operations: Array (7)–Array (6); Array (5)–Array (4); and Array (3)–Array (2).

In a case where each of the switches SW selects one of the upper and lower terminals, the storage sections 45a through 45d store signals (difference operation signals) obtained by the difference operations performed by the subtracting section 41. The difference operation signals stored in the storage sections 45a through 45d are outputted to the adding section 46. On the other hand, in a case where each of the switches SW selects the other one of the upper and lower terminals, difference operation signals are directly outputted to the adding section 46, not via the storage sections 45a through 45d.

The adding section 46 adds up the difference operation signals each of which is obtained from the sense lines 33 adjacent to each other and which are supplied from the subtracting section 41 and the storage sections 45a through 45d. Thereafter, the adding section 46 outputs a result of the adding operation. Further, the adding section 46 outputs the difference operation signal (Array (2)–Array (1)) which is obtained from the sub sense line 34 and the sense line 33 adjacent to the sub sense line 34 and which is stored in the storage section 45a. Ultimately, the adding section 46 outputs signals obtained by the following operations: Array (2)–Array (1); Array (3)–Array (1); Array (4)–Array (1); Array (5)–Array (1); Array (6)–Array (1); Array (7)–Array (1); and Array (8)–Array (1). Namely, each signal outputted by the adding section 46 is such a signal from which the noise signal (corresponding to the signal of Array (1)) included in the sense lines 33 has been removed. Furthermore, the subtracting section 41 has performed the difference signal operation between the sense lines 33 adjacent to each other. This allows the adding section 46 to output the signals from which the noise signals have been more reliably removed.

(2) Noise Processing Performed by Touch Panel System 1b

Figure 8:
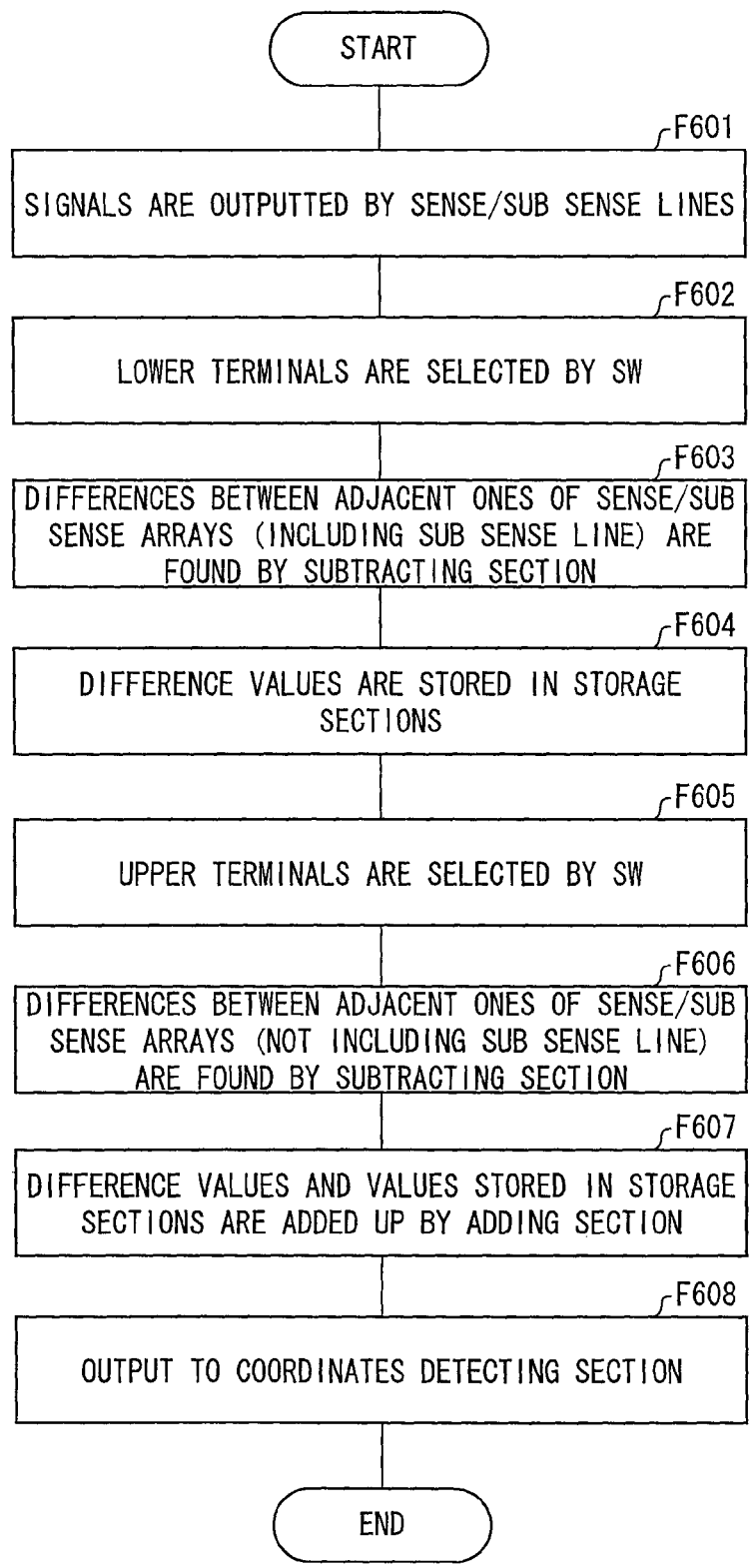
FIG. 8 is a flow chart illustrating a basic process of the touch panel system shown in FIG. 7.

With reference to FIGS. 7 and 8, the following will describe noise processing performed by the touch panel system 1b. FIG. 8 is a flow chart illustrating a noise canceling process, which is a basic process of the touch panel system 1b.

Upon activation of the touch panel system 1b, the drive line 35 is supplied with an electric potential at a certain interval. The user's performing a touch operation on the touch panel 3b increases a capacitance of a specific sense line 33 corresponding to the touched position. Namely, the user's performing the touch operation on the touch panel 3b increases a value of an output signal supplied from that sense line 33. The touch panel system 1b outputs, to the touch panel controller 4, output signals supplied from the sense lines 33 and the sub sense line 34, while driving the drive lines 35. Thus, while driving the drive lines 35, the touch panel system 1b detects changes in the capacitances of the sense lines 33 and a change in the capacitance of the sub sense line 34, so as to determine the presence or absence of a touch operation and a touched position.

To be more specific, a noise such as a clock generated in the display device 2 and other noises coming from the outside are reflected in the touch panel 3b. Therefore, each of the main sensor group 31a and the sub sensor group 32a detects various kinds of noise components. Specifically, the output signal supplied from the sense line 33 includes not only a signal derived from the touch operation itself but also a noise signal (noise component). Meanwhile, the sub sense line 34 is configured not to detect a touch operation. Therefore, the output signal supplied from the sub sense line 34 includes a noise signal (noise component), but does not include a signal derived from the touch operation (F601).

Next, the switches SW select the lower terminals (F602). Then, the subtracting section 41 finds a difference (sense line (Sn+1)−sense line Sn: a first difference) between a sense line 33 (sense line Sn) and a sense line (sense line Sn+1) which is one of two sense lines 33 adjacent to the certain sense line 33 and is closer to the sub sense line 34 than the other is. In this step, a difference (third difference) between the sub sense line 34 and a sense line 33 which is closer to the sub sense line 34 than any other sense lines 33 is found (F603).

For Arrays (1) through (8) shown in FIG. 7, the subtracting section 41 performs the following four difference signal operations:
- Array (2)−Array (1) (The resulting difference value is referred to as "A".)
- Array (4)−Array (3) (The resulting difference value is referred to as "C".)
- Array (6)−Array (5) (The resulting difference value is referred to as "E".)
- Array (8)−Array (7) (The resulting difference value is referred to as "G".)

Namely, in the step F603, the subtracting section 41 performs the difference signal operations on Arrays (1) through (8), which includes the sub sense line 34.

The difference values A, C, E, and G found by the subtracting section 41 are stored in the storage sections 45a through 45d, respectively. Namely, the storage section 45a stores the difference value A, the storage section 45b stores the difference value C, the storage section 45c stores the difference value E, and the storage section 45d stores the difference value G (F604).

Next, the switches SW selecting the lower terminals are turned to select (close) the upper terminals (F605). Then, the subtracting section 41 performs an operation similar to that of F603. Specifically, the subtracting section 41 performs a difference signal operation (sense line Sn−sense line (Sn−1): a second difference) between the sense line 33 (sense line Sn) and a sense line (sense line Sn−1) which is one of the two sense lines 33 adjacent to the certain sense line 33 and is further away from the sub sense line 34 than the other is (F606).

For Arrays (1) through (8) shown in FIG. 7, the subtracting section 41 performs the following three difference signal operations:
- Array (3)−Array (2) (The resulting difference value is referred to as "B".)
- Array (5)−Array (4) (The resulting difference value is referred to as "D".)
- Array (7)−Array (6) (The resulting difference value is referred to as "F".)

Namely, in the step F606, the subtracting section 41 performs the difference signal operations on Arrays (2) through (7), which does not include the sub sense line 34.

Next, the adding section 46 performs an adding operation for adding up (i) the difference values B, D, and F found in the step F606 and (ii) the difference values A, C, E, and G stored in the respective storage sections 45a through 45d. Namely, the adding section 46 adds up (i) the difference values (the difference values A, C, E, and G) found when the lower terminals are selected by the switches SW and (ii) the difference values (the difference values B, D, and F) found when the upper terminals are selected by the switches SW (F607).

In the case of Arrays (1) through (8) shown in FIG. 7, the adding section 46 adds up (i) the difference value A (Array (2)−Array (1) signal) stored in the storage section 45a and (ii) the difference value B (Array (3)−Array (2) signal) outputted by the subtracting section 41. This adding operation is expressed as below:

$$\text{Difference value } A + \text{Difference value } B =$$
$$\{\text{Array}(2) - \text{Array}(1)\} + \{\text{Array}(3) - \text{Array}(2)\} =$$
$$\text{Array}(3) - \text{Array}(1)(\text{The resulting difference}$$

value is referred to as "difference value H".)

This provides an Array (3)−Array (1) signal. The adding section 46 performs such operations sequentially.

Specifically, the adding section 46 adds, to the difference value H (Array (3)−Array (1) signal), the difference value C (Array (4)−Array (3) signal) stored in the storage section 45b. This provides an Array (4)−Array (1) signal (difference value I).

Next, the adding section 46 adds, to the difference value I (Array (4)−Array (1) signal), the difference value D (Array (5)−Array (4) signal) outputted by the subtracting section 41. This provides an Array (5)−Array (1) signal (difference value J).

Next, the adding section 46 adds, to the difference value J (Array (5)−Array (1) signal), the difference value E (Array (6)−Array (5) signal) stored in the storage section 45c. This provides an Array (6)−Array (1) signal (difference value K).

Next, the adding section 46 adds, to the difference value K (Array (6)−Array (1) signal), the difference value F (Array (7)−Array (6) signal) outputted by the subtracting section 41. This provides an Array (7)−Array (1) signal (difference value L).

Next, the adding section 46 adds, to the difference value L (Array (7)−Array (1) signal), the difference value G (Array (8)−Array (7) signal) stored in the storage section 45d. This provides an Array (8)−Array (1) signal (difference value M).

Note that the difference value A (i.e., Array (2)−Array (1) signal) stored in the storage section 45a is outputted without being subjected to any adding operation by the adding section 46.

Thus, the adding section 46 outputs the following signals:
- Array (2)−Array (1) signal=Difference value A
- Array (3)−Array (1) signal=Difference value H
- Array (4)−Array (1) signal=Difference value I
- Array (5)−Array (1) signal=Difference value J
- Array (6)−Array (1) signal=Difference value K
- Array (7)−Array (1) signal=Difference value L
- Array (8)−Array (1) signal=Difference value M In the configuration shown in FIG. 7, Arrays (2) through (8) are the sense lines 33, and Array (1) is the sub sense line 34. As a result of the adding operations performed by the adding section 46, the signal of Array (1) (noise signal) is removed from each of the signals of Arrays (2) through (8). Accordingly, each output signal supplied from the adding section 46 is such a signal from which a noise signal included in the sense line 33 has been removed. Thus, it is possible to provide a signal value derived from a touch operation itself, which signal value is generated in response to the touch operation. Each output signal of the adding section 46, from which the noise signal has been removed, is outputted to the coordinates detecting section 42 in the touch panel controller 4. Namely, the signals derived from the touch operation itself are outputted to the coordinates detecting section 42 (F608).

As described above, the touch panel system 1b obtains a difference signal value between sense lines 33 adjacent to each other. Namely, a difference is found between the adjacent sense lines 33, which have a higher correlation in terms of noise. Furthermore, from an output signal supplied from each sense line 33, a signal (noise signal) of the sub sense line 34 is removed. Therefore, as compared with the touch panel systems 1 and 1a of Embodiments 1 and 2, the touch panel system 1b can remove a noise more reliably.

In addition, according to the touch panel system 1b, the adding section 46 sequentially performs adding operations from the sub sense line 34 side (i.e., in the order of increasing distance between a sense line involved in a certain adding operation and the sub-sense line). Therefore, it is possible to remove a noise by performing the adding operations in such a manner that a result of an adding operation is used in a next adding operation.

Embodiment 4

Figure 9:
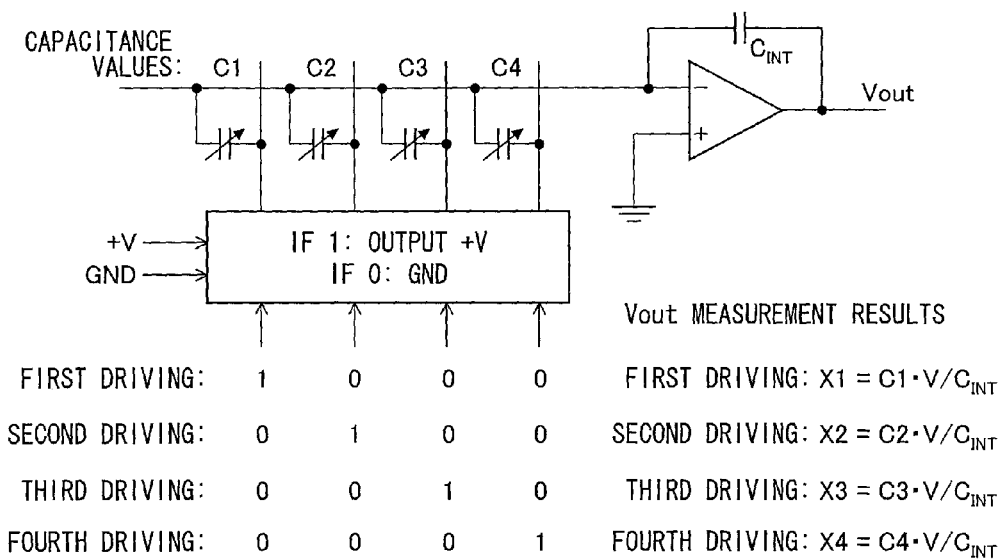
FIG. 9 is a view illustrating a driving method of a touch panel which driving method is employed in a conventional touch panel system.
Figure 10:
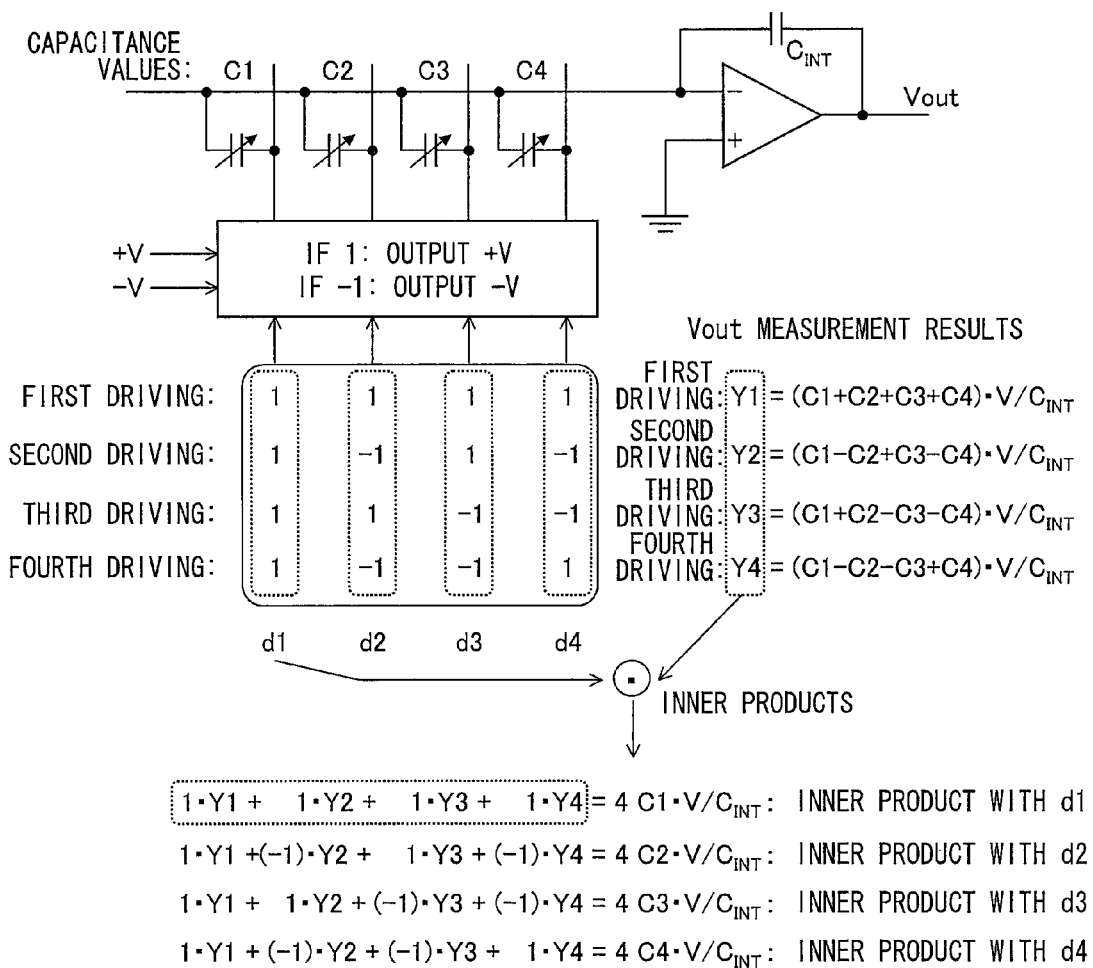
FIG. 10 is a view illustrating a driving method (orthogonal sequence driving method) of a touch panel which driving method is employed in a touch panel system of the present invention.

A driving method of a touch panel system of the present invention is not particularly limited. Preferably, the driving method is an orthogonal sequence driving method. In other words, drive lines 35 are preferably parallel driven. FIG. 9 is a view illustrating a driving method of a touch panel which driving method is employed in a conventional touch panel system. FIG. 10 is a view illustrating a driving method (orthogonal sequence driving method) of a touch panel which driving method is employed in a touch panel system of the present invention.

FIG. 9 shows one sense line extracted from the touch panel and provided with four sensors. As shown in FIG. 9, the conventional touch panel system drives drive lines in the following manner: +V volt is applied to a drive line which is to be driven, so that the drive lines are driven sequentially.

Specifically, in the first drive line driving, +V volt is applied to the leftmost sensor. This gives the first Vout measurement result (X1) expressed by:

$$X1 = C1 \times V/Cint$$

Similarly, in the second drive line driving, +V volt is applied to the second sensor from the left. This gives the second Vout measurement result (X2) expressed by:

$$X2 = C2 \times V/Cint$$

In the third drive line driving, +V volt is applied to the third sensor from the left. This gives the third Vout measurement result (X3) expressed by:

$$X3 = C3 \times V/Cint$$

In the fourth drive line driving, +V volt is applied to the rightmost sensor. This gives the fourth Vout measurement result (X4) expressed by:

$$X4 = C4 \times V/Cint$$

FIG. 10 shows, as well as FIG. 9, one sense line extracted from the touch panel and provided with four sensors. As shown in FIG. 10, according to the orthogonal sequence driving method, drive lines are driven in such a manner that +V volt or −V volt is applied to all the drive lines. Namely, according to the orthogonal sequence driving method, the drive lines are parallel driven.

Specifically, in the first drive line driving, +V volt is applied to all the sensors. This gives the first Vout measurement result (Y1) expressed by:

$$Y1 = (C1+C2+C3+C4) \times V/Cint$$

In the second drive line driving, +V volt is applied to the leftmost sensor, −V volt is applied to the second sensor from the left, +V volt is applied to the third sensor from the left, and −V volt is applied to the rightmost sensor. This gives the second Vout measurement result (Y2) expressed by:

$$Y2 = (C1-C2+C3-C4) \times V/Cint$$

In the third drive line driving, +V volt is applied to the leftmost sensor, +V volt is applied to the second sensor from the left, −V volt is applied to the third sensor from the left, and −V volt is applied to the rightmost sensor. This gives the third Vout measurement result (Y3) expressed by:

$$Y3 = (C1+C2-C3-C4) \times V/Cint$$

In the fourth drive line driving, +V volt is applied to the leftmost sensor, −V volt is applied to the second sensor from the left, −V volt is applied to the third sensor from the left, and +V volt is applied to the rightmost sensor. This gives the fourth Vout measurement result (Y4) expressed by:

$$Y4 = (C1-C2-C3+C4) \times V/Cint$$

According to the configuration shown in FIG. 10, capacitance values (C1, C2, C3, C4) can be obtained by an inner product calculation of (i) output sequences (Y1, Y2, Y3, Y4) and (ii) orthogonal codes di. Such formula is established due to orthogonality of the orthogonal code di. Here, the code di indicates codes of positive and/or negative voltages applied to a respective drive line. Specifically, the code d1 indicates codes of voltages applied to the leftmost sensor, and is expressed as "+1, +1, +1, +1". The code d2 indicates codes of voltages applied to the second sensor from the left, and is expressed as "+1, −1, +1, −1". The code d3 indicates codes of voltages applied to the third sensor from the left, and is expressed as "+1, +1, −1, −1". The code d4 indicates codes of voltages applied to the rightmost sensor, and is expressed as "+1, −1, −1, +1".

The values of C1, C2, C3, C4 are found by inner product calculations of (i) the output sequences Y1, Y2, Y3, Y4 and (ii) the codes d1, d2, d3, d4 as follows:

$$C1 = 1 \times Y1 + 1 \times Y2 + 1 \times Y3 + 1 \times Y4 = 4C1 \times V/Cint$$

$$C2 = 1 \times Y1 + (-1) \times Y2 + 1 \times Y3 + (-1) \times Y4 = 4C2 \times V/Cint$$

$$C3 = 1 \times Y1 + 1 \times Y2 + (-1) \times Y3 + (-1) \times Y4 = 4C3 \times V/Cint$$

$$C4 = 1 \times Y1 + (-1) \times Y2 + (-1) \times Y3 + (-1) \times Y4 = 4C3 \times V/Cint$$

Figure 11:
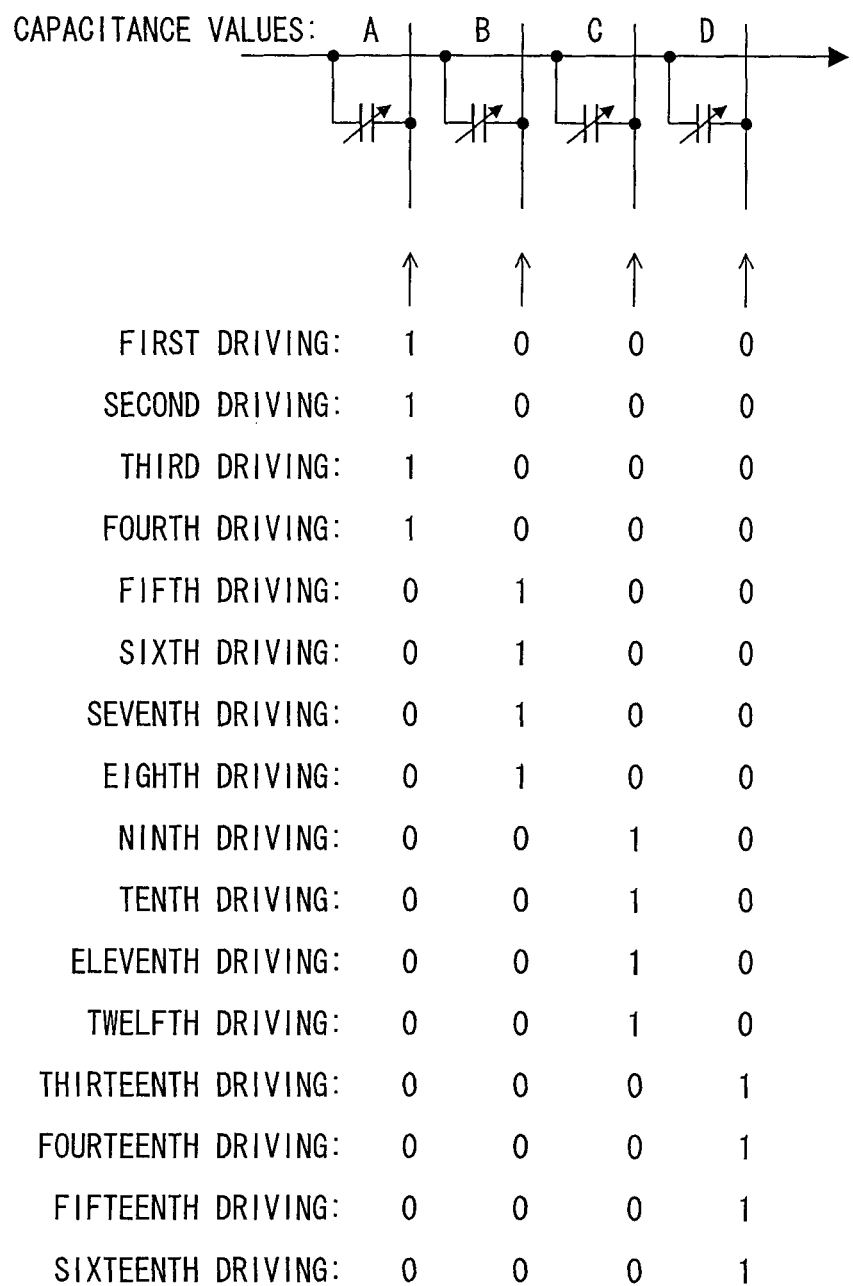
FIG. 11 is a view illustrating a process which needs to be performed by the touch panel employing the driving method of FIG. 9 in order to achieve sensitivity equivalent to that of the touch panel employing the driving method of FIG. 10.

Thus, due to the orthogonality of the codes di, Ci are obtained by inner product calculation of the codes di and the output sequences Yi. Now, the result thus obtained is compared with the result obtained by the conventional driving method shown in FIG. 9. In a case where the orthogonal sequence driving method and the conventional driving method perform the same number of driving operations, the orthogonal sequence driving method allows detection of values four times greater than those of the conventional driving method. FIG. 11 is a view illustrating a process which needs to be performed by the touch panel of the driving method of FIG. 9 in order that it achieves sensitivity equivalent to that of the touch panel of the driving method of FIG. 10. As shown in FIG. 11, in order that the driving method of FIG. 9 achieves the sensitivity equivalent to that given by the driving method of FIG. 10, the driving method of FIG. 9 needs to drive a certain drive line four times and to sum the results. Namely, according to the driving method of FIG. 9, a driving period for the drive lines is four times longer than that of the driving method of FIG. 10. Conversely, with a driving period for the drive lines which driving period is reduced to one-quarter of that of the driving method shown in FIG. 9, the driving method shown in FIG. 10 achieves sensitivity equivalent to that given by the conventional driving method shown in FIG. 9. Thus, according to the driving method shown in FIG. 10, it is possible to reduce electric power consumption of the touch panel system.

Figure 12:
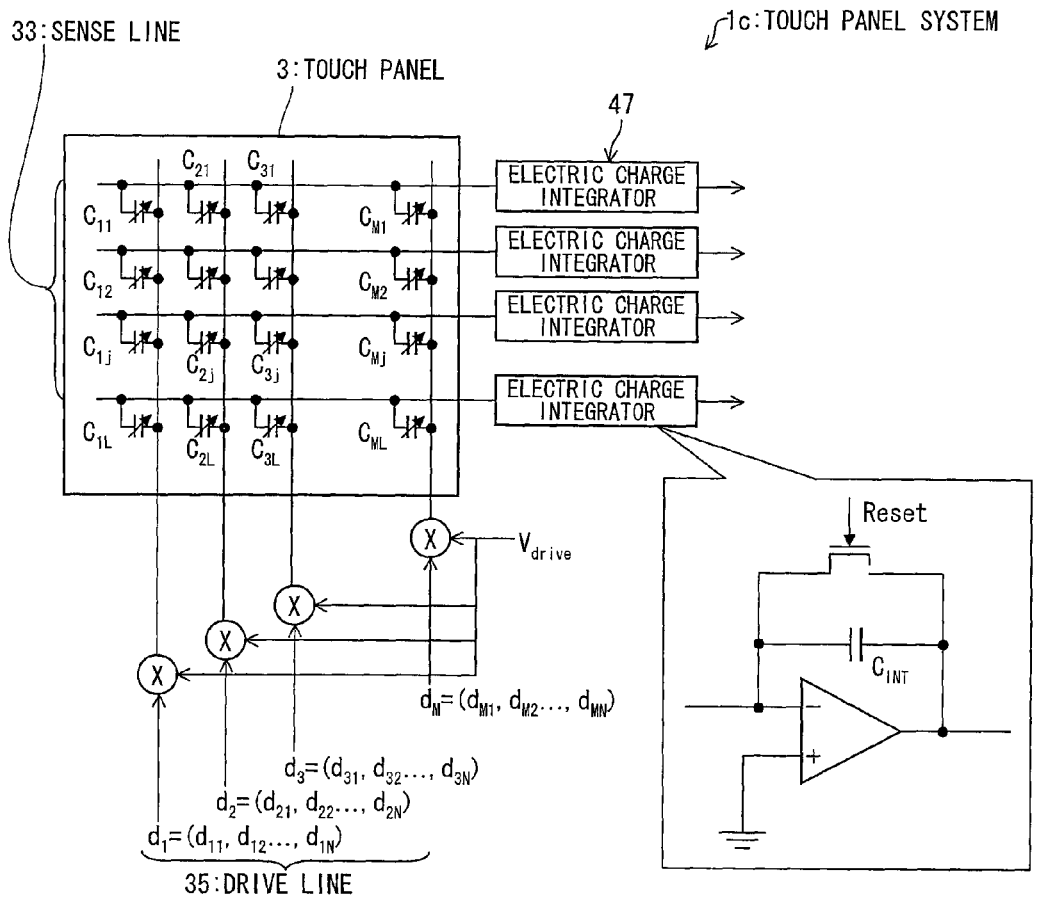
FIG. 12 is a view schematically illustrating another touch panel system according to the present invention, said another touch panel system including a touch panel driven by the orthogonal sequence driving method.

FIG. 12 is a view schematically illustrating a touch panel system 1c including a touch panel 3 driven by such the orthogonal sequence driving method. Specifically, the touch panel system 1c of FIG. 12 is shown with drive lines and sense lines, which correspond to the generalized four drive lines and one sense line of FIG. 10.

Specifically, the touch panel system 1c includes M drive lines 35, L sense lines 33 (each of M and L is a natural number), and capacitances which are formed between the drive lines 35 and the sense lines 33 so as to be arranged in a matrix. The touch panel system 1c performs the following operation: With respect to a matrix Cij (i=1, . . . , M, j=1, . . . , L) of these capacitances, the code di=(di1, . . . , diN) (i=1, . . . , M) is used, which is constituted by "+1" and "−1" being orthogonal to each other and each having a code length N. Consequently, all the M drive lines 35 are driven concurrently in parallel, while applying +V volt in a case of "+1" and applying −V volt in a case of "−1". Further, capacitance values Cij are estimated by inner product calculation "di·sj=Σ (k=1, . . . , N)dik·sjk", i.e., inner product calculation of (i) output sequences sj=(sj1, . . . , sjN) (j=1, . . . , L) read from respective sense lines 33 and (ii) the codes di. In order to perform such the inner product calculation, the touch panel system 1c includes an electric charge integrator (calculation section) 47. A strength of an output signal (Vout) supplied from the electric charge integrator 47 is found by:

$$Vout = Cf \times Vdrive \times N/Cint$$

The output sequence sj is expressed as follows:

$$sj = (sj1, \ldots, sjN)$$
$$= \left( \sum (k=1, \ldots, M) Ckj \times dk1, \ldots, \right.$$
$$\left. \sum (k=1, \ldots, M) Ckj \times dkN \right) \times (Vdrive/Cint)$$
$$= \left( \sum (k=1, \ldots, M) Ckj \times (dk1, \ldots, dkN) \times (Vdrive/Cint) \right)$$
$$= \sum (k=1, \ldots, M)(Ckj \times dk) \times (Vdrive/Cint)$$

The inner product of the code di and the output sequence sj is expressed as follows:

$$di \cdot sj = di \cdot \left( \sum (k=1, \ldots, M)(Ckj \times dk) \times (Vdrive/Cint) \right)$$
$$= \sum (k=1, \ldots, M)(Ckj \times di \cdot dk) \times (Vdrive/Cint)$$
$$= \sum (k=1, \ldots, M)(Ckj \times N \times \delta ik) \times$$

-continued
$$(Vdrive/Cint)[\delta ik = 1 \text{ if } i=k, 0 \text{ if else}]$$
$$= Cij \times N \times (Vdrive/Cint)$$

Thus, according to the touch panel system 1c, the touch panel 3 is driven by the orthogonal sequence driving method. Therefore, the following generalization is possible: By finding an inner product of the code di and the output sequence sj, a signal of the capacitance Cij is multiplied by N (code length). This driving method provides an effect that a signal strength of a capacitance is N-folded, regardless of the number of drive lines 35 (i.e., "M"). Conversely, by employing the orthogonal sequence driving method, sensitivity equivalent to that given by the conventional driving method shown in FIG. 9 can be achieved with a driving period for the drive lines which period is reduced to one-Nth of that of the driving method shown in FIG. 9. Namely, employing the orthogonal sequence driving method can reduce the number of times that the drive lines should be driven. This makes it possible to reduce electric power consumption of the touch panel system 1c.

Embodiment 5

Figure 13:
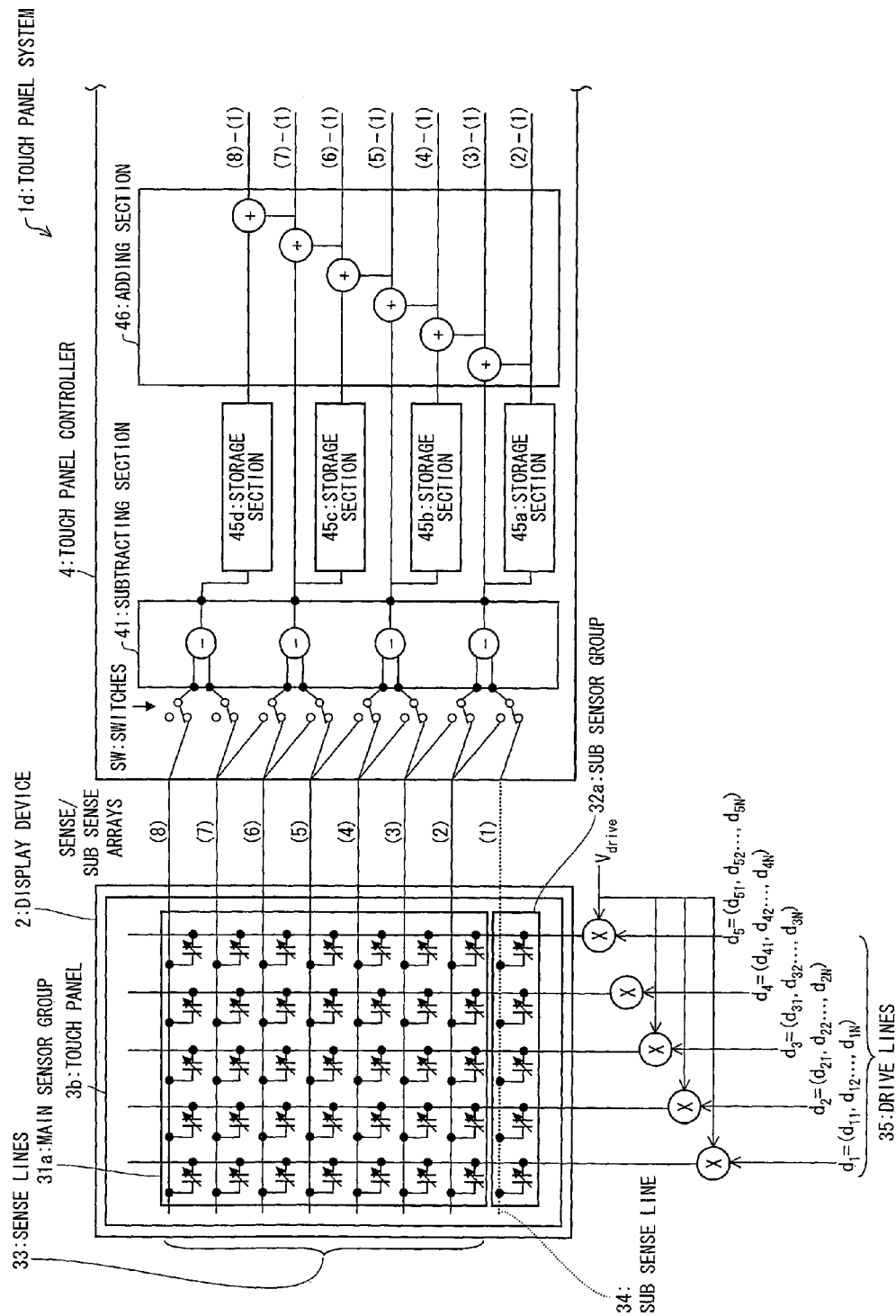
FIG. 13 is a view schematically illustrating a basic configuration of a touch panel system according to another embodiment of the present invention.

FIG. 13 is a view schematically illustrating a basic configuration of a touch panel system 1d according to the present embodiment. The touch panel system 1d is configured by employing, in the touch panel system 1b with the noise canceling function shown in FIG. 7, the orthogonal sequence driving method for the drive lines 35 which is shown in FIGS. 10 and 12 and which is employed in the touch panel system 1c. Since the touch panel system 1d operates in the same manner as the above-described touch panel systems 1b and 1c, explanations thereof are omitted here.

According to the touch panel system 1d, a difference signal value is found between sense lines 33 which are adjacent to each other. Namely, a difference is found between the adjacent sense lines 33, which have a higher correlation in terms of noise. Furthermore, from an output signal supplied from each sense line 33, a signal (noise signal) of a sub sense line 34 is removed. Therefore, as compared with the touch panel systems 1 and 1a of Embodiments 1 and 2, the touch panel system 1d can remove a noise more reliably. Moreover, a signal of a capacitance Cij is multiplied by N (code length). This allows a capacitance to have an N-folded signal strength, regardless of the number of drive lines 35. In addition, since the orthogonal sequence driving method is employed, sensitivity equivalent to that given by the conventional driving method shown in FIG. 9 can be achieved with a driving period for the drive lines which period is reduced to one-Nth of that of the driving method shown in FIG. 9. Namely, employing the orthogonal sequence driving method can reduce the number of times that the drive lines should be driven. This makes it possible to reduce electric power consumption of the touch panel system 1d.

Embodiment 6

Figure 14:
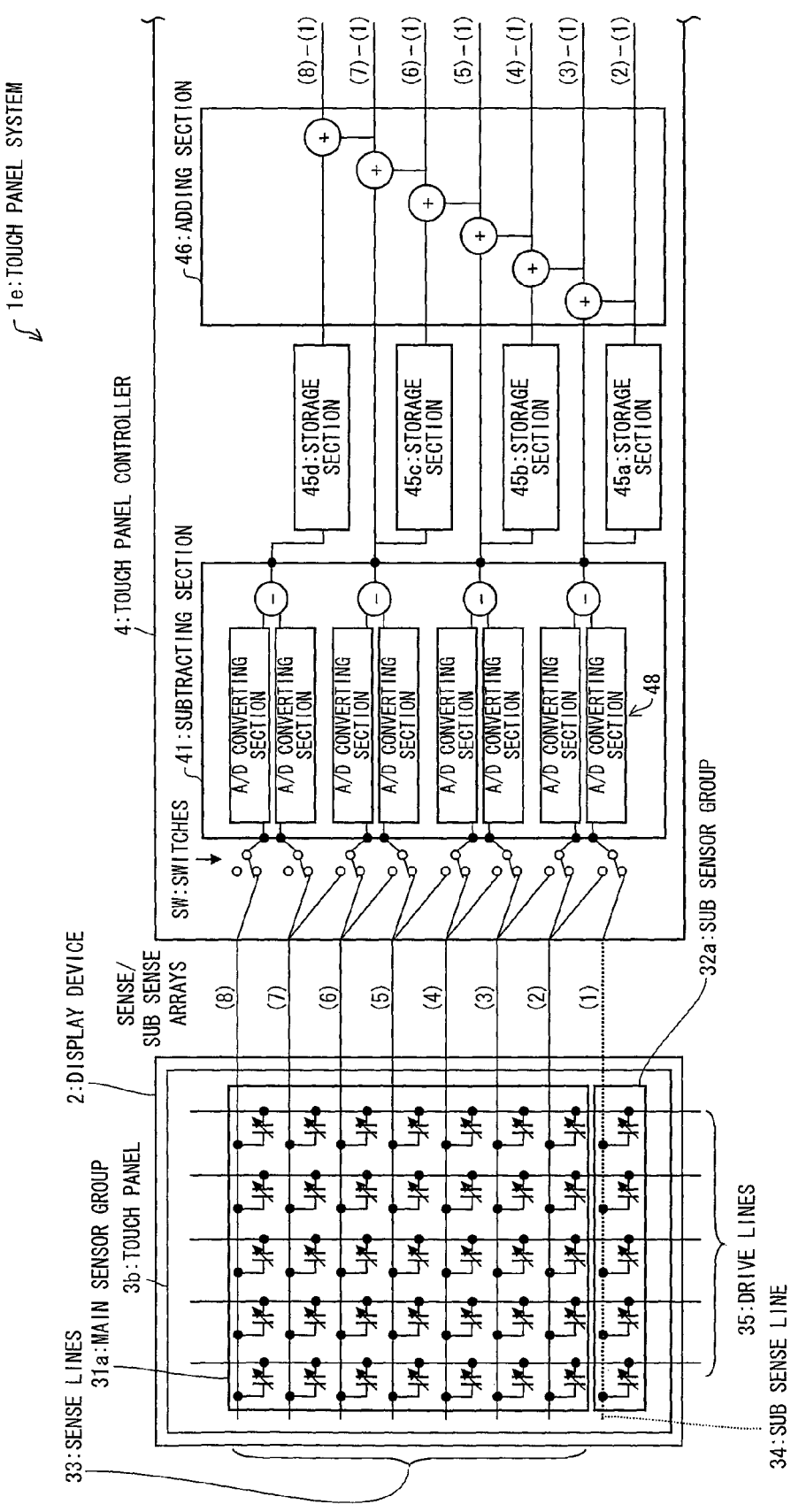
FIG. 14 is a view schematically illustrating a basic configuration of another touch panel system according to the present invention.

FIG. 14 is a view schematically illustrating a basic configuration of a touch panel system 1e according to the present embodiment. The touch panel system 1e includes a subtracting section 41 having a different configuration.

Each of output signals supplied from a sense line 33 and a sub sense line 34 of a touch panel 3b is an analog signal. Therefore, the subtracting section 41 includes an analog-todigital converting section (first analog-to-digital converting section) 48 and a digital subtracter (not illustrated).

With this configuration, output signals (analog signals) supplied from the touch panel 3b are converted into digital signals by the analog-to-digital converting section 48 of the subtracting section 41. The digital subtracter performs, by use of the digital signals thus converted, subtracting operations in the same manner as in the touch panel system 1b shown in FIG. 7.

Thus, the touch panel system 1e can remove a noise by (i) converting, into digital signals, analog signals outputted by the touch panel 3b and thereafter (ii) performing subtracting operations.

Embodiment 7

Figure 15:
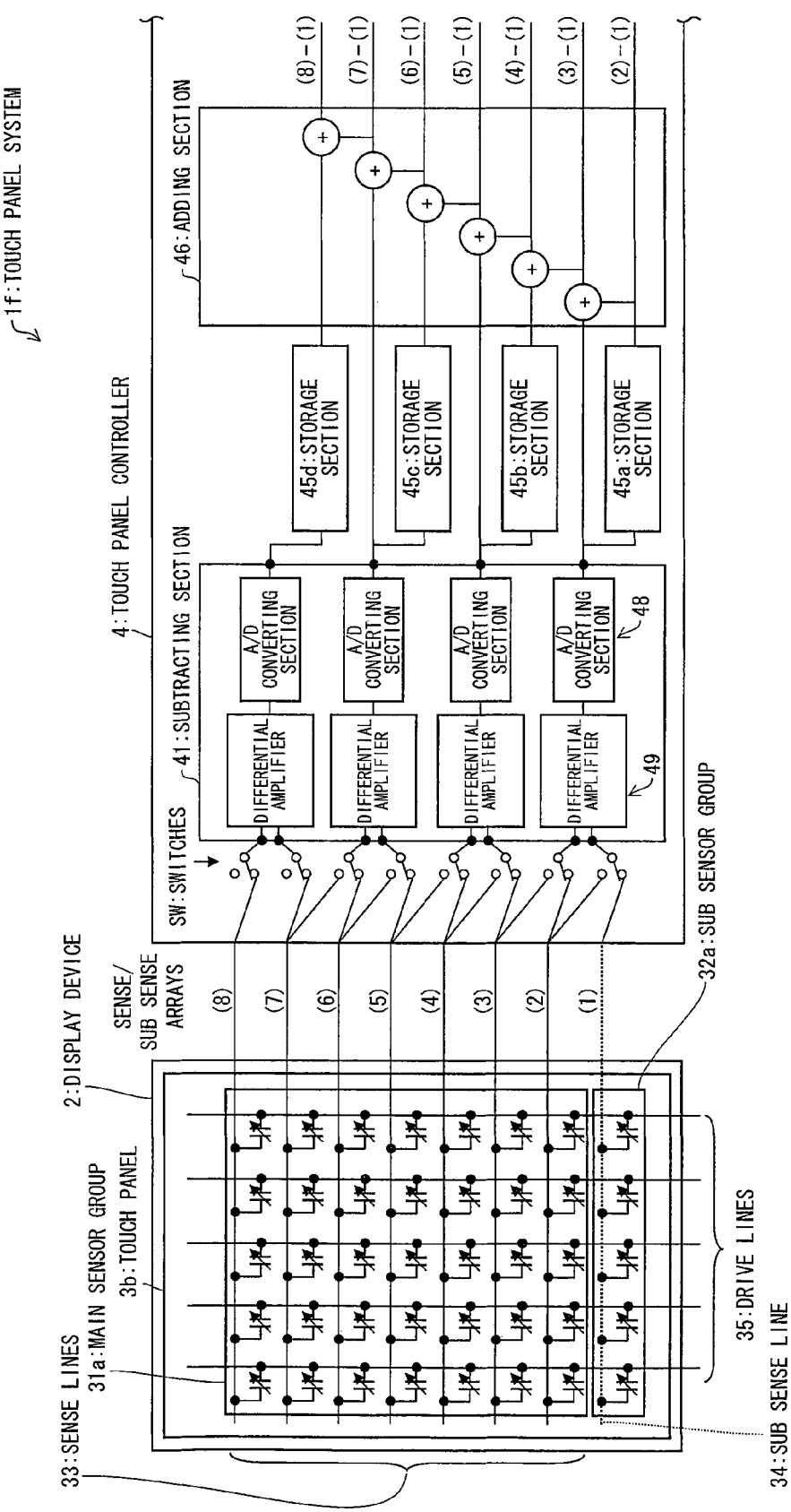
FIG. 15 is a view schematically illustrating a basic configuration of another touch panel system according to the present invention.

FIG. 15 is a view schematically illustrating a basic configuration of a touch panel system 1f according to the present embodiment. The touch panel system 1f includes a subtracting section 41 having a different configuration.

Output signals supplied from a sense line 33 and a sub sense line 34 of a touch panel 3b are analog signals. Therefore, the subtracting section 41 includes a differential amplifier 49 and an analog-to-digital converting section 48.

With this configuration, in the same manner as in the touch panel system 1b shown in FIG. 7, the differential amplifier 49 performs subtracting operations on output signals (analog signals) supplied from the touch panel 3b, without converting the analog signals into digital signals. The analog-to-digital converting section 48 (second analog-to-digital converting section) converts, into a digital signal, an analog signal thus obtained by the subtracting operations.

Thus, the touch panel system 1f can remove a noise by (i) performing subtracting operations on analog signals outputted by the touch panel 3b, without converting the analog signals into digital signals, and thereafter (ii) converting the resulting signal into a digital signal.

Embodiment 8

Figure 16:
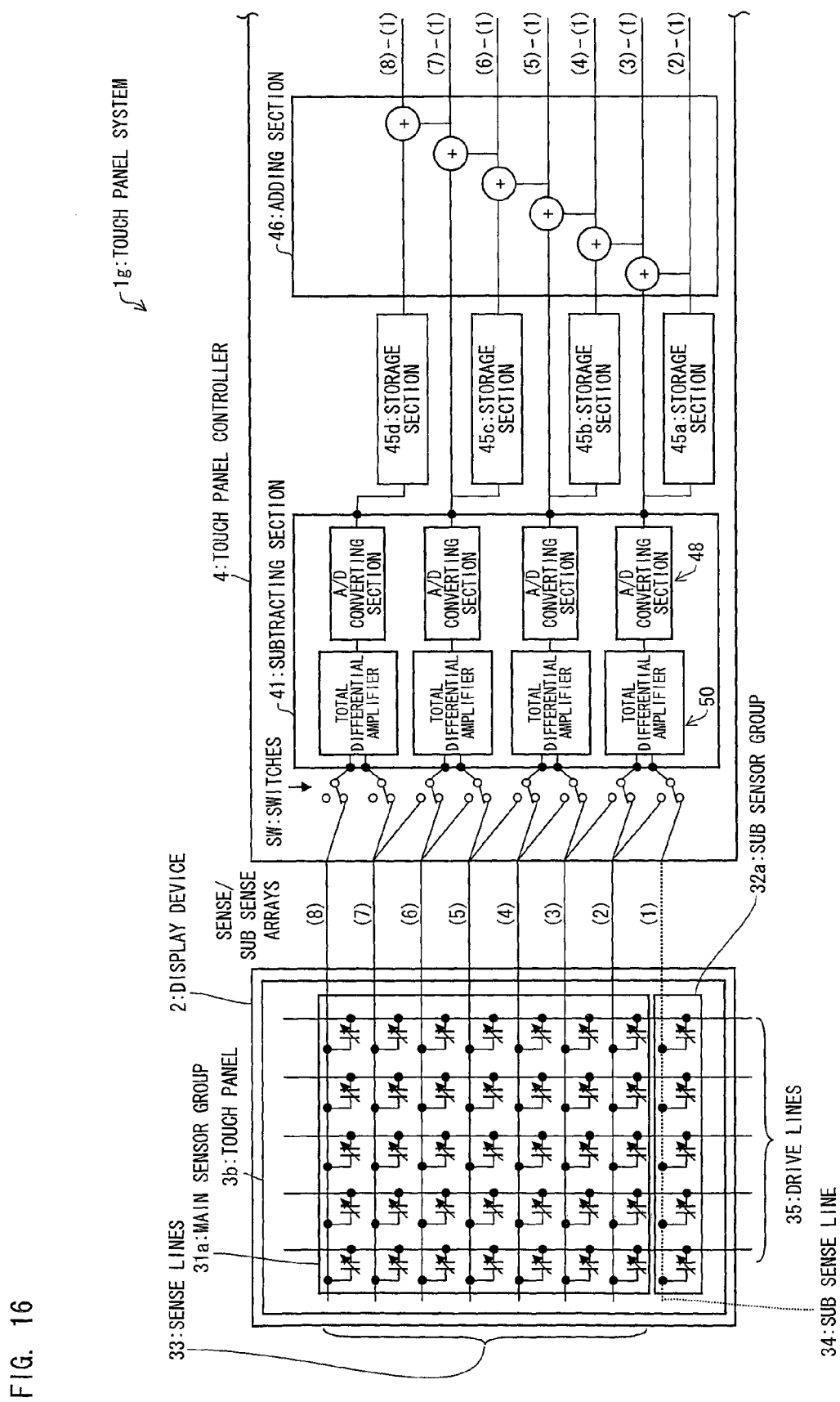
FIG. 16 is a view schematically illustrating a basic configuration of another touch panel system according to the present invention.

FIG. 16 is a view schematically illustrating a basic configuration of a touch panel system 1g according to the present embodiment. The touch panel system 1g includes a subtracting section 41 having a different configuration. The touch panel system 1g includes a total differential amplifier 50 instead of the differential amplifier 49 in the touch panel system 1f shown in FIG. 15.

Output signals supplied from sense lines 33 and a sub sense line 34 of a touch panel 3b are analog signals. Therefore, the subtracting section 41 includes a total differential amplifier 50 and an analog-to-digital converting section 48.

With this configuration, in the same manner as in the touch panel system 1b shown in FIG. 7, the total differential amplifier 50 performs subtracting operations on output signals (analog signals) supplied from the touch panel 3b, without converting the analog signals into digital signals. The analog-to-digital converting section 48 converts, into a digital signal, an analog signal thus obtained by the subtracting operations.

Figure 17:
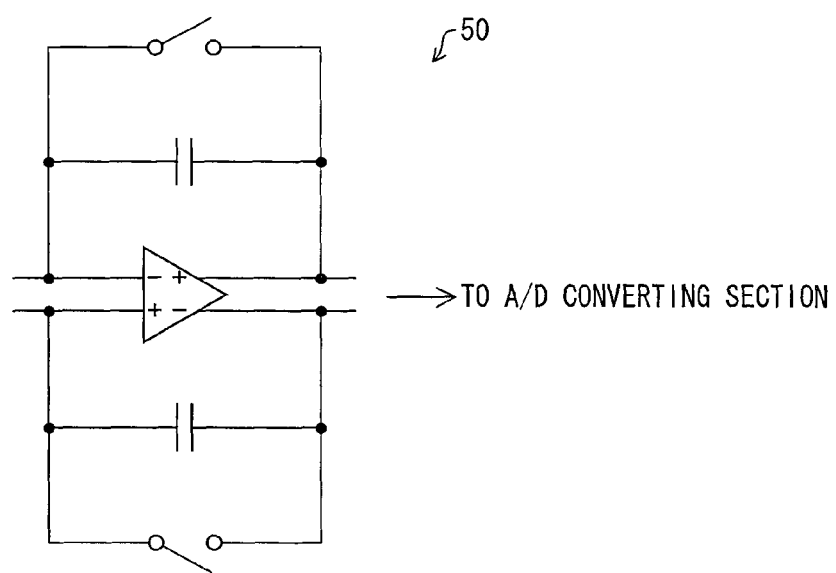
FIG. 17 is a circuit diagram showing one example of a total differential amplifier included in the touch panel system shown in FIG. 16.

FIG. 17 is a circuit diagram illustrating one example of the total differential amplifier 50. The total differential amplifier 50 includes two pairs each including a capacitance and a switch, the two pairs being arranged so as to be symmetric to each other with respect to a differential amplifier. Specifically, a non-inverting input terminal (+) and an inverting input terminal (−) of the differential amplifier are supplied with signals from sense lines 33 which are adjacent to each other. A capacitance (feedback capacitance) is provided between an inverting output terminal (−) and the non-inverting input terminal (+) of the differential amplifier so that the capacitance is connected with the inverting output terminal (−) and the non-inverting input terminal (+), and another capacitance (feedback capacitance) is provided between a non-inverting output terminal (+) and the inverting input terminal (−) of the differential amplifier so that said another capacitance is connected with the non-inverting output terminal (+) and the inverting input terminal (−), these capacitances having the same capacitance value. Furthermore, a switch is provided between the inverting output terminal (−) and the non-inverting input terminal (+) so that the switch is connected with the inverting output terminal (−) and the non-inverting input terminal (+), and another switch is provided between the non-inverting output terminal (+) and the inverting input terminal (−) so that said another switch is connected with the non-inverting output terminal (+) and the inverting input terminal (−).

Thus, the touch panel system 1g can remove a noise by (i) performing subtracting operations on analog signals outputted by the touch panel 3b, without converting the analog signals into digital signals, and thereafter (ii) converting the resulting signal into a digital signal.

Embodiment 9

Figure 18:
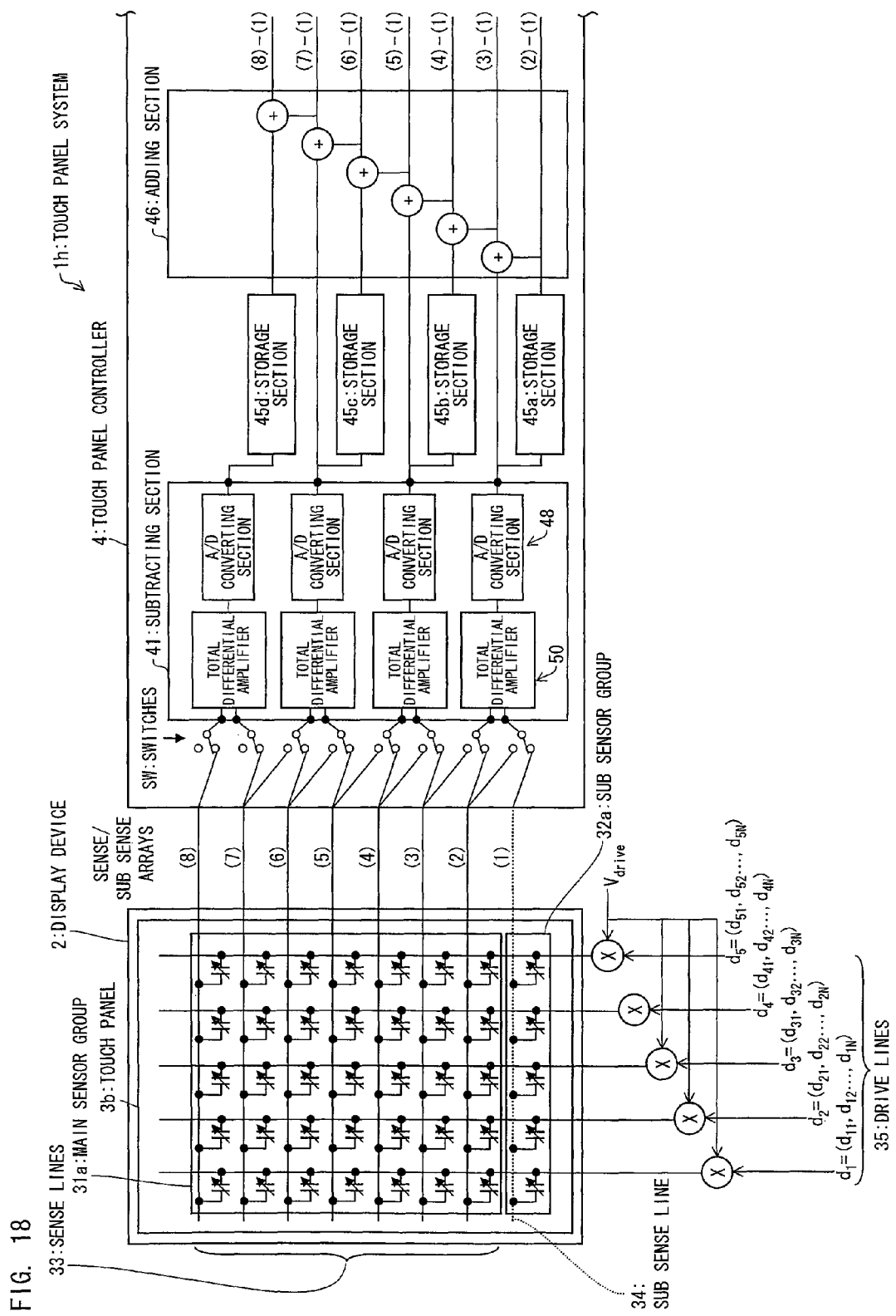
FIG. 18 is a view schematically illustrating a basic configuration of another touch panel system according to the present invention.
Figure 19:
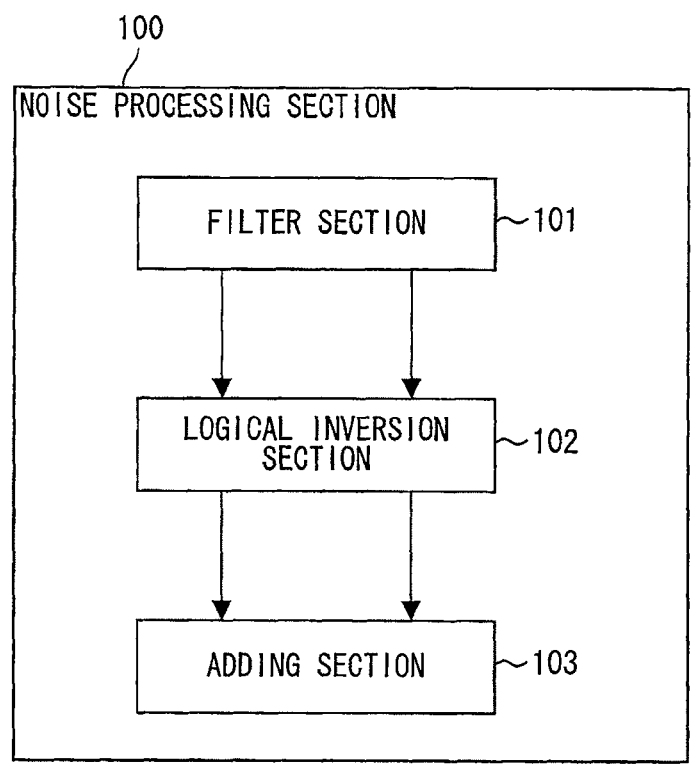
FIG. 19 is a block diagram illustrating a noise processing section provided in a touch panel system of Patent Literature 1.

FIG. 18 is a view schematically illustrating a basic configuration of a touch panel system 1h according to the present embodiment. The touch panel system 1h includes (i) a subtracting section 41 having a different configuration and involves (i) a different driving method of a touch panel 3b. The touch panel system 1h includes a total differential amplifier 50 instead of the differential amplifier 49 in the touch panel system 1f shown in FIG. 15.

Output signals supplied from sense lines 33 and a sub sense line 34 of the touch panel 3b are analog signals. Therefore, the subtracting section 41 includes a total differential amplifier 50 and an analog-to-digital converting section 48.

With this configuration, in the same manner as in the touch panel system 1b shown in FIG. 7, the total differential amplifier 50 performs subtracting operations on output signals (analog signals) supplied from the touch panel 3b, without converting the analog signals into digital signals. The analog-to-digital converting section 48 converts, into a digital signal, an analog signal thus obtained by the subtracting operations.

Further, the touch panel system 1h employs, as a driving method for the touch panel 3b, the orthogonal sequence driving method shown in FIGS. 10, 12, and 13. According to this configuration, as shown in FIG. 10, a voltage for driving four drive lines is applied as follows: In the second driving through the fourth driving, +V is applied twice and −V is also applied twice, i.e., the number of times of application of +V is equal to that of −V. On the other hand, in the first driving, +V is applied four times. Accordingly, an output value of an output sequence Y1 of the first driving is greater than that of each of output sequences Y2 through Y4 of the second driving through the fourth driving. Therefore, applying a dynamic range to the output value of any of the output sequences Y2 through Y4 of the second driving through the fourth driving causes saturation of the output sequence Y1 of the first driving.

In order to address this, the subtracting section 41 of the touch panel system 1h includes the total differential amplifier 50. Further, employed as the total differential amplifier 50 is the one whose input common-mode voltage range is rail to rail. Namely, the total differential amplifier 50 has a wide common-mode input range. Consequently, the total differential amplifier 50 can operate in a voltage range from a power source voltage (Vdd) to GND. Furthermore, a difference between input signals supplied to the total differential amplifier 50 is amplified. Therefore, regardless of the type of the orthogonal sequence driving method employed in the touch panel 3b which is combined with the touch panel system 1h, an output signal from the total differential amplifier 50 is free from the problem of output saturation. Note that one example of the total differential amplifier 50 is as previously described with reference to FIG. 17.

Thus, the touch panel system 1h can remove a noise by (i) performing subtracting operations on analog signals outputted by the touch panel 3b, without converting the analog signals into digital signals, and thereafter (ii) converting the resulting signal into a digital signal. Furthermore, since the touch panel system 1h includes the total differential amplifier 50 capable of rail-to-rail operation, an output signal from the total differential amplifier 50 is free from the problem of output saturation.

Embodiment 10

In Embodiments 1 through 9, a touch panel system provided with a sub sensor 32 (sub sense line 34) has been described. However, for a touch panel system of the present invention, the sub sensor 32 is not essential. In the present embodiment, a touch panel system not provided with a sub sensor 32 will be described.

Figure 20:
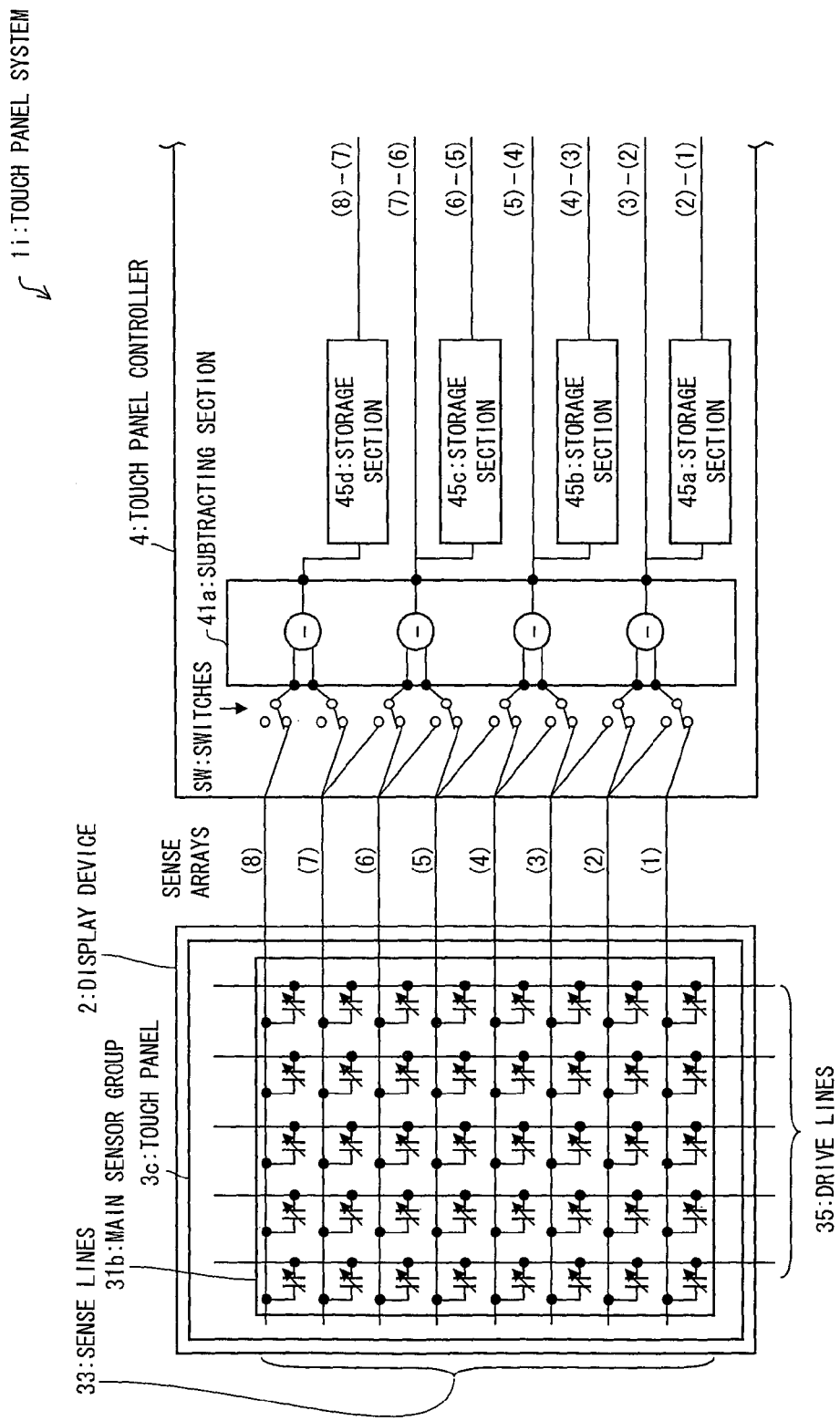
FIG. 20 is a view schematically illustrating a basic configuration of another touch panel system according to the present invention.

FIG. 20 is a view schematically illustrating a basic configuration of a touch panel system 1i of the present embodiment. The touch panel system 1i includes a subtracting section 41a for finding a difference signal of sense lines 33 adjacent to each other.

More specifically, a touch panel 3c includes a plurality of (in FIG. 20, five) drive lines 35 and a plurality of (in FIG. 20, eight) sense lines 33 intersecting the drive lines 35. The sense lines 33 and the drive lines 35 are isolated from each other, and the sense lines 33 and the drive lines 35 are coupled to each other via capacitances.

A touch panel controller 4 includes switches SW, the subtracting section 41a, storage sections 45a through 45d, which are arranged in this order from an input-receiving side of the touch panel controller 4. Note that the touch panel controller 4 also includes a coordinates detecting section 42 (not illustrated) and a CPU 43 (not illustrated) (see FIG. 1).

The subtracting section 41a includes input terminals (input terminals for outputs of main sensors) for receiving signals outputted by main sensors 31. The subtracting section 41a receives the signals from the main sensors 31. Then, the subtracting section 41a subtracts one of adjacent sense lines 33 from the other of the adjacent sense lines 33, so as to find a difference value (difference signal). The signal thus obtained as a result of the subtracting operation by the subtracting section 41a is outputted to the coordinates detecting section 42 (see FIG. 1).

Thus, the touch panel system 1i differs from the touch panel systems of the above-described embodiments in terms of that the touch panel system 1i is not provided with a sub sensor 32 (sub sense line 34) and the subtracting section 41a performs a different operation.

The switches SW select, from signals supplied from the sense lines 33, signals to be supplied to the subtracting section 41a. More specifically, each of the switches SW includes two terminals (upper and lower terminals), and selects one of the upper and lower terminals. FIG. 20 shows a state where the switches SW select the lower terminals.

The subtracting section 41a performs difference signal operations on, out of signals supplied from Arrays (1) through (8), signals selected by the switches SW. Specifically, the subtracting section 41a performs a difference signal operation between sense lines 33 which are adjacent to each other. For example, in a case where the switches SW select the lower terminals as shown in FIG. 20, the subtracting section 41a performs the following signal operations: Array (8)–Array (7); Array (6)–Array (5); Array (4)–Array (3); and Array (2)–Array (1). On the other hand, in a case where the switches SW select the upper terminals (not illustrated), the subtracting section 41a performs the following difference signal operations: Array (7)–Array (6); Array (5)–Array (4); and Array (3)–Array (2).

In a case where each of the switches SW selects one of the upper and lower terminals, the storage sections 45a through 45d store signals (difference operation signals) obtained by the difference operations performed by the subtracting section 41a. On the other hand, in a case where each of the switches SW selects the other one of the upper and lower terminals, difference operation signals are directly outputted, not via the storage sections 45a through 45d.

(2) Noise Processing Performed by Touch Panel System 1i

Figure 21:
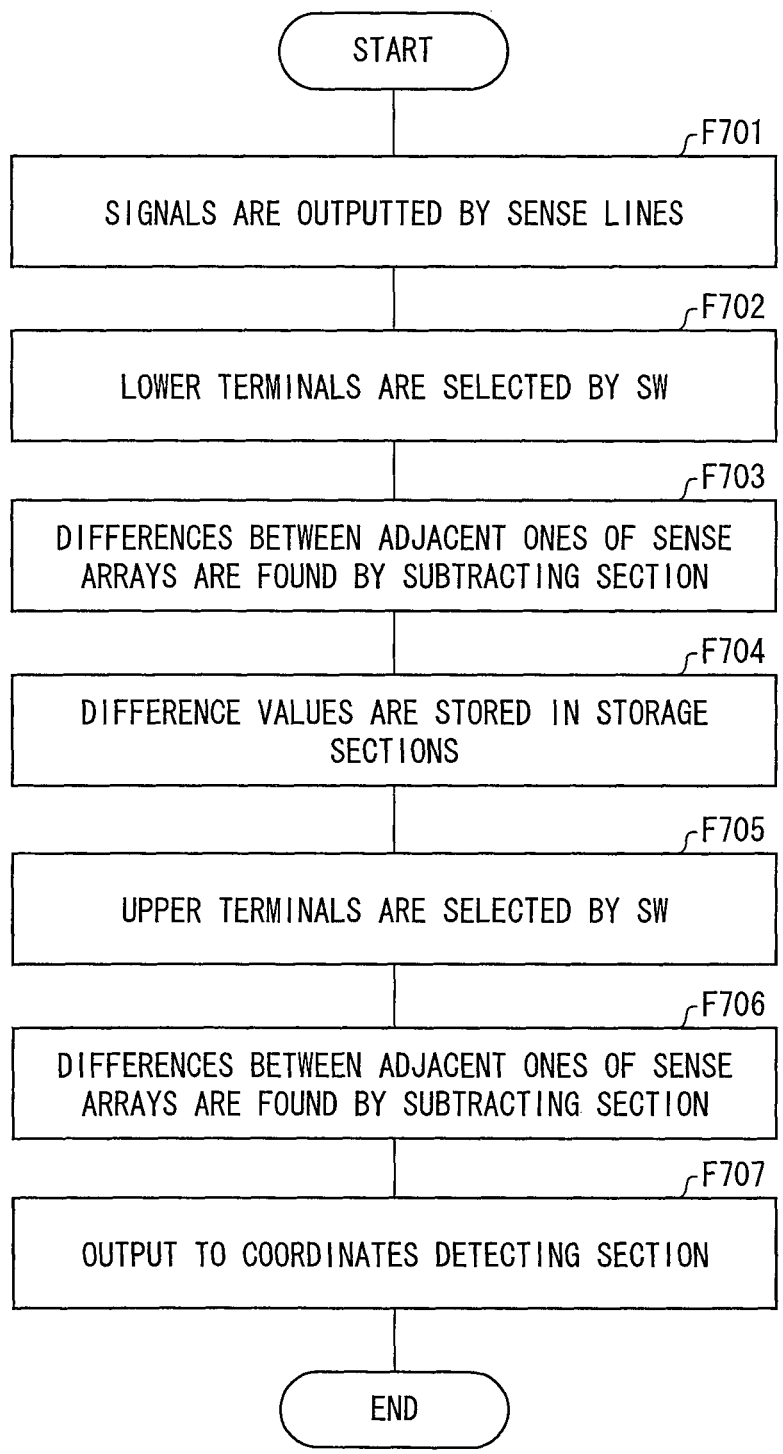
FIG. 21 is a flow chart illustrating a basic process of the touch panel system shown in FIG. 20.

With reference to FIGS. 20 and 21, the following will describe noise processing performed by the touch panel system 1i. FIG. 21 is a flow chart illustrating a noise canceling process, which is a basic process of the touch panel system 1i.

Upon activation of the touch panel system 1i, the drive line is supplied with an electric potential at a certain interval. The user's performing a touch operation on the touch panel 3c changes a capacitance of a specific sense line 33 corresponding to the touched position. Namely, the user's performing the touch operation on the touch panel 3c changes a value of an output signal supplied from that sense line 33. The touch panel system 1i outputs, to the touch panel controller 4, output signals from the sense lines 33, while driving the drive lines 35. Thus, while driving the drive lines 35, the touch panel system 1i detects a change in the capacitance of the sense line 33, so as to determine the presence or absence of a touch operation and a touched position.

To be more specific, a noise such as a clock generated in the display device 2 and other noises coming from the outside are reflected in the touch panel 3c. Therefore, a main sensor group 31b detects various kinds of noise components. Specifically, the output signal supplied from the sense line 33 includes not only a signal derived from the touch operation itself but also a noise signal (noise component) (F701).

Next, the switches SW select the lower terminals (F702). Then, the subtracting section 41a finds a difference (sense line (Sn+1)–sense line Sn: a first difference) between a sense line 33 (sense line Sn) and a sense line (sense line Sn+1) which is one of two sense lines 33 adjacent to the certain sense line 33 (F703).

For Arrays (1) through (8) shown in FIG. 20, the subtracting section 41a performs the following four difference signal operations:

Array (2)–Array (1) (The resulting difference value is referred to as "A".)
Array (4)–Array (3) (The resulting difference value is referred to as "C".)
Array (6)–Array (5) (The resulting difference value is referred to as "E".)
Array (8)–Array (7) (The resulting difference value is referred to as "G".)

Namely, in the step F703, the subtracting section 41a performs the difference signal operations on Arrays (1) through (8) of the sense lines 33.

The difference values A, C, E, and G found by the subtracting section 41a are stored in the storage sections 45a through 45d, respectively. Namely, the storage section 45a stores the difference value A, the storage section 45b stores the difference value C, the storage section 45c stores the difference value E, and the storage section 45d stores the difference value G (F704).

Next, the switches SW selecting the lower terminals are turned to select (close) the upper terminals (F705). Then, the subtracting section 41a performs an operation similar to that of F703. Specifically, the subtracting section 41a performs a difference signal operation (sense line Sn−(Sn−1): a second difference) between the sense line 33 (sense line Sn) and a sense line (sense line Sn−1) which is the other one of the two sense lines 33 adjacent to the certain sense line 33 (F706).

For Arrays (1) through (8) shown in FIG. 20, the subtracting section 41a performs the following three difference signal operations:

Array (3)−Array (2) (The resulting difference value is referred to as "B".)
Array (5)−Array (4) (The resulting difference value is referred to as "D".)
Array (7)−Array (6) (The resulting difference value is referred to as "F".)

Namely, in the step F706, the subtracting section 41a performs the difference signal operations on Arrays (2) through (7).

As described above, the touch panel system 1i obtains a difference signal value between sense lines 33 adjacent to each other. Namely, a difference is found between the adjacent sense lines 33, which have a higher correlation in terms of noise. This removes the noise component from the output signal supplied from the main sensor group 31b, thereby extracting the signal derived from the touch operation itself. This makes it possible to reliably remove (cancel) a wide variety of noises reflected in the touch panel 3c.

Embodiment 11

Figure 22:
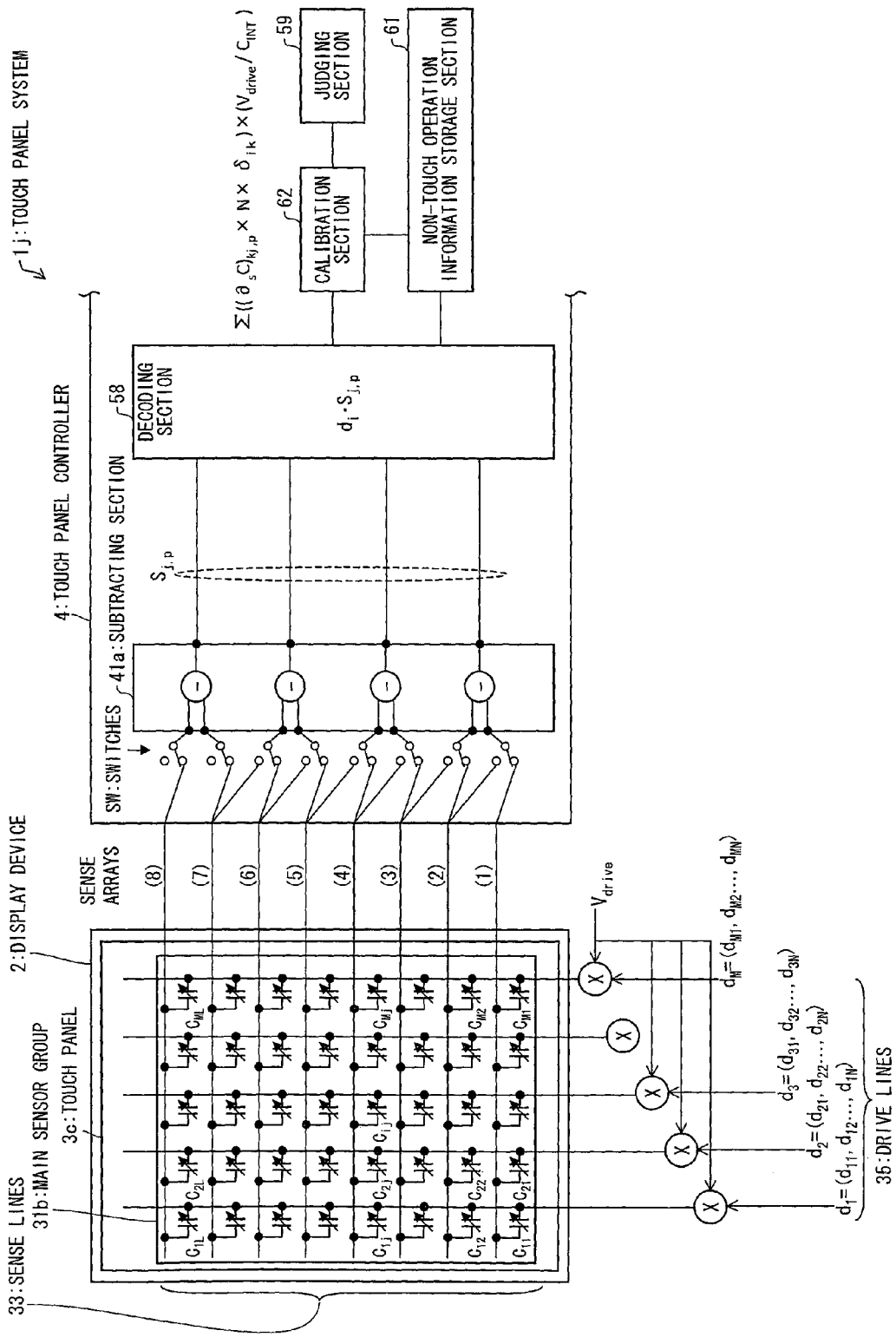
FIG. 22 is a view schematically illustrating a basic configuration of another touch panel system according to the present invention.

FIG. 22 is a view schematically illustrating a basic configuration of a touch panel system 1j of the present embodiment. The touch panel system 1j is configured by employing, in the above-described touch panel system 1i having the noise canceling function shown in FIG. 20, a drive line driving circuit (not illustrated) for parallel driving the drive lines 35. Further, the touch panel system 1j includes (i) a decoding section 58 for decoding difference values of capacitances which difference values are found by a subtracting section 41a, (ii) a non-touch operation information storage section 61 for storing a distribution of differences between the capacitances which differences are decoded by the decoding section 58 when no touch operation is performed, and (iii) a calibration section 62 for calibrating a distribution of differences between the capacitances which differences are decoded by the decoding section 58 when a touch operation is performed. Since the touch panel system 1j operates in the same manner as the above-described touch panel system 1i, explanations thereof are omitted here. The following descriptions focus on processes performed by the subtracting section 41a, the decoding section 58, the non-touch operation information storage section 61, and the calibration section 62. Further, the following descriptions deal with an example where orthogonal sequences or M sequences are used as code sequences for parallel driving.

Concretely, assume that code sequences (a component is 1 or −1) for parallel driving the first drive line through the Mth drive line are as follows:

$$d_1 = (d_{11}, d_{12}, \ldots, d_{1N})$$

$$d_2 = (d_{21}, d_{22}, \ldots, d_{2N})$$

$$\ldots$$

$$d_M = (d_{M1}, d_{M2}, \ldots, d_{MN})$$

Hereinafter, the code sequences are assumed as orthogonal sequences or M sequences having a code length N (=2^n−1), having been shifted. Such sequences have a nature of establishing the following formula:

$$d_i \cdot d_j = \sum_{k=1}^{N} d_{ik} \times d_{jk} = N \times \delta_{ij}$$

where if $d_1$ to $d_M$ is an orthogonal sequence, $\delta_{ij}=1$ if i=j, 0 if i≠j,
if $d_1$ to $d_M$ is an M sequence, $\delta_{ij}=1$ if i=j, −1/N if i≠j.

Difference output sequences "$S_{j,P}$ (j=1, ..., [L/2], P 1,2) (L indicates the number of sense lines 33, [n]=an integer part of n)" of sense lines 33, which difference output sequences correspond to the aforementioned sequences, are defined as follows:

$S_{j,1}$: An output sequence for $d_1$ through $d_M$ when the switches SW select the lower terminals.

$S_{j,2}$: An output sequence for $d_1$ through $d_M$ when the switches SW select the upper terminals.

Further, a distribution of differences "$(\partial sC)_{kj,P}$ (k=1, ..., M; j=1, ..., [L/2]; P=1, 2)" of capacitance values in a direction in which each of the drive lines 35 extends (in a direction in which the sense lines 33 are arranged) is defined as follows:

$$(\partial sC)_{kj,1} = C_{k,2j} - C_{k,2j-1}$$

$$(\partial sC)_{kj,2} = C_{k,2j+1} - C_{k,2j}$$

In this case, a difference output of capacitances in the direction in which each of the drive lines 35 extends obtained by parallel driving is as follows:

$$S_{j,p} = (s_{j1,p}, s_{j2,p}, \ldots, s_{jN,p})$$

$$= \left( \sum_{k=1}^{M} (\partial_s C)_{kj,p} \times d_{k1}, \sum_{k=1}^{N} (\partial_s C)_{kj,p} \times d_{k2}, \ldots, \sum_{k=1}^{N} (\partial_s C)_{kj,p} \times d_{kN} \right) \times (V_{drive} / C_{INT})$$

$$= \left( \sum_{k=1}^{M} (\partial_s C)_{kj,p} \times (d_{k1}, d_{k2}, \ldots, d_{kN}) \right) \times (V_{drive} / C_{INT})$$

$$= \sum_{k=1}^{M} (\partial_s C)_{kj,p} \times d_k) \times (V_{drive} / C_{INT})$$

The decoding section 58 decodes the difference values of the capacitances which differences value are found by the subtracting section 41a (i.e., the distribution of differences between the capacitance values in the direction in which each of the drive lines 35 extend). Specifically, the decoding section 58 finds inner products of (i) the code sequences for parallel driving the drive lines 35 and (ii) difference output sequences of the sense lines 33, which difference output sequences correspond to the aforementioned sequences. Therefore, an inner product value decoded by the decoding section 58 is expressed as follows:

$$d_i \cdot s_{j,P} = d_i \sum_{k=1}^{N} ((\partial_s C)_{kj,P} \times d_k) \times (V_{drive} / C_{INT})$$

$$= \sum_{k=1}^{N} ((\partial_s C)_{kj,P} \times d_i \cdot d_k) \times (V_{drive} / C_{INT})$$

$$= \sum_{k=1}^{N} ((\partial_s C)_{kj,P} \times N \times \delta_{ik}) \times (V_{drive} / C_{INT})$$

where $$d_i \cdot d_j = \sum_{k=1}^{N} d_{ik} \times d_{jk} = N \times \delta_{ij},$$

and
if $d_1$ to $d_M$ is an orthogonal sequence, $\delta_{ij}=1$ if i=j, 0 if i≠j
if $d_1$ to $d_M$ is an M sequence, $\delta_{ij}=1$ if i=j, $-1/N$ if i≠j.

Thus, the decoding section 58 finds, as a main component of the decoded inner product value $d_i \cdot s_{j,P}$, an N-folded distribution of differences $(\partial sC)_{kj,P}$ between the capacitance values in the direction in which each of the drive lines 35 extends. Accordingly, by regarding an estimate value of the distribution of differences $(\partial sC)_{ij,P}$ between the capacitance values in the direction in which each of the drive lines 35 extends as the inner product value $d_i \cdot s_{j,P}$, it is possible to read signal strengths of the capacitance values which signal strengths have been multiplied by N (i.e., multiplied by a code length).

Meanwhile, as described above, by defining the difference output sequences $S_{j,P}$ (P=1, 2) of the sense lines 33, a common mode noise superimposed in common on sense lines 33 adjacent to each other is canceled. This makes it possible to read a difference capacitance with a high SNR.

As described above, according to the touch panel system 1j, the touch panel 3c is parallel driven, and the decoding section 58 decodes the values of the differences between the capacitances which values are found by the subtracting section 41a. Consequently, signals of the capacitances are multiplied by a code length (i.e., multiplied by N). Therefore, signal strengths of the capacitances are increased, regardless of the number of drive lines 35. Further, provided that necessary signal strengths are merely equal to those of the conventional driving method shown in FIG. 9, it is possible to reduce a driving period for the drive lines 35 to one-Nth of that of the driving method shown in FIG. 9. Namely, it is possible to reduce the number of times that the drive lines 35 should be driven. This makes it possible to reduce electric power consumption of the touch panel system 1j.

Preferably, the touch panel system 1j is configured such that the calibration section 62 subtracts (i) differences between respective pairs of the sense lines 33 adjacent to each other (=a distribution of difference values in the entire touch panel) which differences are found when no touch operation is performed from (ii) differences between the respective pairs of the sense lines 33 adjacent to each other (i.e., a distribution of difference values in the entire touch panel 3c) which differences are found when a touch operation is performed. Namely, it is preferable that (i) such the difference signal operation is performed before and after a touch operation and (ii) subtraction is performed between difference value signals obtained before and after the touch operation. For example, the non-touch operation information storage section 61 stores an estimated value of a distribution of differences $(\partial sC)_{kj,P}$ found in an initial state where no touch operation is performed (when no touch operation is performed). Then, the calibration section 62 subtracts (i) the estimated value of the distribution of the differences $(\partial sC)_{kj,P}$ found when no touch operation is performed, which estimated value is stored in the non-touch operation information storage section 61, from (ii) an estimated value of a distribution of differences $(\partial sC)_{kj}$ found when a touch operation is performed. Thus, the calibration section 62 subtracts (i) the distribution of the differences between capacitances found when no touch operation is performed which distribution is stored in the non-touch operation information storage section from (ii) the distribution of differences between the capacitances found when a touch operation is performed (i.e., the difference value signal found when a touch operation is performed–the difference value signal found when no touch operation is performed). This makes it possible to cancel an offset inherent in the touch panel 3c.

Thus, the touch panel system 1j is free from a difference component resulting from a variation in capacitances which variation is inherent in the touch panel 3c. Consequently, only a difference component resulting from the touch operation is detected. In the case of the M sequence, an error component ($\delta_{ij}=-1/N$ if else i≠j) mixes therein, which does not occur in the case of the orthogonal sequence. However, this error component results only from the touch operation. Therefore, if N is increased (e.g., N=63 or 127), a degree of deterioration of SNR becomes smaller.

Embodiment 12

Figure 23:
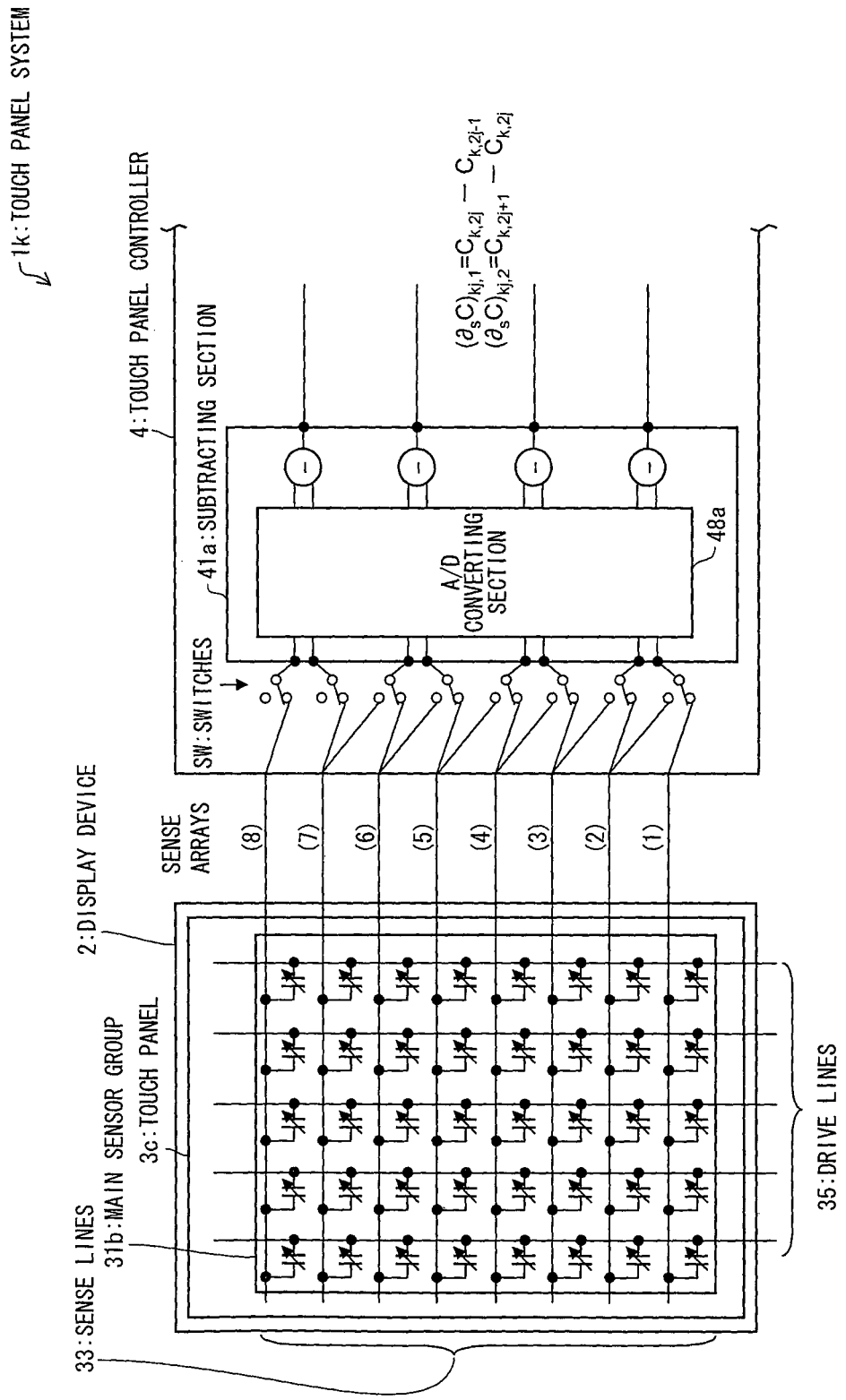
FIG. 23 is a view schematically illustrating a basic configuration of another touch panel system according to the present invention.

FIG. 23 is a view schematically illustrating a basic configuration of a touch panel system 1k of the present embodiment. The touch panel system 1k includes a subtracting section 41a having a different configuration.

Output signals supplied from sense lines 33 of a touch panel 3c are analog signals. Therefore, the subtracting section 41a includes an analog-to-digital converting section (third analog-to-digital converting section) 48a and a digital subtracter (not illustrated).

With this configuration, output signals (analog signals) supplied from the touch panel 3c are converted into digital signals by the analog-to-digital converting section 48a of the subtracting section 41a. The digital subtracter performs, by use of the digital signals thus converted, subtracting operations in the same manner as in the touch panel systems 1i and 1j shown in FIG. 20.

Thus, the touch panel system 1k can remove a noise by (i) converting, into digital signals, analog signals outputted by the touch panel 3c and thereafter (ii) performing subtracting operations.

Embodiment 13

Figure 24:
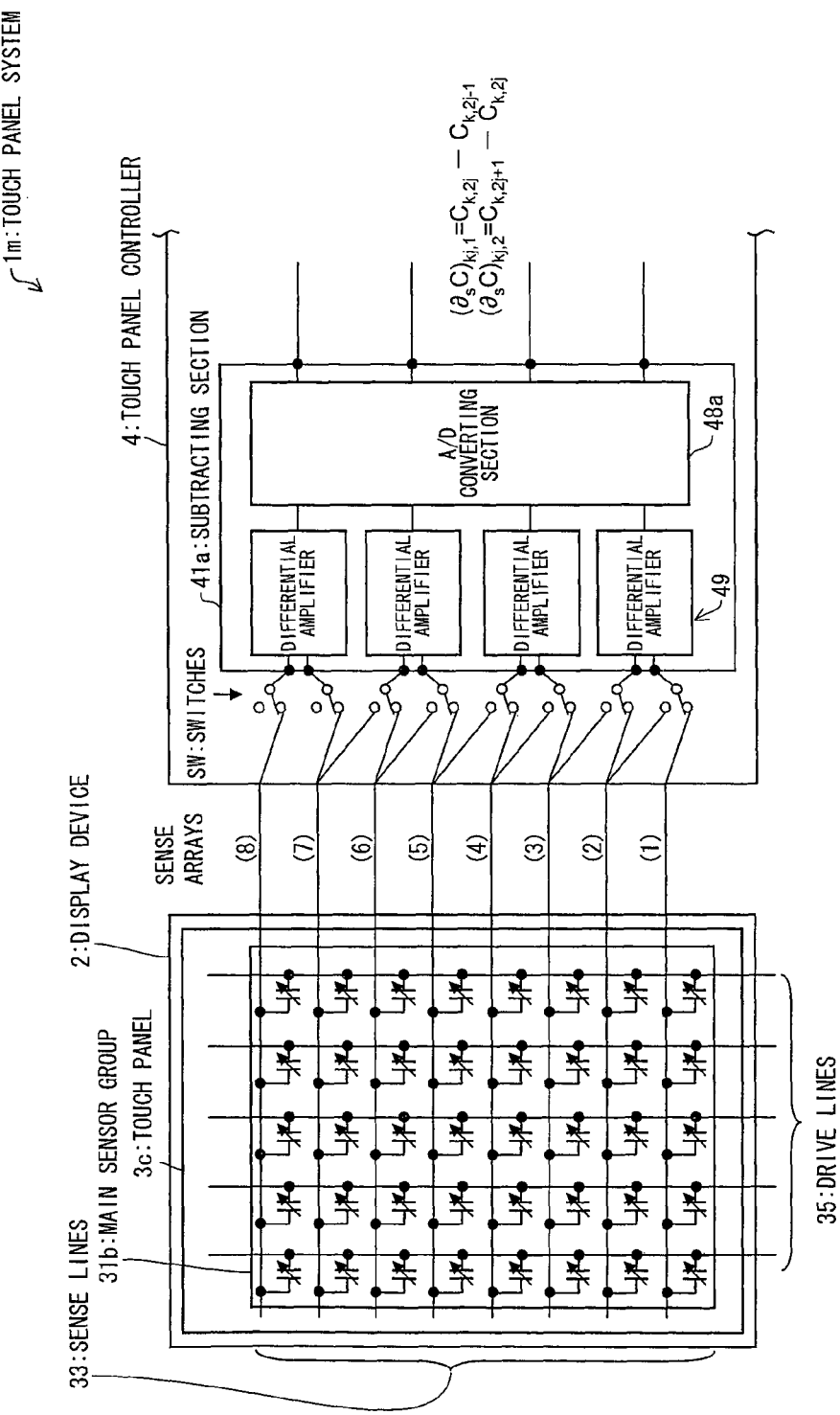
FIG. 24 is a view schematically illustrating a basic configuration of another touch panel system according to the present invention.

FIG. 24 is a view schematically illustrating a basic configuration of a touch panel system 1m of the present embodiment. The touch panel system 1m includes a subtracting section 41a having a different configuration.

Output signals supplied from sense lines 33 of a touch panel 3c are analog signals. Therefore, the subtracting section 41a includes a differential amplifier 49 and an analog-to-digital converting section 48a (fourth analog-to-digital converting section).

With this configuration, in the same manner as in the touch panel system 1i shown in FIG. 20, the differential amplifier 49 performs subtracting operations on output signals (analog signals) supplied from the touch panel 3c, without converting the analog signals into digital signals. The analog-to-digital converting section 48a converts, into a digital signal, an analog signal thus obtained by the subtracting operations.

Thus, the touch panel system 1m can remove a noise by (i) performing subtracting operations on analog signals outputted by the touch panel 3c, without converting the analog signals into digital signals, and thereafter (ii) converting the resulting signal into a digital signal.

Embodiment 14

Figure 25:
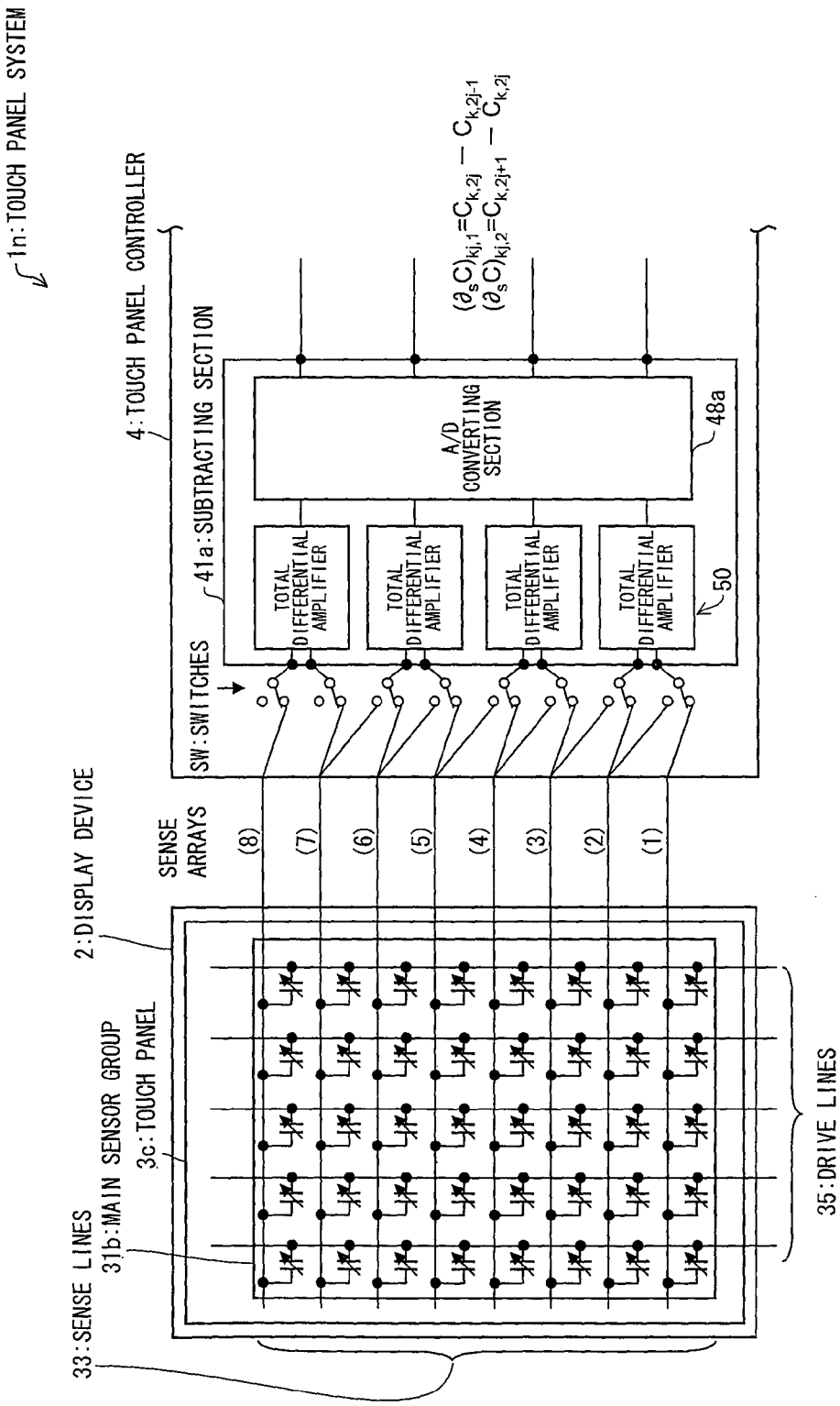
FIG. 25 is a view schematically illustrating a basic configuration of another touch panel system according to the present invention.

FIG. 25 is a view schematically illustrating a basic configuration of a touch panel system 1n of the present embodiment. The touch panel system 1n includes a subtracting section 41a having a different configuration. The touch panel system 1n includes a total differential amplifier 50 instead of the differential amplifier 49 in the touch panel system 1m shown in FIG. 24.

Output signals supplied from sense lines 33 of a touch panel 3c are analog signals. Therefore, the subtracting section 41a includes the total differential amplifier 50 and an analog-to-digital converting section 48a.

With this configuration, in the same manner as in the touch panel system 1i shown in FIG. 20, the total differential amplifier 50 performs subtracting operations on output signals (analog signals) from the touch panel 3c, without converting the analog signals into digital signals. The analog-to-digital converting section 48a converts, into a digital signal, an analog signal thus obtained by the subtracting operations.

Thus, the touch panel system 1n can remove a noise by (i) performing subtracting operations on analog signals outputted by the touch panel 3c, without converting the analog signals into digital signals, and thereafter (ii) converting the resulting signal into a digital signal.

Embodiment 15

Figure 26:
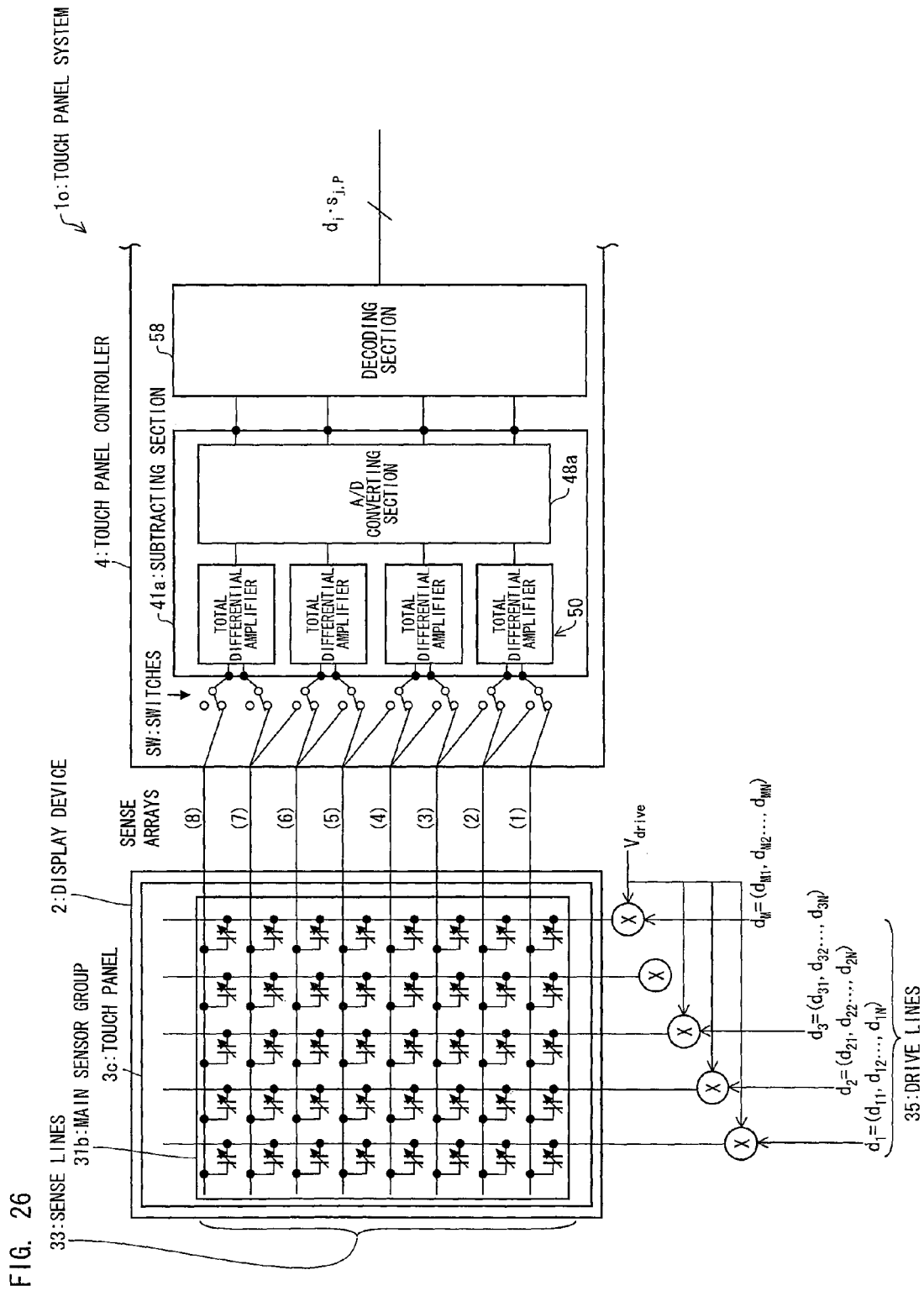
FIG. 26 is a view schematically illustrating a basic configuration of another touch panel system according to the present invention.

FIG. 26 is a view schematically illustrating a basic configuration of a touch panel system 1o of the present embodiment. The touch panel system 1o includes a subtracting section 41a having a different configuration. The touch panel system 1o includes a total differential amplifier 50 instead of the differential amplifier 49 in the touch panel system 1m shown in FIG. 26.

Output signals supplied from sense lines 33 of a touch panel 3c are analog signals. Therefore, the subtracting section 41a includes the total differential amplifier 50 and an analog-to-digital converting section 48a.

With this configuration, in the same manner as in the touch panel system 1i shown in FIG. 20, the total differential amplifier 50 performs subtracting operations on output signals (analog signals) from the touch panel 3c, without converting the analog signals into digital signals. The analog-to-digital converting section 48a converts, into a digital signal, an analog signal thus obtained by the subtracting operations.

Further, the touch panel system 1o employs, as a driving method for the touch panel 3c, the orthogonal sequence driving method shown in FIGS. 10, 12, and 22. According to this configuration, as shown in FIG. 10, a voltage for driving four drive lines is applied as follows: In the second driving through the fourth driving, +V is applied twice and −V is also applied twice, i.e., the number of times of application of +V is equal to that of −V. On the other hand, in the first driving, +V is applied four times. Accordingly, an output value of an output sequence Y1 of the first driving is greater than that of each of output sequences Y2 through Y4 of the second driving through the fourth driving. Therefore, adding a dynamic range to the output values of the output sequences Y2 through Y4 of the second driving through the fourth driving causes saturation of the output sequence Y1 of the first driving.

In order to address this, the subtracting section 41a of the touch panel system 1o includes the total differential amplifier 50.

Further, employed as the total differential amplifier 50 is the one whose input common-mode voltage range is rail to rail. Namely, the total differential amplifier 50 has a wide common-mode input range. Consequently, the total differential amplifier 50 can operate in a voltage range from a power source voltage (Vdd) to GND. Furthermore, a difference between input signals supplied to the total differential amplifier 50 is amplified. Therefore, regardless of the type of the orthogonal sequence driving method employed in the touch panel 3c which is combined with the touch panel system 1o, an output signal from the total differential amplifier 50 is free from the problem of output saturation. Note that one example of the total differential amplifier 50 is as previously described with reference to FIG. 17.

Thus, the touch panel system 1o can remove a noise by (i) performing subtracting operations on analog signals outputted by the touch panel 3c, without converting the analog signals into digital signals, and thereafter (ii) converting the resulting signal into a digital signal. Furthermore, since the touch panel system 1o includes the total differential amplifier 50 capable of rail-to-rail operation, an output signal from the total differential amplifier 50 is free from the problem of output saturation.

Embodiment 16

Next, the following will describe a method for detecting a touch operation, which method is employed in the touch panel systems of the above-described embodiments. The following descriptions deal with, as an example, the touch panel system 1j of FIG. 22. However, the touch panel systems of other embodiments perform the same operation. The touch panel system 1j includes a judging section 59 for determining the presence or absence of a touch operation based on a comparison of (i) a difference between signals of sense lines 33 adjacent to each other which difference is found by the subtracting section 41a and the decoding section 58, and (ii) positive and negative threshold values. Note that the judging section 59 is supplied with (i) a signal (a distribution of differences between capacitances) having been subjected to a calibration process by the calibration section 62 or (ii) a signal (a distribution of differences between capacitances) having not been subjected to a calibration process by the calibration section 62. In the case where the signal having not been subjected to the calibration process by the calibration section 62 is inputted to the judging section 59, a distribution of differences between the capacitances which distribution has been decoded by the decoding section 58 is directly inputted to the judging section 59. The following will describe the case where the signal having not been subjected to the calibration process by the calibration section 62 is inputted to the judging section 59. However, the same operation is performed also in the case where the signal having been subjected to the calibration process is inputted to the judging section 59.

Figure 27:
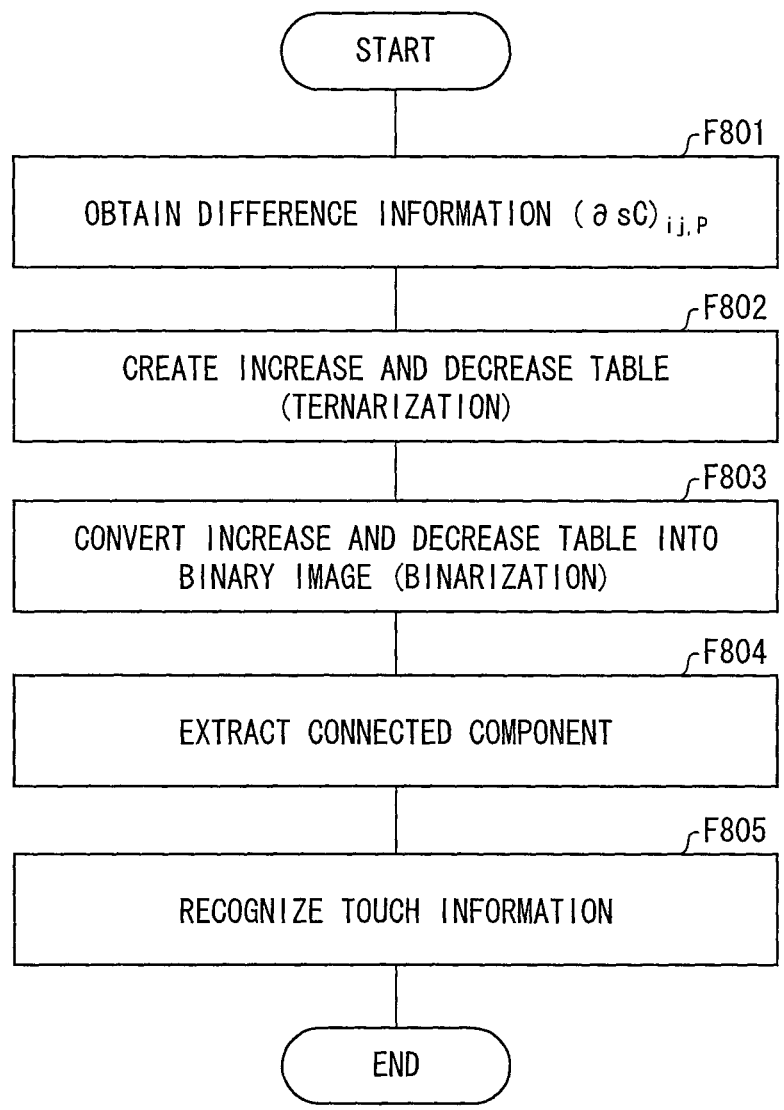
FIG. 27 is a flow chart illustrating a basic process of a judging section in the touch panel system shown in FIG. 22.

FIG. 27 is a flow chart illustrating a basic process of the judging section 59 in the touch panel system 1j shown in FIG. 22. FIG. 28 is a view schematically illustrating a method of recognizing touch information in the flow chart shown in FIG. 27.

As shown in FIG. 27, the judging section 59 first obtains values of differences in signal between respective pairs of sense lines adjacent to each other (difference information) "$(\partial sC)_{ij,P}$" which values are found by the subtracting section 41a and the decoding section 59 (F801). Next, the judging section 59 compares the values of the differences with a positive threshold value THp and a negative threshold value THm, each of which is stored in the judging section 59, so as to create an increase and decrease table (F802). This increase and decrease table is, for example, a ternary increase and decrease table as shown in (a) of FIG. 28.

Next, the ternary increase and decrease table is converted into a binary image (i.e., binarized) (F803). For example, in a case where the increase and decrease table shown in (a) of FIG. 28 is scanned in the order from a sense line S1 to a sense line S7 (in a direction toward the right in FIG. 28), the following operation is carried out: In the increase and decrease table, if the value "+" is scanned, the value therein and subsequent value(s) are all converted into "1" until the value "−" is scanned next. Meanwhile, if the value "−" is scanned, the scanning is performed in a direction opposite to the scanning direction (in a direction toward the left in FIG. 28) and the value therein is surely converted into "1". In this manner, binarized data as shown in (b) of FIG. 28 is obtained.

Next, in order to extract touch information from the binarized data, a connected component is extracted (F804). For example, in (b) of FIG. 28, if the values "1" are arranged side by side on drive lines adjacent to each other and on a single sense line, (i) a connected component including one of such the values "1" and (ii) a connected component including the other one of such the values "1" are regarded as a single connected component, which is set as a candidate of a touched position. Namely, each of the boxed parts including the values "1" in (c) of FIG. 28 is regarded as a single connected component, and is extracted as a candidate of a touched position.

Lastly, based on the extracted candidates of the touched position, touch information (the size, position, etc. of the touch) is recognized (F805).

Thus, based on a difference between signals of sense lines 33 adjacent to each other from which difference a noise signal has been removed, the judging section 59 determines the presence or absence of a touch operation. This makes it possible to accurately determine the presence or absence of the touch operation.

Furthermore, in the above-described example, based on a comparison of (i) the differences in signals between the respective pairs of sense lines 33 adjacent to each other which differences are found by the subtracting section 41a and (ii) the positive and negative threshold values (THp, THm), the judging section 59 creates the increase and decrease table indicating, in ternary, the distribution of the differences in signal between the sense lines 33, and converts the increase and decrease table into the binary image. Namely, the differences in signals between the respective pairs of sense lines 33 adjacent to each other from which differences the noise signal has been removed are inputted to the judging section 59. The judging section 59 compares (i) the differences in signals between the respective pairs of sense lines 33 adjacent to each other and (ii) the positive and negative threshold values (THp, THm) stored in the judging section 59, so as to create the increase and decrease table indicating, in ternary, the distribution of the differences in signal between the sense lines 33. Further, the judging section 59 binarizes the increase and decrease table, so that the increase and decrease table is converted into the binary image. Consequently, from the binary image thus converted, the candidates of the touched position are extracted. Thus, by recognizing the touch information (the size, position, etc. of the touch) based on the binary image, it is possible not only to determine the presence or absence of the touch operation but also to recognize the touch information more accurately.

Embodiment 17

Figure 29:
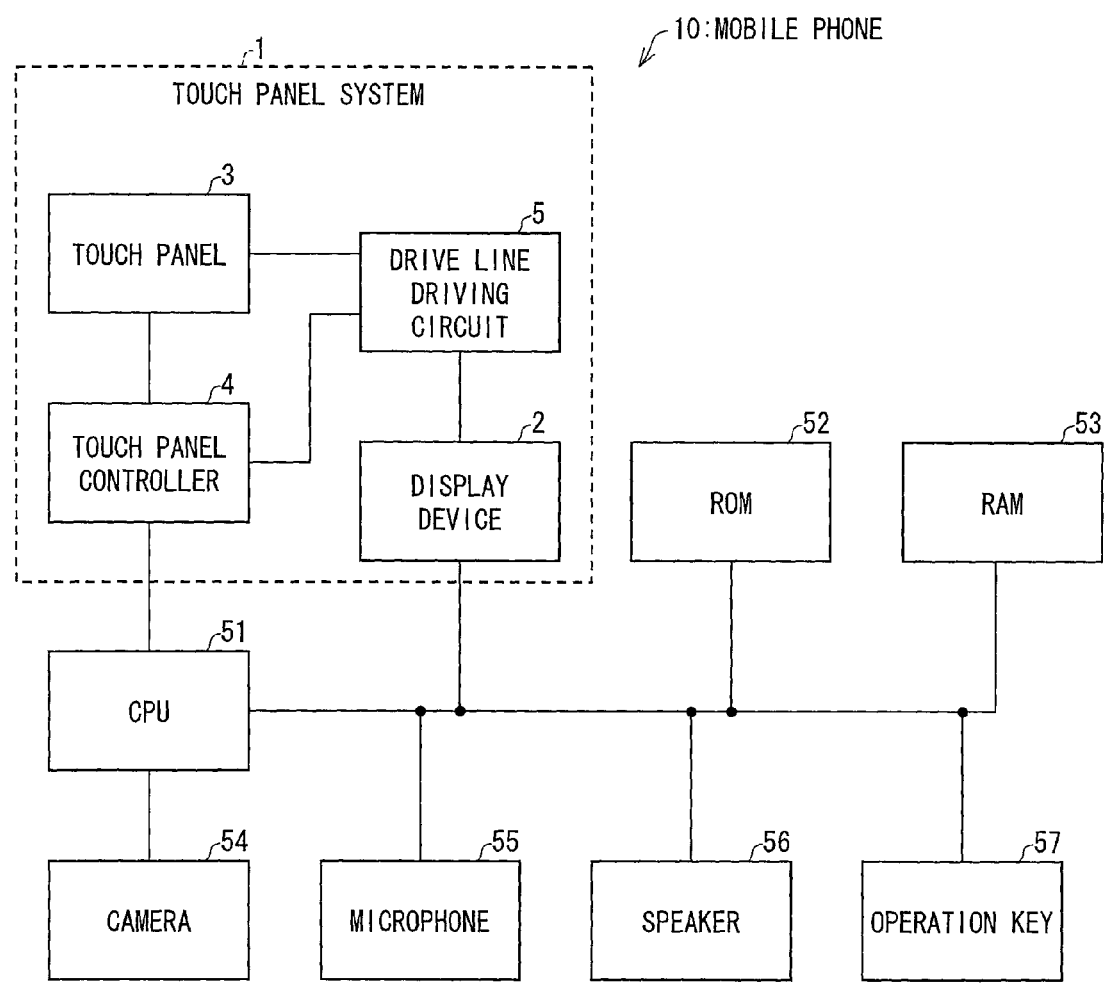
FIG. 29 is a functional block diagram illustrating a configuration of a mobile phone including the touch panel system.

FIG. 29 is a functional block diagram illustrating a configuration of a mobile phone 10 including a touch panel system 1. The mobile phone (electronic device) 10 includes a CPU 51, a RAM 53, a ROM 52, a camera 54, a microphone 55, a speaker 56, an operation key 57, and the touch panel system 1. These elements are connected with each other via data bus.

The CPU 51 controls operation of the mobile phone 10. The CPU 51 executes, for example, a program stored in the ROM 52. The operation key 57 receives an instruction entered by a user of the mobile phone 10. The RAM 53 stores, in a volatile manner, data generated as a result of the CPU 51's executing the program or data inputted via the operation key 57. The ROM 52 stores data in an involatile manner.

Further, the ROM 52 is a ROM into which data can be written and from which data can be deleted, for example, an EPROM (Erasable Programmable Read-Only Memory) or a flash memory. The mobile phone 10 may be configured to include an interface (IF) (not illustrated in FIG. 29) which allows the mobile phone 10 to be connected with another electronic device via a wire.

The camera 54 takes an image of a subject in response to the user's operation on the operation key 57. The obtained image data of the subject is stored in the RAM 53 or an external memory (e.g., a memory card). The microphone accepts an inputted voice of the user. The mobile phone 10 binarizes the inputted voice (analog data). Then, the mobile phone 10 transmits the binarized voice to a receiver (e.g., to another mobile phone). The speaker 56 outputs, for example, sounds based on music data stored in the RAM 53.

The touch panel system 1 includes a touch panel 3, a touch panel controller 4, a drive line driving circuit 5, and a display device 2. The CPU 51 controls operation of the touch panel system 1. The CPU 51 executes, for example, a program stored in the ROM 52. The RAM 53 stores, in a volatile manner, data generated as a result of the CPU 51's executing the program. The ROM 52 stores data in an involatile manner.

The display device 2 displays an image stored in the ROM 52 or the RAM 53. The display device 2 is stacked on the touch panel 3 or includes the touch panel 3.

Embodiment 18

The touch panel system described in the foregoing embodiments may further include configurations as described below.

Described below is an embodiment related to a touch panel system of the present invention, with respect to FIG. 30 to FIG. 40.

(Configuration of Touch Panel System 71a)

Figure 30:
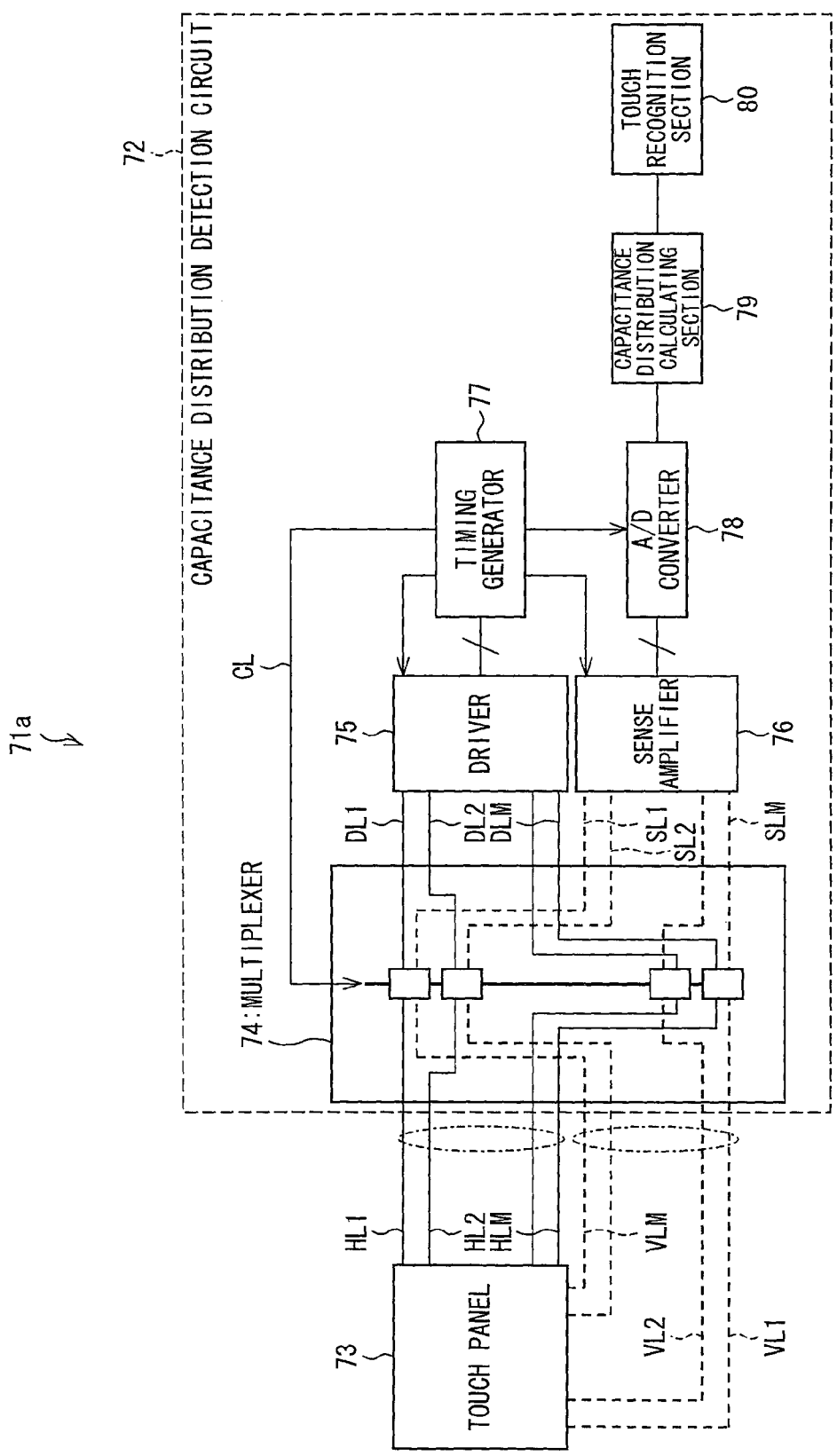
FIG. 30 is a block diagram illustrating a configuration of a touch panel system according to Embodiment 18.
Figure 31:
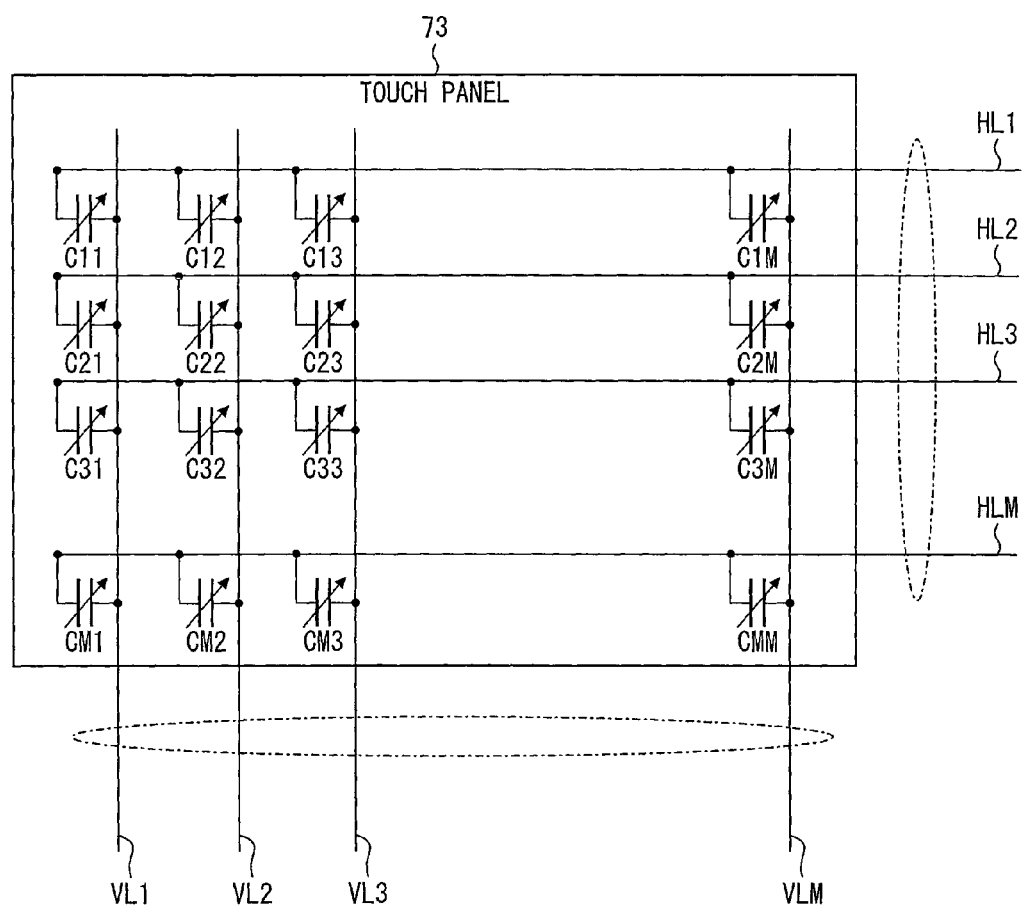
FIG. 31 is a schematic view illustrating a configuration of a touch panel provided in the touch panel system.
Figure 32:
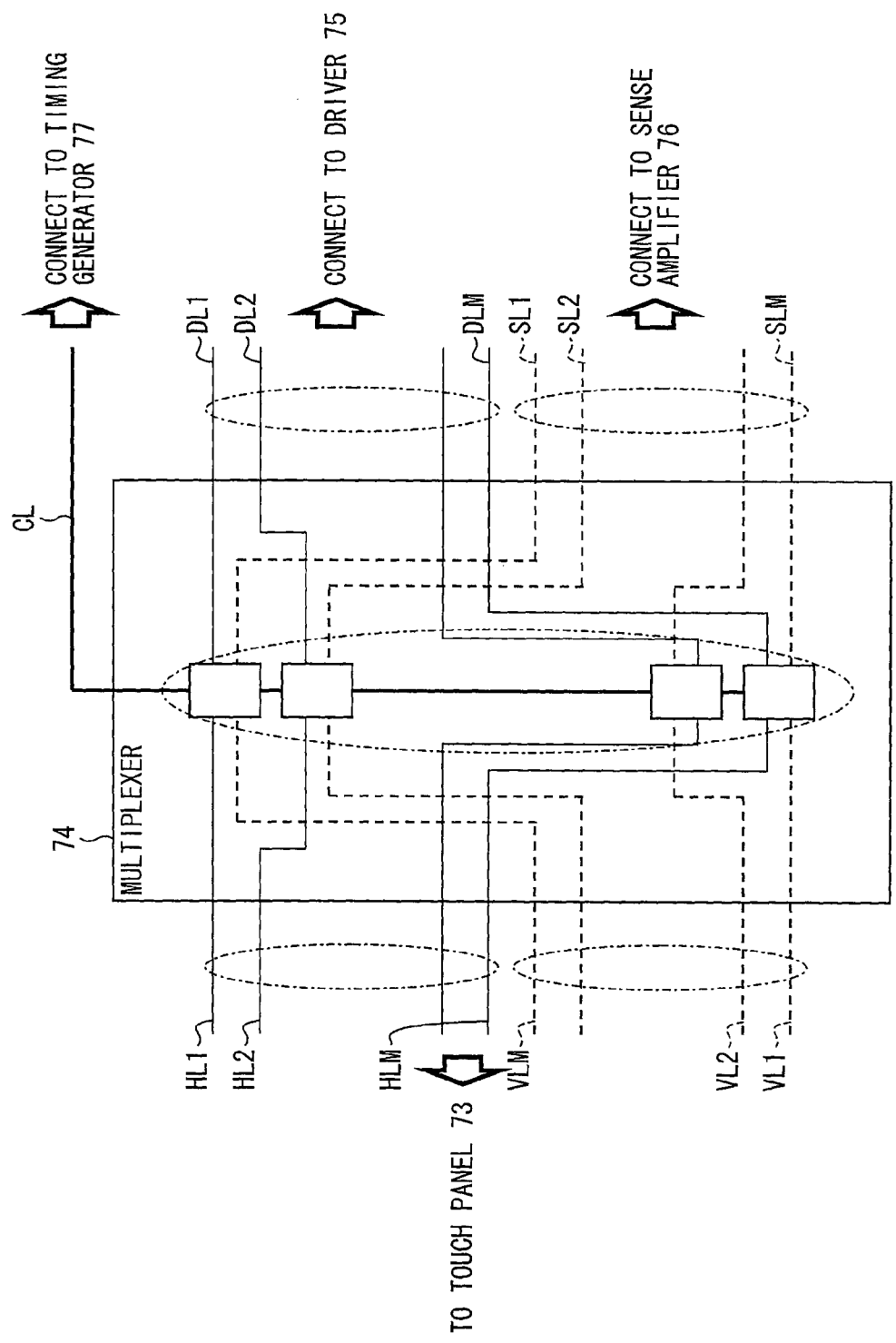
FIG. 32 is a circuit diagram illustrating a configuration of a connection switching circuit between (a) signal lines connected to the touch panel, and (b) drive lines connected to a driver and sense lines connected to a sense amplifier.

FIG. 30 is a block diagram illustrating a configuration of a touch panel system 71a according to Embodiment 18. FIG. 31 is a schematic view illustrating a configuration of a touch panel 73 provided in the touch panel system 71a.

The touch panel system 71*a* includes a touch panel 73 and a capacitance value distribution detection circuit 72. The touch panel 73 includes signal lines HL1 to HLM (first signal lines) arranged parallel to each other in a horizontal direction, signal lines VL1 to VLM (second signal lines) arranged parallel to each other in a vertical direction, and capacitances C11 to each provided at intersections of the signal lines HL1 to HLM with the signal lines VL1 to VLM. It is preferable that the touch panel 73 is of a size in which a hand holding the input pen can be placed on the touch panel 73. However, the touch panel 73 may be of a size that is usable for smartphones.

The capacitance distribution detection circuit 72 includes a driver 75. The driver 75 applies a voltage to drive lines DL1 to DLM in accordance with a code sequence. The capacitance value distribution detection circuit 72 includes a sense amplifier 76. The sense amplifier 76 reads out, via the sense lines SL1 to SLM, a linear sum of electric charges that correspond to the capacitances, and supplies the linear sum to an A/D converter 78.

The capacitance value distribution detection circuit 72 illustrating a configuration of a connection switching circuit between (a) signal lines HL1 to HLM and VL1 to VLM connected to the touch panel 73, and (b) drive lines DL1 to DLM connected to the driver 75 and sense lines SL1 to SLM connected to the sense amplifier 76.

The multiplexer 74 causes a switchover between (a) a first connection state in which the signal lines HL1 to HLM are connected to the drive lines DL1 to DLM of the driver 75 and the signal lines VL1 to VLM are connected to the sense lines SL1 to SLM of the sense amplifier 76 and (b) a second connection state in which the signal lines HL1 to HLM are connected to the sense lines SL1 to SLM of the sense amplifier 76 and the signal lines VL1 to VLM are connected to the drive lines DL1 to DLM of the driver 75.

Figure 33:
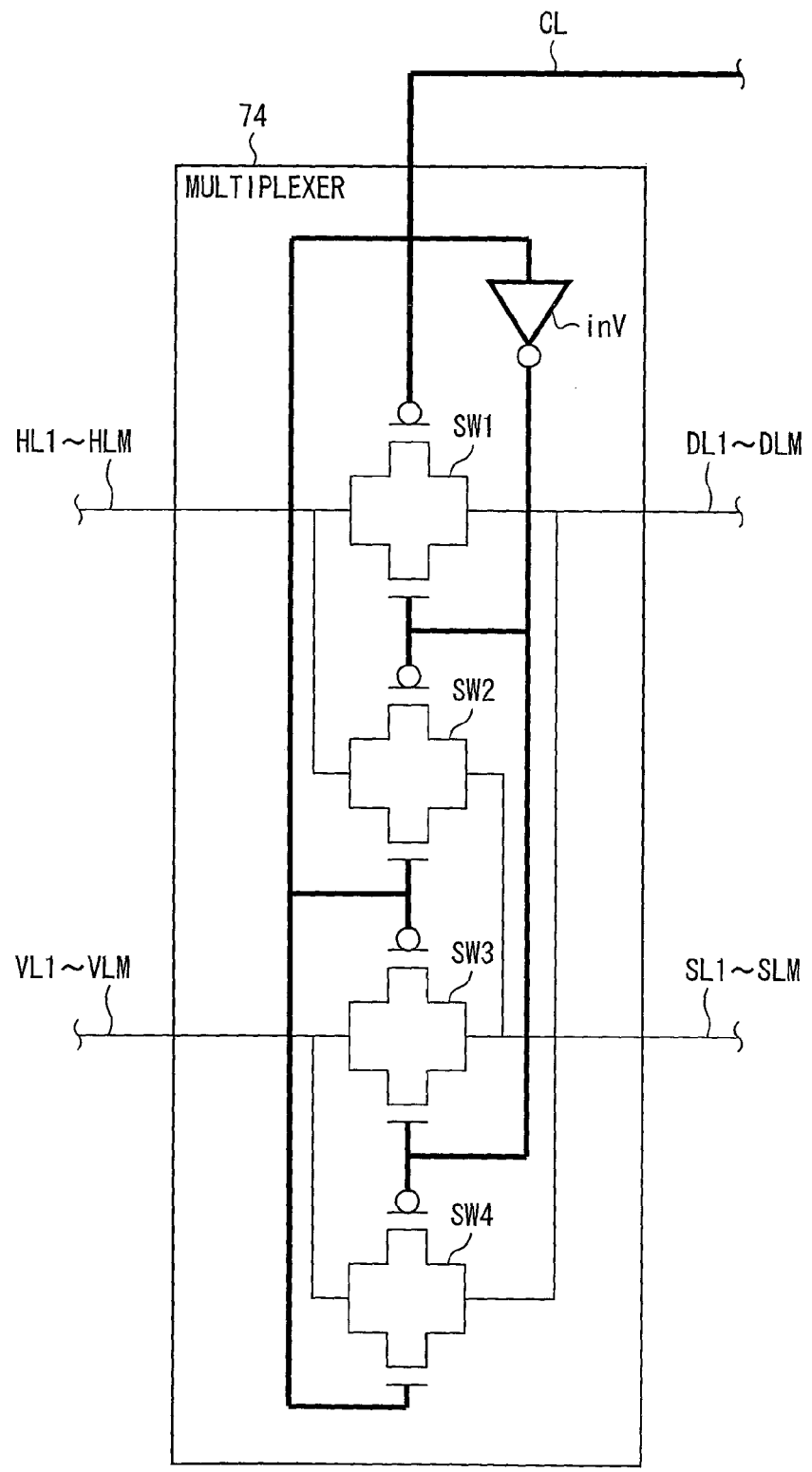
FIG. 33 is a circuit diagram illustrating a configuration of a multiplexer provided in a capacitance value distribution detection circuit of the touch panel system.

FIG. 33 is a circuit diagram illustrating a configuration of the multiplexer 74 provided in the capacitance value distribution detection circuit 72 of the touch panel system 71*a*. The multiplexer 74 includes four CMOS switches SW1 to SW4, which are connected in series. A signal from a timing generator 77 via the control line CL is supplied from (i) one end of the CMOS switch SW1 opposite of the CMOS switch SW2, (ii) between the CMOS switch SW2 and the CMOS switch SW3, (iii) one end of the CMOS switch SW4 opposite of the CMOS switch SW3, and (iv) a terminal input of a reverser inv. The reverser inv has its output be supplied between the CMOS switch SW1 and the CMOS switch SW2, and between the CMOS switch SW3 and the CMOS switch SW4. The signal lines HL1 to HLM are connected to the CMOS switches SW1 and SW2. The signal lines VL1 to VLM are connected to the CMOS switches SW3 and SW4. The drive lines DL1 to DLM are connected to the CMOS switches SW1 and SW4. The sense lines SL1 to SLM are connected to the CMOS switches SW2 and SW3.

When the signal of the control line CL is made Low, the signal lines HL1 to HLM become connected to the drive lines DL1 to DLM and the signal lines VL1 to VLM become connected to the sense lines SL1 to SLM. When the signal of the control line CL is made High, the signal lines HL1 to HLM become connected to the sense lines SL1 to SLM and the signal lines VL1 to VLM become connected to the drive lines DL1 to DLM.

The A/D converter 78 converts from analog to digital a linear sum of electric charges read out via the sense lines SL1 to SLM, which electric charges correspond to the capacitances, and supplies the converted linear sum to the capacitance value distribution calculation section 79.

The capacitance value distribution calculation section 79, based on the code sequence and the linear sum of the electric charges supplied from the A/D converter 78, which electric charges correspond to the capacitances, calculates a capacitance value distribution on the touch panel 73 and supplies the calculated capacitance value distribution to a touch recognition section 80. The touch recognition section 80 recognizes a touched position on the touch panel 73 based on the capacitance value distribution supplied from the capacitance value distribution calculation section 79.

The capacitance value distribution detection circuit 72 includes the timing generator 77. The timing generator 77 generates (i) a signal for specifying an operation of the driver 75, (ii) a signal for specifying an operation of the sense amplifier 76, and (iii) a signal for specifying an operation of the A/D converter 78, and supplies these signals to the driver 75, the sense amplifier 76, and the A/D converter 78, respectively.

(Operation of Touch Panel System 71*a*)

Figure 34:
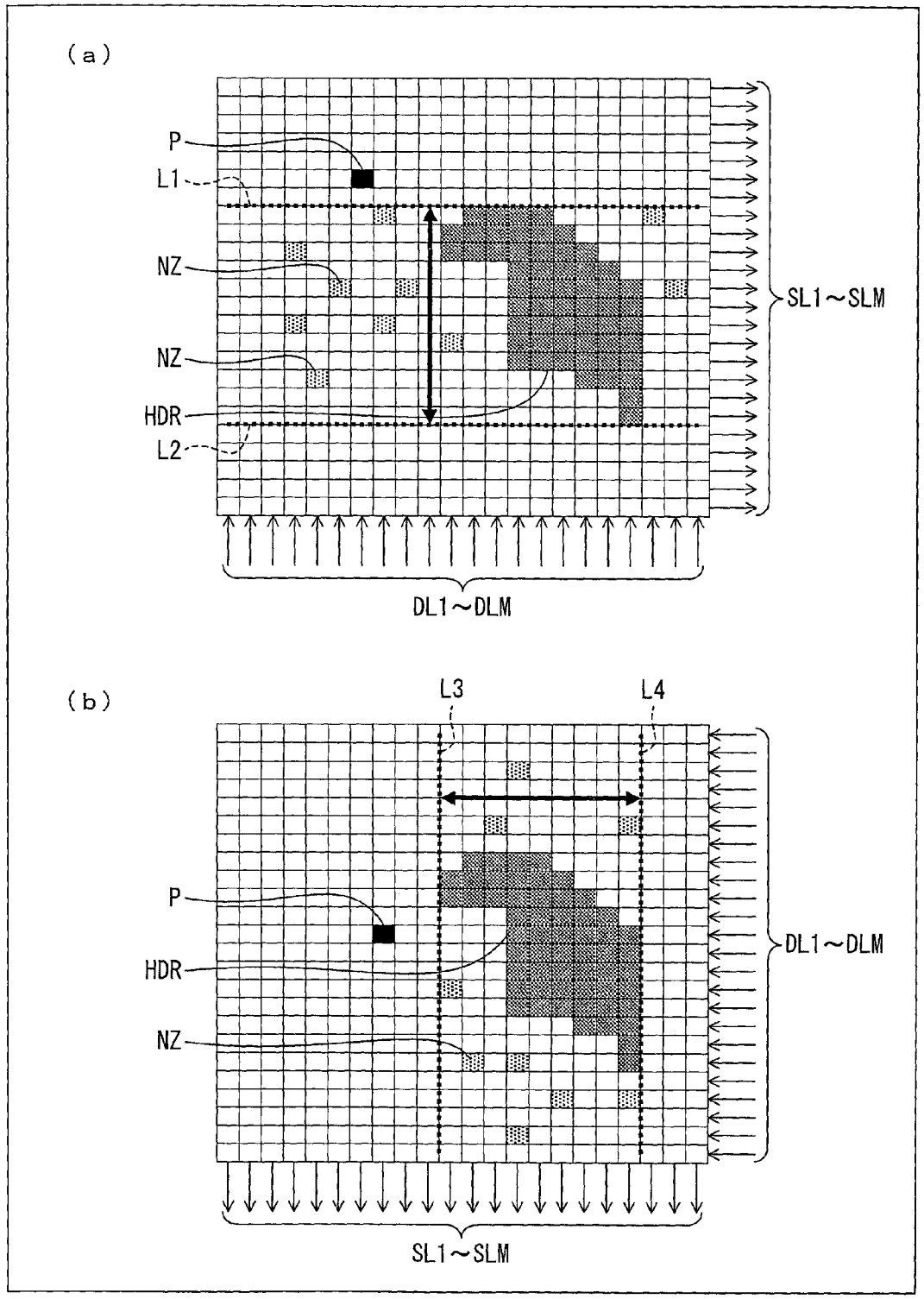
FIG. 34 Illustrated in (a) and (b) of FIG. 34 are schematic views for describing an operation method of the touch panel system.

Illustrated in (a) and (b) of FIG. 34 is a schematic view for describing an operation method of the touch panel system 71*a*. As described above with reference to FIG. 43, there is the problem that the phantom noise NZ generates in an area between the circumscribing lines L1 and L2 that circumscribe the hand placing region HDR along the sense lines SL1 to SLM and which is outside the hand placing region HDR. However, when a pen signal is inputted on a sense line that does not overlap the hand placing region HDR, i.e., on a pen input position P outside the circumscribing lines L1 and L2 as illustrated in (a) of FIG. 34, this pen signal is detectable since no phantom noise NZ is generated on the sense line that the pen input position P passes, thereby having no deterioration in SNR caused by the phantom noise NZ.

Figure 43:
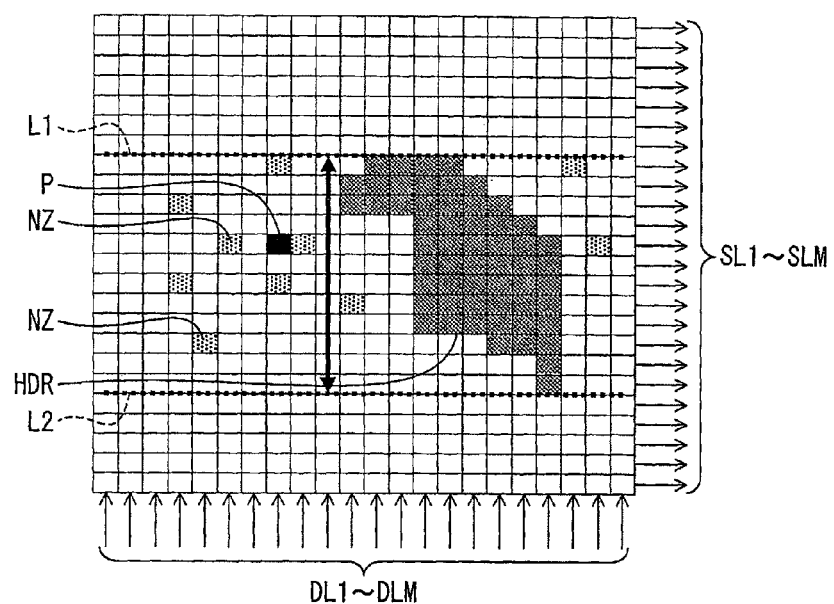
FIG. 43 is a view for describing phantom noise that generates in the touch panel system.

Hence, in a case in which the hand placing region HDR and the pen input position P are in a positional relationship as illustrated in FIG. 43, the drive lines DL1 to DLM and the sense lines SL1 to SLM are switched over therebetween, to have the signal lines HL1 to HLM in the horizontal direction function as the drive lines DL1 to DLM and the signal lines VL1 to VLM in the vertical direction function as the sense lines SL1 to SLM, as illustrated in (b) of FIG. 34, so that the signal is detected outside the area between the circumscribing lines L3 and L4. Consequently, it is possible to detect the pen signal of the pen input position P.

Accordingly, for example, by alternately switching over with the multiplexer 4 between a first connection state ((b) of FIG. 34) and a second connection state (FIG. 43) every one frame, which first connection state is a state in which the signal lines HL1 to HLM are connected to the drive lines DL1 to DLM of the driver 75 and the signal lines VL1 to VLM are connected to the sense lines SL1 to SLM of the sense amplifier 76 and the second connection state is a state in which the signal lines HL1 to HLM are connected to the sense lines SL1 to SLM of the sense amplifier 76 and the signal lines VL1 to VLM are connected the drive lines DL1 to DLM of the driver 75, it is possible to detect the pen signal at one of timings of the first connection state and the second connection state, even if the phantom noise NZ generates due to the hand placing region HDR. Since the phantom noise NZ is generated in the other timing, the SNR of the pen signal is reduced to half. However, by alternately switching over between the first connection state and the second connection state, it is possible to detect the pen signal even if the phantom noise NZ is generated caused by the hand placing region HDR.

Therefore, for example, the touch panel system 71*a* (i) drives, in a first timing, the signal lines HL1 to HLM so that the signal lines VL1 to VLM output electric charges that correspond to the capacitances (first signal line driving step), (ii) controls, with use of the multiplexer 74, in a second timing subsequent to the first timing, a switching of connection of the signal lines HL1 to HLM and the signal lines VL1 to VLM (switching step), and (iii) drives, in a third timing subsequent to the second timing, the signal lines VL1 to VLM so that the signal lines HL1 to HLM output the electric charges that correspond to the capacitances (second signal line driving step).

The capacitance value distribution calculation section 79 is configured so that a signal read out through a sense line from a capacitance disposed in a rectangle circumscribing with the hand placing region HDR, is not received. The hand placing region HDR is a region in which a hand holding the electrically conductive pen for input is placed on the touch panel; the capacitance value distribution calculation section can be configured to recognize this region by image recognition means not illustrated. Moreover, the configuration may be provided so that a user of the touch panel system 71a specifies the hand placing region HDR.

Moreover, when the switching between the drive lines and the sense lines similarly to the above is carried out in a smartphone with which no hand placing region HDR by pen input occurs, although a signal to be detected generated by touching with a finger is generated in either of the driving states, an error signal caused by the phantom noise is removable since a position in which the phantom noise is generated differs by the switching of the drive lines and the sense lines.

Figure 35:
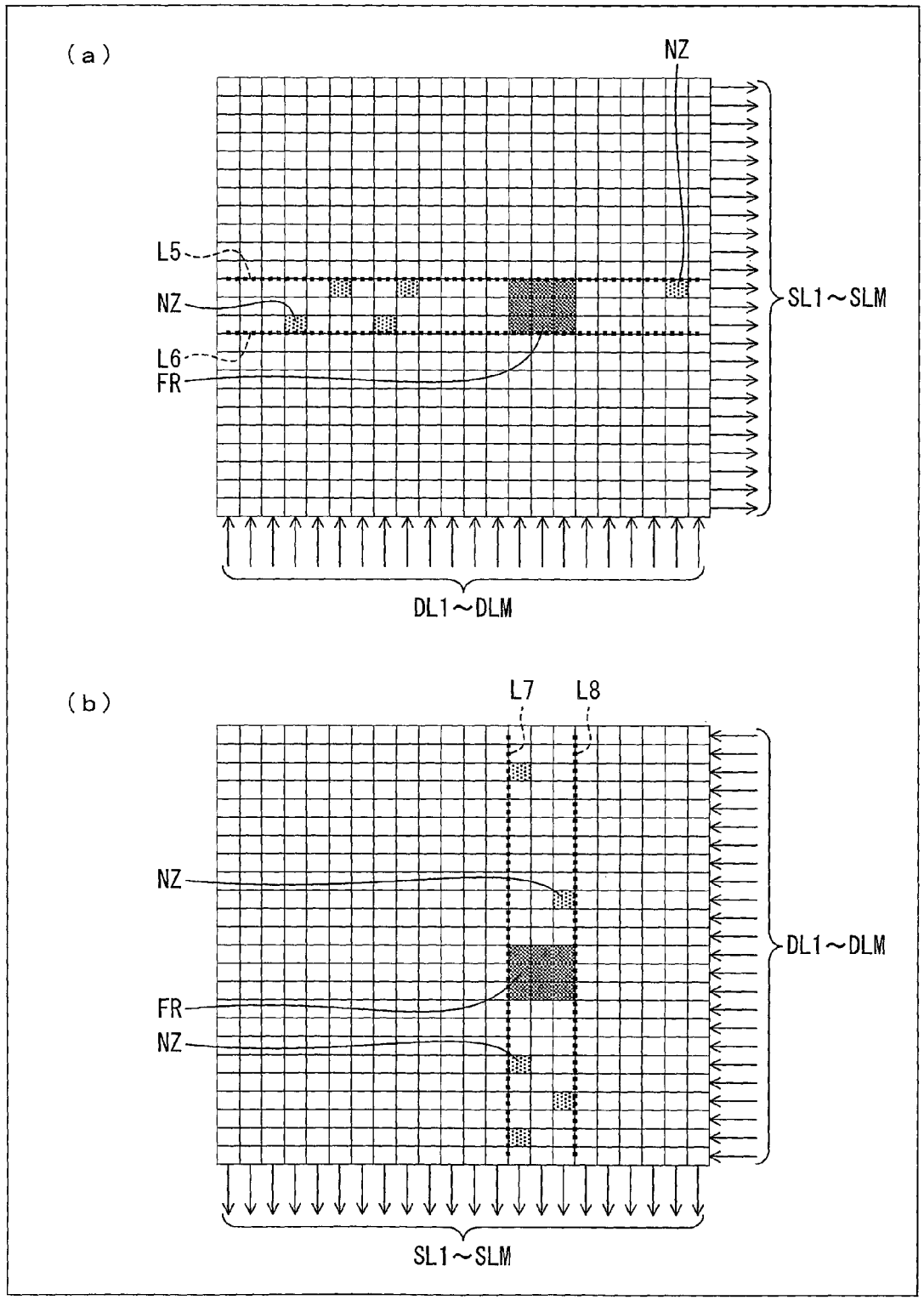
FIG. 35 Illustrated in (a) and (b) of FIG. 35 are schematic views for describing another operation method of the touch panel system.

Illustrated in (a) and (b) of FIG. 35 are schematic views for describing another operation method of the touch panel system 71a. As illustrated in (a) of FIG. 35, after the vertical signal lines VL1 to VLM are connected to the drive lines DL1 to DLM and vertical signal lines VL1 to VLM are driven, and the horizontal signal lines HL1 to HLM are connected to the sense lines SL1 to SLM, the phantom noise NZ that generates in an area between circumscribing lines L5 and L6 (circumscribing along a horizontal direction of a finger-touched region FR where the finger is touched) and which is outside the finger-touched region FR, is read out via the sense line together with a signal corresponding to the finger-touched region FR. Thereafter, as illustrated in (b) of FIG. 35, after the horizontal signal lines HL1 to HLM are connected to the drive lines DL1 to DLM and the horizontal signal lines HL1 to HLM are driven, and the vertical signal lines VL1 to VLM are connected to the sense lines SL1 to SLM, the phantom noise NZ generated between the circumscribing lines L7 and L8 that circumscribe the finger-touched region FR along the vertical direction, is read out via a sense line together with a signal corresponding to the finger-touched region FR.

The phantom noise NZ generated between the circumscribing lines L5 and L6 as illustrated in (a) of FIG. 35 and the phantom noise generated between the circumscribing lines L7 and L8 as illustrated in (b) of FIG. 35 are generated randomly, unrelated to each other. Accordingly, when an AND operation is carried out with use of (i) the signal corresponding to the phantom noise NZ generated between the circumscribing lines L5 and L6 as in (a) of FIG. 35, read out via the sense line, and corresponding to the finger-touched area FR, and (ii) the signal read out via the sense line, corresponding to the phantom noise NZ generated between the circumscribing lines L7 and L8 as in (b) of FIG. 35, read out via the sense line, and corresponding to the finger-touched area FR, it is possible to cancel the phantom noise NZ generated between the circumscribing lines L5 and L6 with the phantom noise NZ generated between the circumscribing lines L7 and L8.

Embodiment 19

Configuration of Touch Panel System 71b

Figure 36:
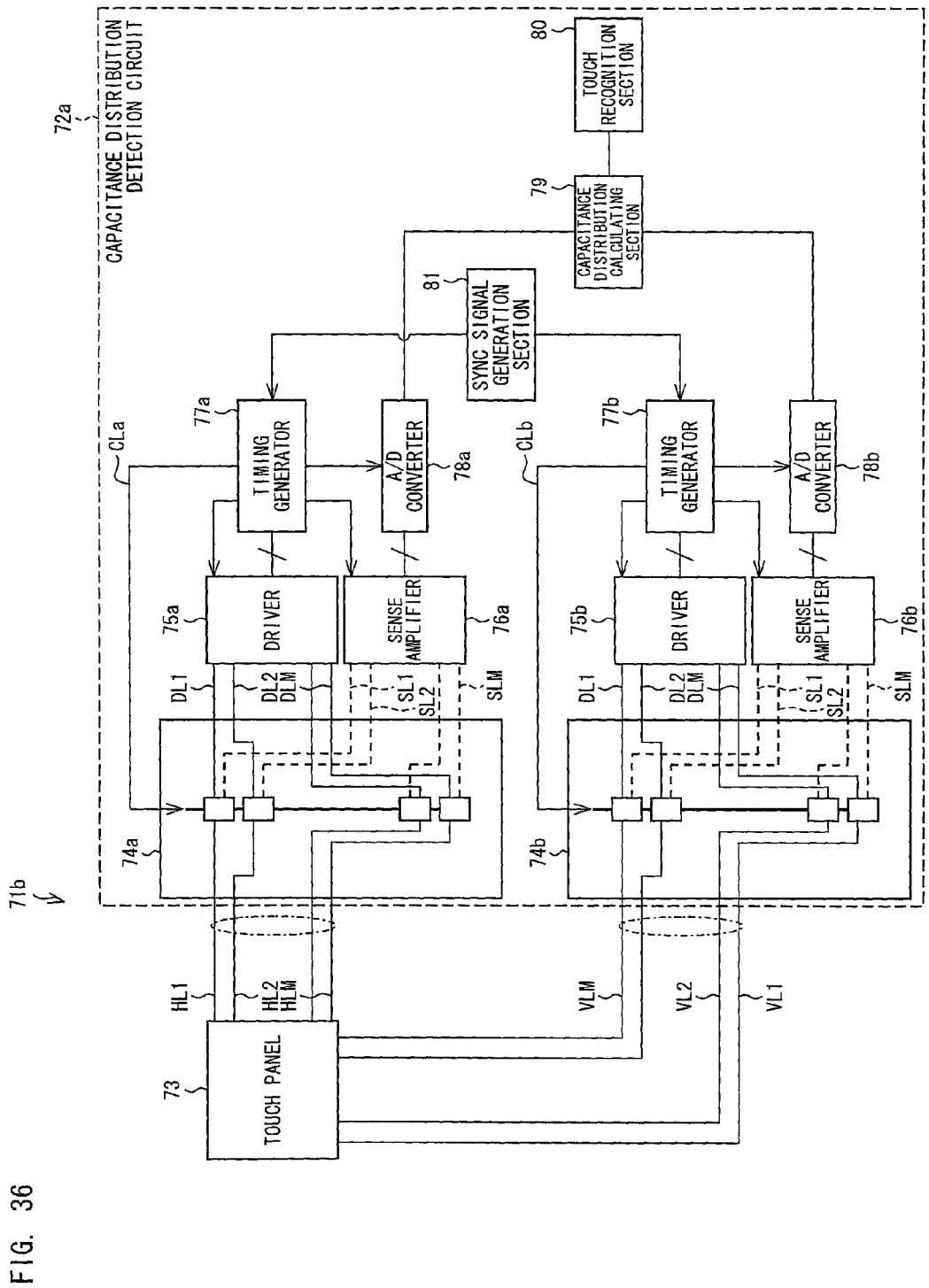
FIG. 36 is a block diagram illustrating a configuration of a touch panel system according to Embodiment 19.
Figure 37:
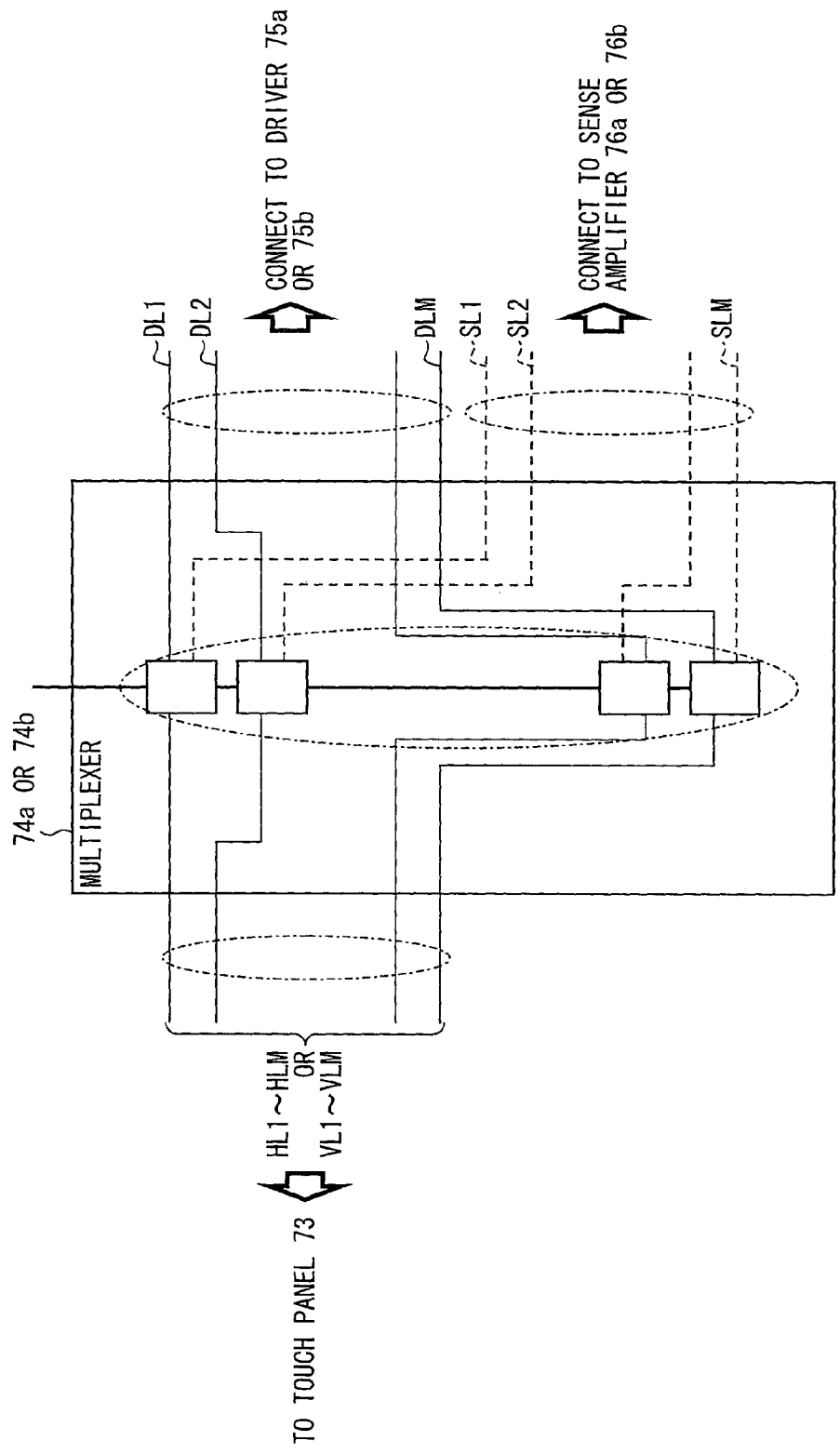
FIG. 37 is a circuit diagram illustrating a configuration of a connection switching circuit between (a) signal lines connected to the touch panel, and (b) drive lines connected to a driver and sense lines connected to a sense amplifier.

FIG. 36 is a block diagram illustrating a configuration of a touch panel system 71b according to Embodiment 19. FIG. 37 is a circuit diagram illustrating a configuration of a connection switching circuit (multiplexers 74a and 74b) between (a) signal lines HL1 to HLM and VL1 to VLM connected to a touch panel 73, and (b) drive lines DL1 to DLM connected to drivers 75a and 75b and sense lines SL1 to SLM connected to sense amplifiers 76a and 76b. Components identical to those described above are provided with identical reference signs, and detailed descriptions thereof are not repetitively provided.

The touch panel system 71b includes a capacitance value distribution detection circuit 72a. The capacitance value distribution detection circuit 72a includes two multiplexers, 74a and 74b. The multiplexer 74a is connected to the touch panel 73 in a fixed manner, via the signal lines HL1 to HLM. The capacitance value distribution detection circuit 72a includes the driver 75a and the sense amplifier 76a. The driver 75a is connected to the multiplexer 74a via the drive lines DL1 to DLM, and the sense amplifier 76a is connected to the multiplexer 74a via the sense lines SL1 to SLM.

The capacitance value distribution detection circuit 72a includes an A/D converter 78a and a timing generator 77a. The A/D converter 78a converts an output from the sense amplifier 76a from analog to digital, and supplies this converted output to a capacitance value distribution calculation section 79. The timing generator 77a generates (i) a signal specifying an operation of the driver 75a, (ii) a signal specifying an operation of the sense amplifier 76a, and (iii) a signal specifying an operation of the A/D converter 78a, and supplies these signals to the driver 75a, the sense amplifier 76a, and the A/D converter 78a, respectively. The timing generator 77a supplies a signal for controlling the multiplexer 74a, via a control line CLa.

The multiplexer 74b is connected to the touch panel 73 in a fixed manner via the signal lines VL1 to VLM. The capacitance value distribution detection circuit 72a includes the driver 75b and the sense amplifier 76b. The driver 75b is connected to the multiplexer 74b via the drive lines DL1 to DLM and the sense amplifier 76b is connected to the multiplexer 74b via the sense lines SL1 to SLM.

The capacitance value distribution detection circuit 72a includes an A/D converter 78b and a timing generator 77b. The A/D converter 78b converts an output from the sense amplifier 76b from analog to digital, and supplies this converted output to the capacitance value distribution calculation section 79. The timing generator 77b generates (i) a signal specifying an operation of the driver 75b, (ii) a signal specifying an operation of the sense amplifier 76b, and (iii) a signal specifying an operation of the A/D converter 78b, and supplies these signals to the driver 75b, the sense amplifier 76b, and the A/D converter 78b, respectively. The timing generator 77b supplies a signal for controlling the multiplexer 74b, via the control line CLb.

The capacitance distribution detection circuit 72a includes a sync signal generation section 81. The sync signal generation section 81 generates a sync signal for the timing generators 77a and 77b to control the multiplexers 74a and 74b to cause the switching over between (a) a first connection state in which the signal lines HL1 to HLM are connected to the driver 75a and the signal lines VL1 to VLM are connected to the sense amplifier 76b and (b) a second connection state in which the signal lines HL1 to HLM are connected to the sense amplifier 76a and the signal lines VL1 to VLM are connected to the driver 75b, and supplies the generated sync signal to the timing generators 77a and 77b.

Figure 38:
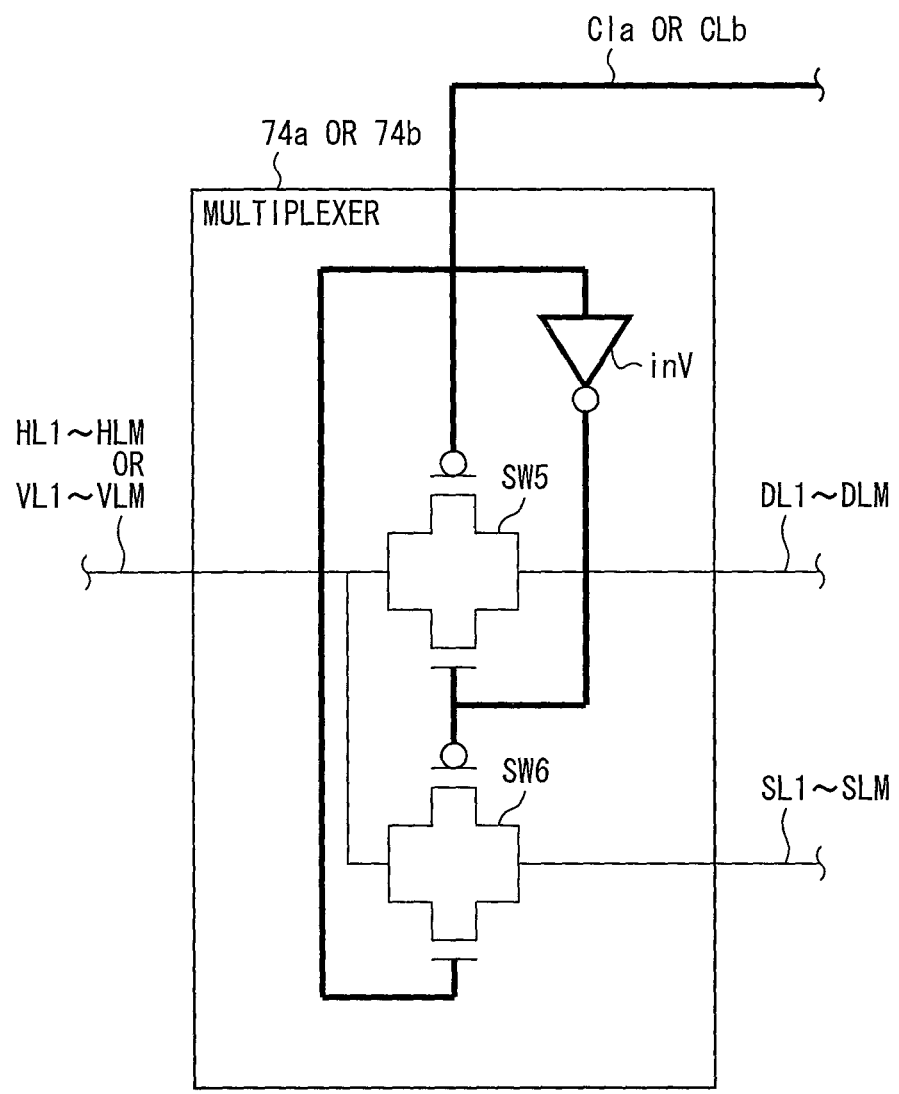
FIG. 38 is a circuit diagram illustrating a configuration of a multiplexer provided in a capacitance value distribution detection circuit of the touch panel system.

FIG. 38 is a circuit diagram illustrating a configuration of the multiplexers 74a and 74b provided in the capacitance value distribution detection circuit 72a of the touch panel system 71b. The multiplexer 74a includes two CMOS switches SW5 and SW6 that are connected in series. A signal from the timing generator 77a via the control line CLa is inputted from (i) one end of the CMOS switch SW5 opposite of the CMOS switch SW6, (ii) one end of the CMOS switch SW6 opposite of the CMOS switch SW5, and (iii) a terminal input of a reverser inv. The reverser inv has its output be inputted between the CMOS switch SW5 and CMOS switch SW6. The signal lines HL1 to HLM are connected to the CMOS switches SW5 and SW6. The drive lines DL1 to DLM are connected to the CMOS switch SW5. The sense lines SL1 to SLM are connected to the CMOS switch SW6.

(Operation of Touch Panel System 71b)

When a signal of the control line CLa is made Low, the signal lines HL1 to HLM become connected to the drive lines DL1 to DLM. When the signal of the control line CLa is made High, the signal lines HL1 to HLM become connected to the sense lines SL1 to SLM. The multiplexer 74b is also configured similarly to this.

As such, the touch panel system 71b includes the multiplexers 74a and 74b having similar configurations; the multiplexer 74a is connected to the signal lines HL1 to HLM of the touch panel 73 in a fixed manner, and the multiplexer 74b is connected to the signal lines VL1 to VLM of the touch panel 73 in a fixed manner. Furthermore, the multiplexers 74a and 74b are operated in sync, based on a sync signal generated by the sync signal generation section 81. When the multiplexer 74a is connected to the driver 75a, the multiplexer 74b is connected to the sense amplifier 76b, and when the multiplexer 74a is connected to the sense amplifier 76a, the multiplexer 74b is connected to the driver 75b.

Embodiment 20

Figure 39:
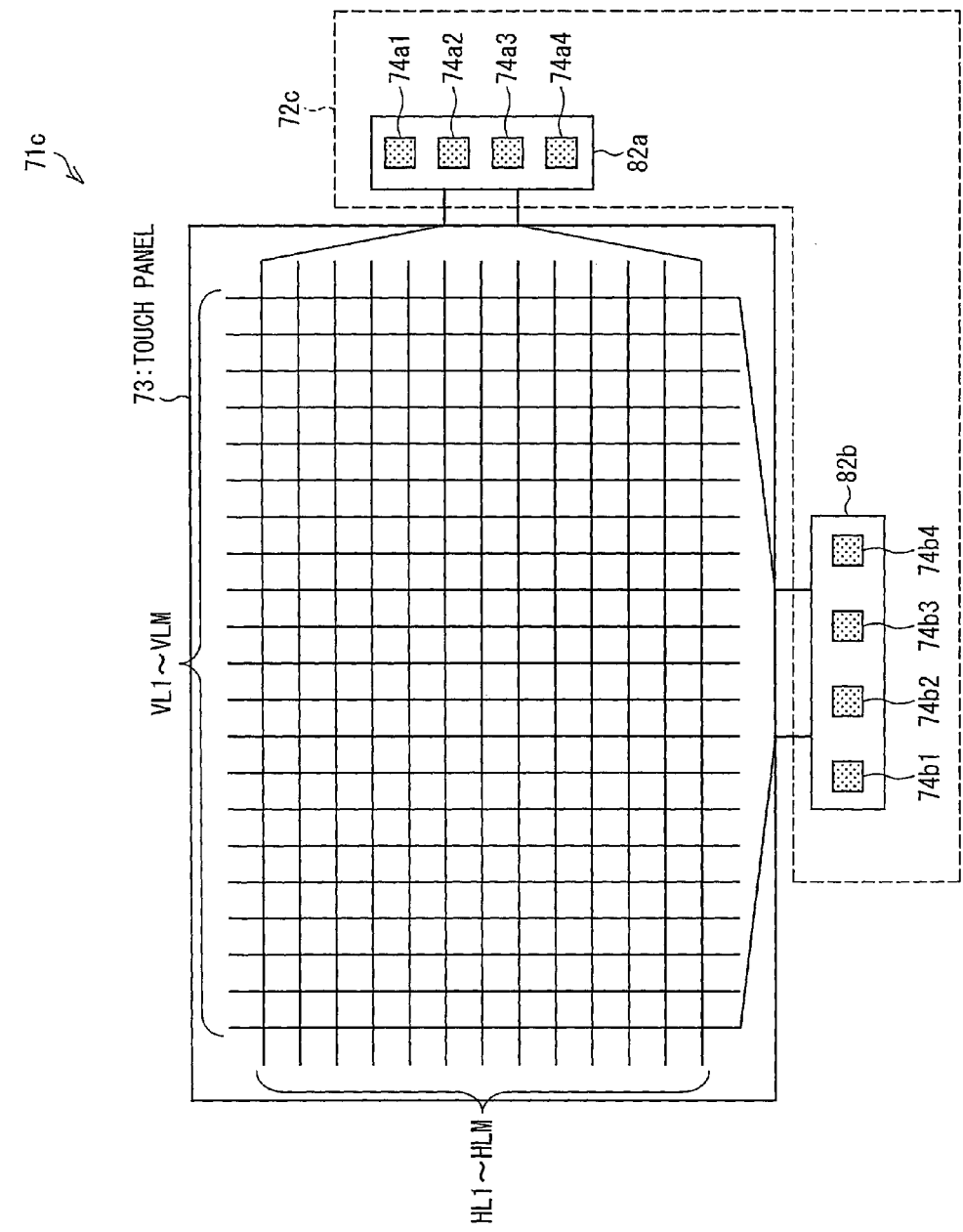
FIG. 39 is a block diagram illustrating a configuration of a touch panel system according to Embodiment 20.

FIG. 39 is a block diagram illustrating a configuration of a touch panel system 71c according to Embodiment 20. Components identical to those described above are provided with identical reference signs, and detailed descriptions thereof are not repetitively provided.

The touch panel system 71c includes a capacitance value distribution detection circuit 72c. The capacitance value distribution detection circuit 72c includes controllers 82a and 82b. The controller 82a includes multiplexers 74a1 to 74a4. The multiplexers 74a1 to 74a4 have configurations similar to that of the multiplexer 74a described above with reference to FIG. 36 through FIG. 38, however is connected to a fewer number of signal lines; the multiplexer 74a1 is connected to signal lines HL1 to HL(m1), the multiplexer 74a2 is connected to signal lines HL(m1+1) to HL(m2), the multiplexer 74a3 is connected to signal lines HL(m2+1) to HL(m3), and the multiplexer 74a4 is connected to signal lines HL(m3+1) to HLM, where 1<m1<m2<m3<M.

The controller 82b includes multiplexers 74b1 to 74b4. The multiplexers 74b1 to 74b4 have configurations similar to that of the multiplexer 74b described above with reference to FIG. 36 through FIG. 38, however is connected to a fewer number of signal lines; the multiplexer 74b1 is connected to signal lines VL1 to VL(k1), the multiplexer 74b2 is connected to signal lines VL(k1+1) to VL(k2), the multiplexer 74b3 is connected to signal lines VL(k2+1) to VL(k3), and the multiplexer 74b4 is connected to signal lines VL(k3+1) to VLM, where 1<k1<k2<k3<M.

The multiplexers 74a1 to 74a4 and the multiplexers 74b1 to 74b4 each include respective drivers, sense amplifiers, timing generators, and ADC, and operate in sync based on a sync signal generated by a sync signal generation section. The controllers 82a and 82b may be fabricated as an integrated circuit (IC).

In the touch panel system 71c, control is carried out to switch between (a) a first connection state in which the signal lines HL1 to HL(m1), the signal lines HL(m1+1) to HL(m2), the signal lines HL(m2+1) to HL(m3), and the signal lines HL(m3+1) to HLM are connected to a driver and the signal lines VL1 to VL(k1), the signal lines VL(k1+1) to VL(k2), the signal lines VL(k2+1) to VL(k3), and the signal lines VL(k3+1) to VLM are connected to a sense amplifier, and (b) a second connection state in which the signal lines HL1 to HL(m1), the signal lines HL(m1+1) to HL(m2), the signal lines HL(m2+1) to HL(m3), and the signal lines HL(m3+1) to HLM are connected to a sense amplifier and the signal lines VL1 to VL(k1), the signal lines VL(k1+1) to VL(k2), the signal lines VL(k2+1) to VL(k3), and the signal lines VL(k3+1) to VLM are connected to a driver.

Embodiment 21

Figure 40:
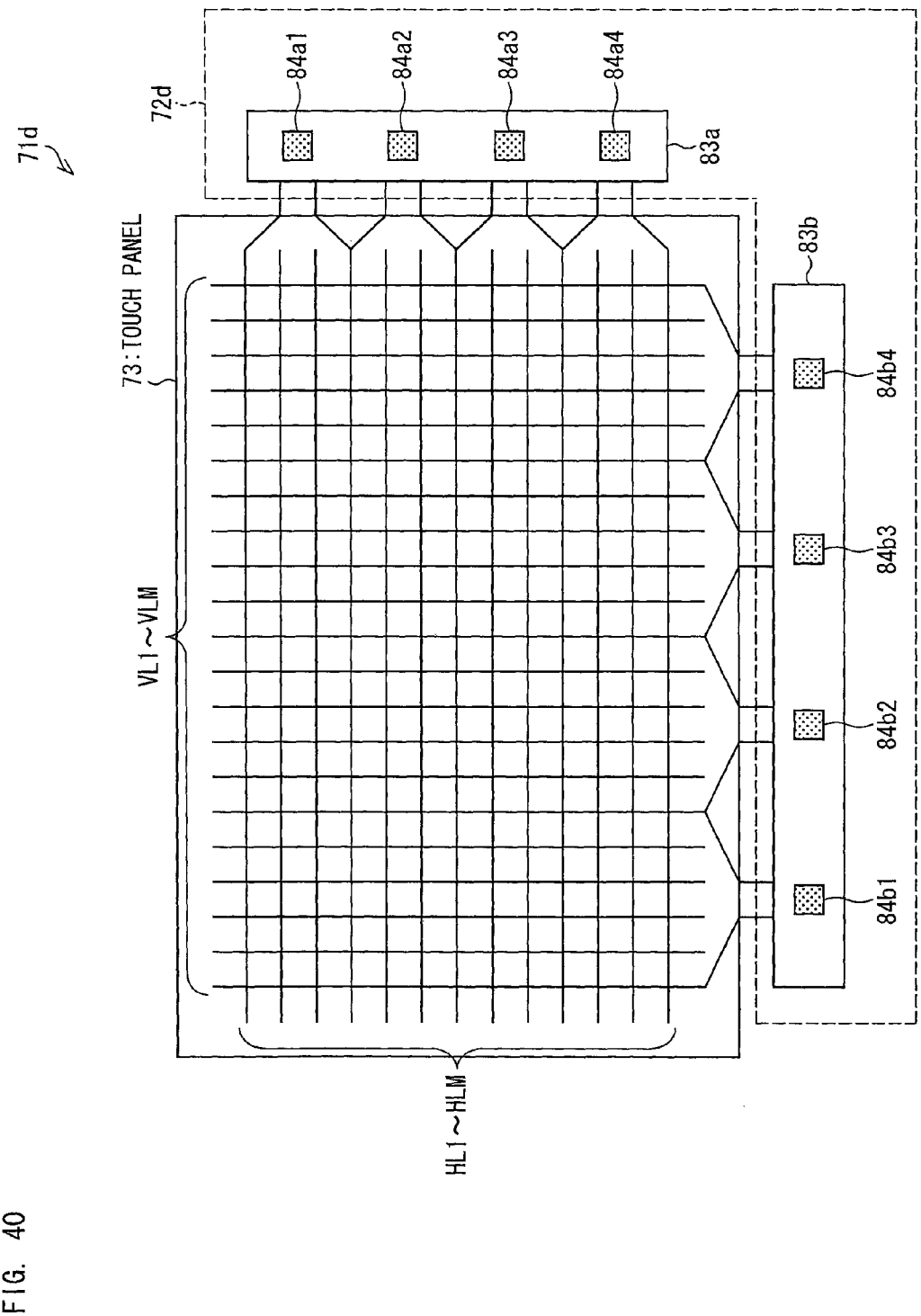
FIG. 40 is a block diagram illustrating a configuration of a touch panel system according to Embodiment 21.
Figure 41:
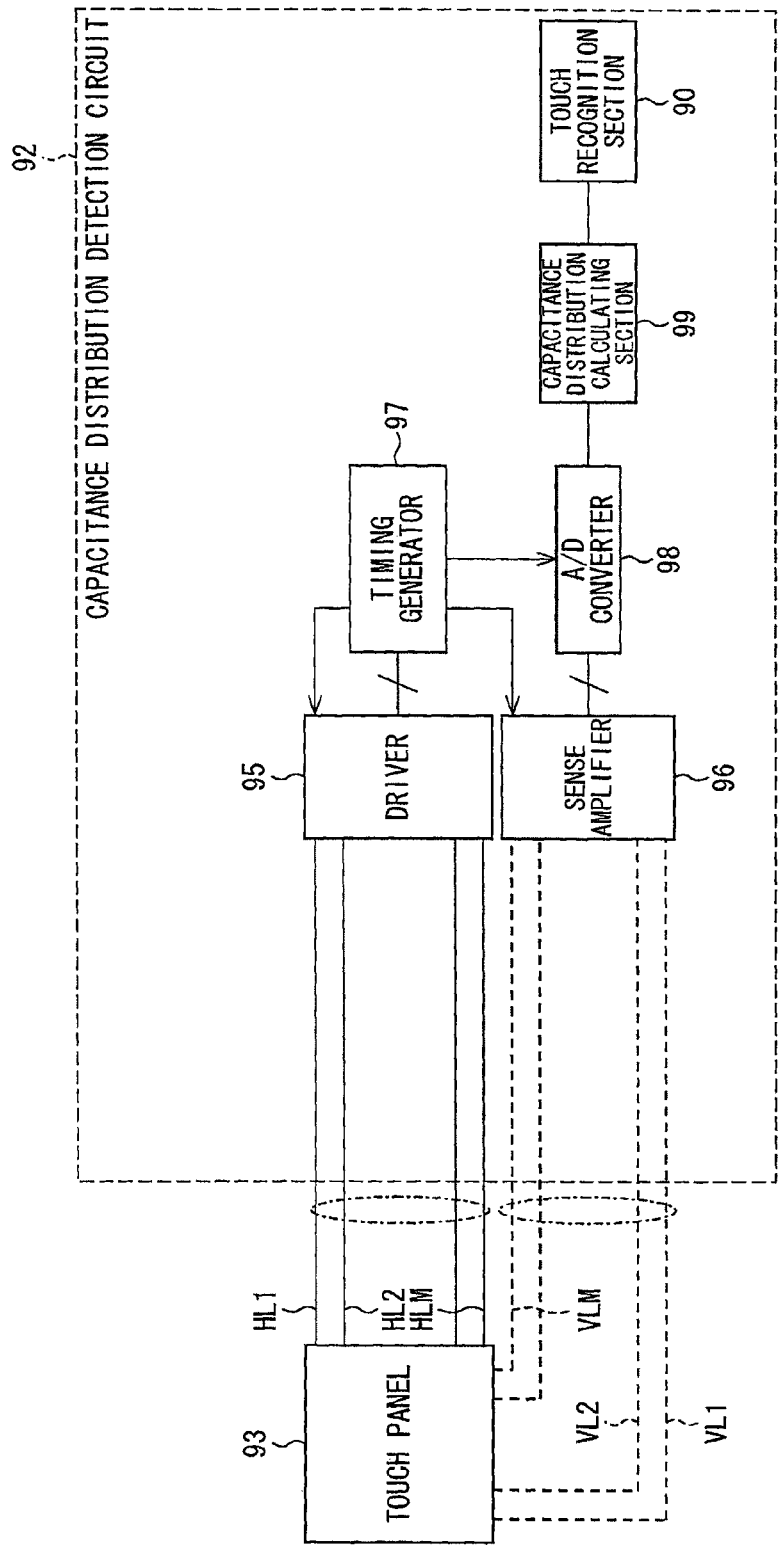
FIG. 41 is a block diagram illustrating a configuration of a conventional touch panel system.
Figure 42:
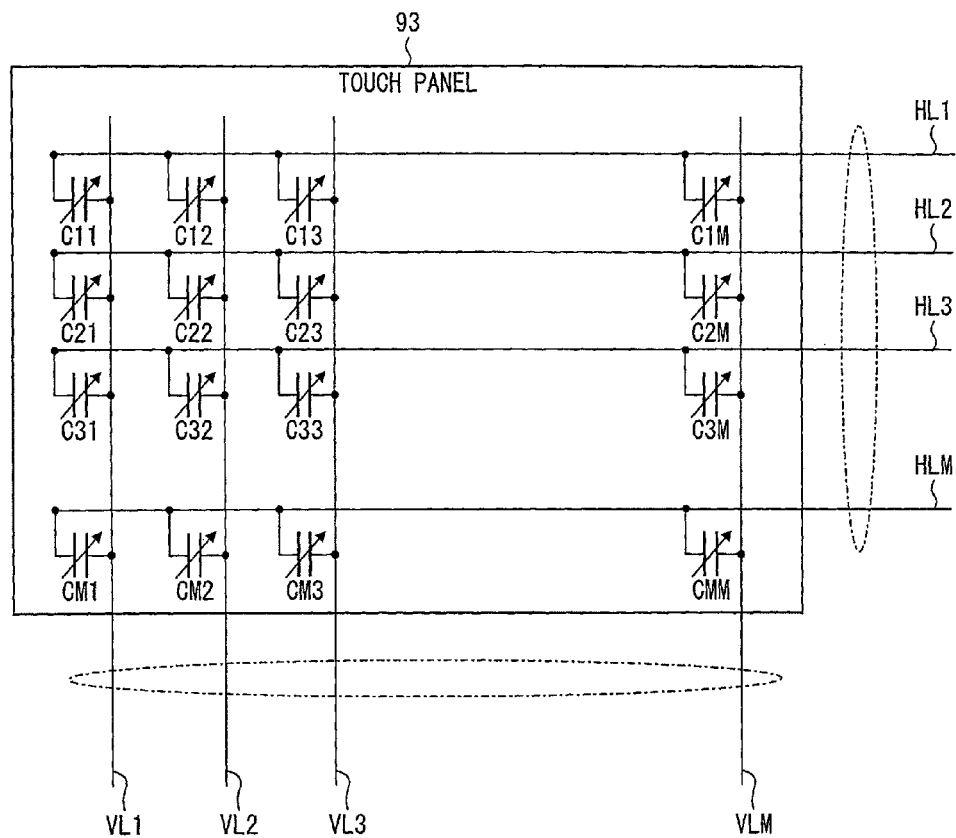
FIG. 42 is a schematic view illustrating a configuration of a touch panel provided in the touch panel system.

FIG. 40 is a block diagram illustrating a configuration of a touch panel system 71d according to Embodiment 21. Components identical to those described above are provided with identical reference signs, and detailed descriptions thereof are not repetitively provided.

A sense amplifier of the touch panel system 71d includes a configuration to read out a signal from adjacent sense lines upon subtraction, allowing for canceling noise from a liquid crystal panel and the like and improve SNR.

The touch panel system 71d includes a capacitance value distribution detection circuit 72d. The capacitance value distribution detection circuit 72d includes controllers 83a and 83b. The controller 83a includes multiplexers 84a1 to 84a4. The multiplexers 84a1 to 84a4 have configurations similar to that of the multiplexer 74a described above with reference to FIG. 36 to FIG. 38, however is connected to a fewer number of signal lines, and adjacent multiplexers share a signal line that is disposed on their common boundary.

The multiplexer 84a1 is connected to signal lines HL1 to HL(m1), the multiplexer 84a2 is connected to signal lines HL(m1) to HL(m2), the multiplexer 84a3 is connected to signal lines HL(m2) to HL(m3), and the multiplexer 84a4 is connected to signal lines HL(m3) to HLM, where 1<m1<m2<m3<M. As such, adjacent multiplexers 84a1 and 84a2 share the signal line HL(m1) disposed on their common boundary, adjacent multiplexers 84a2 and 84a3 share the signal line HL(m2) disposed on their common boundary, and adjacent multiplexers 84a3 and 84a4 share the signal line HL(m3) disposed on their common boundary.

The controller 83b includes multiplexers 84b1 to 84b4. The multiplexers 84b1 to 84b4 have configurations similar to that of the multiplexer 74b described above with reference to FIG. 36 to FIG. 38, however is connected to a fewer number of signal lines, and adjacent multiplexers share a signal line disposed on their common boundary.

The multiplexer 84b1 is connected to signal lines VL1 to VL(k1), the multiplexer 84b2 is connected to signal lines VL(k1) to VL(k2), the multiplexer 84b3 is connected to signal lines VL(k2) to VL(k3), and the multiplexer 84b4 is connected to signal lines VL(k3) to VLM, where 1<k1<k2<k3<M. As such, adjacent multiplexers 84b1 and 84b2 share the signal line VL(k1) disposed on their common boundary, adjacent multiplexers 84b2 and 84b3 share the signal line VL(k2) disposed on their common boundary, and adjacent multiplexers 84b3 and 84b4 share the signal line VL(k3) disposed on their common boundary.

The multiplexers 84a1 to 84a4 and the multiplexers 84b1 to 84b4 each include respective drivers, sense amplifiers, timing generators, and ADC, and operate in sync based on a sync signal generated by a sync signal generation section. The controllers 83a and 83b may be fabricated as an integral circuit (IC).

As such, in a case in which the sense amplifier is configured so as to read out a signal from adjacent sense lines upon subtraction, to allow for canceling noise from the liquid crystal panel and the like and improve SNR, by sharing a signal line disposed on a common boundary of adjacent multiplexers, it is possible to continuously carry out differential readout of sense lines disposed on the boundary of the sense lines corresponding to the adjacent multiplexers in a manner exceeding that boundary.

The touch panel systems according to Embodiments 18 to 21 may be constituted in a media blackboard (information input/output device) capable of receiving input by being handwritten thereon while a plurality of persons touch the blackboard, by superposing the touch panel system with a liquid crystal display panel or by building the touch panel system inside a liquid crystal display panel.

The present invention can also be expressed as below:

[1] A touch panel system including: a touch panel including a plurality of sensors; and a touch panel controller for receiving signals from the sensors so as to read data, the plurality of sensors including (i) a main sensor for inputting a signal in response to a touch operation performed by a user and (ii) a sub sensor provided on a surface of the touch panel on which surface the main sensor is provided, and the touch panel controller including subtracting means for (i) receiving a signal supplied from the main sensor and a signal supplied from the sub sensor and (ii) subtracting, from the signal supplied from the main sensor, the signal supplied from the sub sensor.

[2] The touch panel system described in [1], wherein the sub sensor is not touched by the user in the touch operation, and detects a noise generated in the sensor.

[3] The touch panel system described in [1] or [2], wherein the main sensor and the sub sensor are provided so as to be adjacent to each other.

[4] A touch panel system including: a display device; a touch panel which is provided on an upper section or the like of a display screen of the display device and which includes a plurality of sensor groups including sensors arranged in a matrix; and a touch panel controller for receiving signals from the sensor groups so as to read data, the sensor groups including (i) a main sensor group for inputting a signal in response to a touch operation performed by a user and (ii) a sub sensor group provided on a surface of the touch panel on which surface the main sensor group is provided, and the touch panel controller including subtracting means for (i) receiving a signal supplied from the main sensor group and a signal supplied from the sub sensor group and (ii) subtracting, from the signal supplied from the main sensor group, the signal supplied from the sub sensor group.

[5] The touch panel system described in [4], wherein the sub sensor group is not touched by the user in the touch operation, and detects a noise generated in the sensor group.

[6] The touch panel system described in [4] or [5], wherein the main sensor group and the sub sensor group are provided so as to be adjacent to each other.

[7] The touch panel system described in any of [1] through [6], wherein the display device is a liquid crystal display, a plasma display, an organic electroluminescence display, or a field emission display.

[8] An electronic device including a touch panel system described in any of [1] through [7].

According to each of the above configurations, the touch panel includes the main sensor section for detecting a touch operation and the sub sensor section for detecting a noise, and a difference between a signal of the main sensor section and a signal of the sub sensor section is found by the subtracting section. This removes a noise signal from the output signal which is supplied from the main sensor section, thereby extracting a signal derived from the touch operation itself, which signal is generated in response to the touch operation. Therefore, it is possible to reliably remove (cancel) a wide variety of noises reflected in the touch panel. Thus, a noise component which is the subject of removal is not limited to an AC signal component in a signal including noises, but is all noise components reflected in the touch panel. Namely, it is possible to provide a touch panel system and an electronic device each of which is capable of canceling basically all noise components.

Also, the present invention can be described as below:

Preferably, the touch panel system of any of the embodiments of the present invention is configured such that: the main sensor section is provided with a plurality of sense lines; the sub sensor section is provided with a sub sense line extending along a direction in which the sense lines extend; the subtracting section finds a first difference which is expressed by (Sn+1)−Sn, the first difference corresponding to a difference between (i) a signal of a sense line Sn which is selected from the plurality of sense lines and (ii) a signal of a sense line Sn+1, which is one of two sense lines adjacent to the sense line Sn, the two sense lines being the sense line Sn+1 and a sense line Sn−1 each of which is included in the plurality of sense lines; the subtracting section finds a second difference which is expressed by Sn−(Sn−1), the second difference corresponding to a difference between (i) the signal of the sense line Sn and (ii) a signal of the sense line Sn−1, which is the other one of the two sense lines; the subtracting section finds a third difference, the third difference corresponding to a difference between (i) a signal of the sub sense line and (ii) a signal of a sense line adjacent to the sub sense line which sense line is included in the plurality of sense lines; and the touch panel controller includes an adding section for adding up the first difference, the second difference, and the third difference.

According to the above configuration, the subtracting section obtains a difference signal value between sense lines adjacent to each other. Namely, a difference is found between the adjacent sense lines, which have a higher correlation in terms of noise. Furthermore, from an output signal supplied from each sense line, a signal (noise signal) of the sub sense line is removed. This makes it possible to remove a noise more reliably.

The touch panel system of any of the embodiments of the present invention may be configured to include: drive lines provided so as to intersect the sense lines and the sub sense line; a drive line driving circuit for driving the drive lines by use of orthogonal sequences or M sequences; capacitances being formed (i) between the sense lines and the drive lines and (ii) between the sub sense line and the drive lines; and a calculation section for finding capacitance values of the respective capacitances by (i) reading output signals from the sense lines and the sub sense line and by (ii) finding inner products of the output signals and the code sequences for driving the drive lines in parallel.

According to the above configuration, the touch panel is driven by the orthogonal sequence driving method. Consequently, a signal of the capacitance is multiplied by a code length (i.e., multiplied by N). Therefore, a signal strength of the capacitance is increased, regardless of the number of drive lines. Further, provided that a necessary signal strength is merely equal to that of the conventional method, it is possible to reduce the number of times that the drive lines should be driven, thereby enabling to reduce electric power consumption.

The touch panel system of any of the embodiments of the present invention may be configured such that: the subtracting section includes a first analog-to-digital converting section for converting, into digital signals, analog signals supplied from the sense lines and the sub sense line to the subtracting section; and the subtracting section uses, in order to find the first difference, the second difference, and the third difference, the digital signals obtained by the first analog-to-digital converting section.

According to the above configuration, it is possible to remove a noise by (ii) converting, into digital signals, analog signals outputted by the touch panel, and thereafter by (ii) performing subtracting operations.

The touch panel system of any of the embodiments of the present invention may be configured such that: the subtracting section includes a second analog-to-digital converting section for converting, into digital signals, analog signals supplied from the sense lines and the sub sense line to the subtracting section; and the second analog-to-digital converting section converts, into a digital signal, each of the first difference, the second difference, and the third difference that are found by the subtracting section with use of the analog signals.

According to the above configuration, it is possible to remove a noise by (i) performing subtracting operations on analog signals outputted by the touch panel, without converting the analog signals into digital signals, and thereafter by (ii) converting the resulting signal into a digital signal.

Preferably, the touch panel system of any of the embodiments of the present invention is configured such that: the subtracting section includes a total differential amplifier for finding the first difference, the second difference, and the third difference with use of the analog signals.

According to the above configuration, it is possible to remove a noise by (i) causing the total differential amplifier to perform subtracting operations on analog signals without converting the analog signals into digital signals which analog signals are outputted by the touch panel, and thereafter by (ii) converting the resulting signal into a digital signal.

Preferably, the touch panel system of any of the embodiments of the present invention is configured such that: the total differential amplifier has an input common-mode voltage range which is rail to rail.

The above configuration includes the total differential amplifier capable of rail-to-rail operation. Therefore, the total differential amplifier is operable in a voltage range from a power source voltage (Vdd) to GND. Accordingly, an output signal from the total differential amplifier is free from a problem of output saturation.

Preferably, the touch panel system of any of the embodiments of the present invention is configured such that: the adding section adds the first difference, the second difference, and the third difference in such a manner that individual adding operations are carried out in the order of increasing distance between a sense line involved in a certain adding operation and the sub-sense line, and the adding section uses a result of one adding operation in a next adding operation.

According to the above configuration, the adding section sequentially performs adding operations in the order of increasing distance between a sense line involved in a certain adding operation and the sub-sense line, while utilizing the results of the adding operations. This makes it possible to increase a speed at which an adding operation is performed.

The touch panel system of any of the embodiments of the present invention may be configured such that: the sub sensor section is configured not to detect a touch operation performed with respect to the touch panel.

According to the above configuration, since a signal generated by a touch operation is not detected by the sub sensor section, an output signal from the sub sensor section does not include the signal generated by the touch operation. This prevents a case where the signal value derived from the touch operation is reduced by the subtracting operation performed by the subtracting section. Namely, a noise component is removed without reducing the signal detected by the main sensor section, which signal is generated in response to the touch operation. This makes it possible to further enhance detection sensitivity for a touch operation.

The touch panel system of any of the embodiments of the present invention may be configured such that: the sub sensor section is provided in a region of the touch panel in which region no touch operation is performed.

According to the above configuration, the sub sensor section is provided so as not to be positioned in a region (touched region) where a user performs a touch operation. Therefore, on the sub sensor section, the user would not perform a touch operation. Accordingly, although the sub sensor section detects a noise reflected in the touch panel, the sub sensor section does not detect a signal generated by a touch operation. This can reliably prevent the sub sensor section from detecting a touch operation.

Namely, since the above configuration does not allow the sub sensor section to detect a signal generated by a touch operation, an output signal supplied from the sub sensor section does not include the signal generated by the touch operation. This prevents a case where the signal value derived from the touch operation is reduced by the subtracting operation performed by the subtracting section. Namely, a noise component is removed without reducing the signal generated by the touch operation and detected by the main sensor section. This makes it possible to further enhance detection sensitivity for a touch operation.

Preferably, the touch panel system of any of the embodiments of the present invention is configured such that: the main sensor section and the sub sensor section are provided so as to be adjacent to each other.

According to the above configuration, the main sensor section and the sub sensor section are arranged so that a distance therebetween is shortest. Namely, the main sensor section and the sub sensor section are provided under substantially the same condition. Therefore, a value of a noise signal included in an output signal from the sub sensor section can be regarded as being the same as that of a noise signal included in an output signal from the main sensor section. This can more reliably remove, by the subtracting operation performed by the subtracting section, a noise component reflected in the touch panel. This makes it possible to further enhance detection sensitivity for a touch operation.

The touch panel system of any of the embodiments of the present invention may be configured such that: the main sensor section is made of one main sensor.

According to the above configuration, the main sensor section is made of a single main sensor. This can provide a touch panel system capable of determining the presence or absence of a touch operation.

The touch panel system of any of the embodiments of the present invention may be configured such that: the main sensor section is made of a plurality of main sensors arranged in a matrix.

According to the above configuration, the main sensor section is made of a plurality of main sensors arranged in a matrix. This can provide a touch panel system capable of determining (i) the presence or absence of a touch operation and (ii) a touched position.

Preferably, the touch panel system of any of the embodiments of the present invention is configured so as to include: drive lines provided so as to intersect the sense lines; a drive line driving circuit for driving the drive lines in parallel; capacitances being formed between the sense lines and the drive lines; and a decoding section for decoding values of differences between the capacitances in the direction in which the drive lines extend which differences are found by the subtracting section as the differences in signal between the respective pairs of the sense lines adjacent to each other, based on output signals that the subtracting section receives from the sense lines.

According to the above configuration, the touch panel is parallel driven, and the decoding section decodes the difference values of the capacitances which difference values are found by the subtracting section. Consequently, signals of the capacitances are multiplied by a code length (i.e., multiplied by N). Therefore, signal strengths of the capacitances are increased, regardless of the number of drive lines. Further, provided that necessary signal strengths are merely equal to those of a conventional method, it is possible to reduce the number of times that the drive lines should be driven. This makes it possible to reduce electric power consumption.

The touch panel system of any of the embodiments of the present invention may be configured such that: the subtracting section includes a third analog-to-digital converting section for converting, into digital signals, analog signals supplied from the sense lines to the subtracting section; and the subtracting section uses, in order to find the differences in signal between the respective pairs of the sense lines adjacent to each other, the digital signals obtained by the third analog-to-digital converting section.

According to the above configuration, it is possible to remove a noise by (ii) converting, into digital signals, analog signals outputted by the touch panel, and thereafter by (ii) performing subtracting operations.

The touch panel system of any of the embodiments of the present invention may be configured such that: the subtracting section includes a fourth analog-to-digital converting section for converting, into digital signals, analog signals supplied from the sense lines to the subtracting section; and the fourth analog-to-digital converting section converts, into digital signals, the differences in signal between the respective pairs of the sense lines adjacent to each other, the differences being found by the subtracting section with use of the analog signals.

According to the above configuration, it is possible to remove a noise by (i) performing subtracting operations on analog signals outputted by the touch panel, without converting the analog signals into digital signals, and thereafter by (ii) converting the resulting signal into a digital signal.

The touch panel system of any of the embodiments of the present invention may be configured such that: the subtracting section includes a total differential amplifier for finding, with use of the analog signals, the differences in signal between the respective pairs of the sense lines adjacent to each other.

According to the above configuration, it is possible to remove a noise by (i) causing the total differential amplifier to perform subtracting operations on analog signals without converting the analog signals into digital signals which analog signals are outputted by the touch panel, and thereafter by (ii) converting the resulting signal into a digital signal.

The touch panel system of any of the embodiments of the present invention may be configured so as to include: a non-touch operation information storage section for storing a first distribution of differences between the capacitances which differences are decoded by the decoding section when no touch operation is performed; and a calibration section for subtracting (i) the first distribution stored in the non-touch operation information storage section from (ii) a second distribution of differences between the capacitances which differences are decoded by the decoding section when a touch operation is performed, so as to calibrate the second distribution.

According to the above configuration, the non-touch operation information storage section stores the first distribution of the differences between the capacitances which differences are decoded by the decoding section when no touch operation is performed. Further, the calibration section subtracts (i) the first distribution stored in the non-touch operation information storage section from (ii) the second distribution of the differences between the capacitances which differences are found when a touch operation is performed. Namely, the calibration section performs the following calculation: (the second distribution of the differences between the capacitances which differences are found when the touch operation is performed)−(the first distribution of the differences between the capacitances which differences are found when no touch operation is performed). This can cancel an offset inherent in the touch panel.

Preferably, the touch panel system of any of the embodiments of the present invention is configured so as to include: a judging section for determining the presence or absence of a touch operation based on a comparison of (i) the differences in signal between the respective pairs of the sense lines adjacent to each other which differences are found by the subtracting section and (ii) positive and negative threshold values.

According to the above configuration, the judging section determines the presence or absence of a touch operation based on the differences in signal between the respective pairs the sense lines adjacent to each other from which differences a noise signal has been removed. This makes it possible to accurately determine the presence or absence of the touch operation.

Preferably, the touch panel system of any of the embodiments of the present invention is configured such that: the judging section creates, based on the comparison of (i) the differences in signal between the respective pairs of the sense lines adjacent to each other which differences are found by the subtracting section and (ii) the positive and negative threshold values, an increase and decrease table which indicates, in ternary, a distribution of differences between signals of the sense lines, and the judging section converts the increase and decrease table into a binary image, so as to extract touch information therefrom.

According to the above configuration, the differences in signal between the respective pairs of the sense lines adjacent to each other from which differences a noise signal has been removed are inputted to the judging section. Based on the comparison of (i) the differences in signal between the respective pairs of the sense lines adjacent to each other and (ii) the positive and negative threshold values stored in the judging section, the judging section creates the increase and decrease table indicating, in ternary, the distribution of the differences in signal between the respective pairs of the sense lines adjacent to each other. Further, the judging section binarizes the increase and decrease table, so that the increase and decrease table is converted into the binary image. Consequently, from the binary image thus converted, candidates of a touched position are extracted. Thus, by recognizing the touch information (the size, position, etc. of the touch) based on the binary image, it is possible not only to determine the presence or absence of the touch operation but also to recognize the touch information more accurately.

Preferably, the touch panel system of any of the embodiments of the present invention is configured to further include a display device, the touch panel being provided to a front surface of the display device.

According to the above configuration, since the touch panel is provided on the front surface of the display device, it is possible to reliably remove a noise generated in the display device.

Preferably, the touch panel system of any of the embodiments of the present invention is configured such that: the display device is a liquid crystal display, a plasma display, an organic electroluminescence display, or a field emission display.

According to the above configuration, the display device is made of any of various kinds of displays used in generally-used electronic devices. Therefore, it is possible to provide a touch panel system having a great versatility.

A capacitance value distribution detection method according to the present invention is a method of detecting capacitance value distribution, to detect a distribution of capacitance values of a plurality of capacitances that are each formed on intersections of a plurality of first signal lines with a plurality of second signal lines, the method including: driving the first signal lines in a first timing, to output from the second signal lines electric charges that correspond to the capacitances; controlling, in a second timing subsequent to the first timing, a switching of connections of the first signal lines with that of the second signal lines; and driving the second signal lines in a third timing subsequent to the second timing, to output from the first signal lines the electric charges that correspond to the capacitances.

According to this feature, in a first timing, first signal lines are driven to output from second signal lines electric charges that correspond to the capacitances, in a second timing subsequent to the first timing, switching of connection of the first and second signal lines are controlled, and in a third timing subsequent to the second timing, the second signal lines are driven to output from the first signal lines the electric charges that correspond to the capacitances. Hence, it is possible to output the electric charges corresponding to the capacitances from both of the first signal lines and the second signal lines. As a result, it is possible to eliminate the effect caused by electromagnetic noise that is inputted into the touch panel via the hand, fingers or the like and is superposed on a signal of a sense line.

A capacitance value distribution detection circuit according to the present invention is a capacitance value distribution detection circuit that detects a distribution of capacitance values of a plurality of capacitances that are each formed on intersections of a plurality of first signal lines with a plurality of second signal lines, the capacitance value distribution detection circuit including: a multiplexer connected to the plurality of first signal lines and the plurality of second signal lines; a driver connected to the multiplexer; and a sense amplifier connected to the multiplexer; the multiplexer switching a connection state between a first connection state in which the first signal lines are connected to the driver and the second signal lines are connected to the sense amplifier and a second connection state in which the first signal lines are connected to the sense amplifier and the second signal lines are connected to the driver.

With this feature, it is possible to switch between a first connection state which connects the first signal lines with the driver and connects the second signal lines with the sense amplifier and a second connection state which connects the first signal lines with the sense amplifier and connects the second signal lines with the driver. This allows for outputting the electric charges corresponding to the capacitances from both the first signal lines and the second signal lines. As a result, it is possible to eliminate the effect caused by electromagnetic noise that is inputted into the touch panel via the hands, fingers and the like and is superposed on the signal of a sense line.

Another capacitance value distribution detection circuit according to the present invention is a capacitance value distribution detection circuit that detects a distribution of capacitance values of a plurality of capacitances that are each formed on intersections of a plurality of first signal lines with a plurality of second signal lines, the capacitance value distribution detection circuit including: a first multiplexer connected to the first signal lines; a first driver connected to the first multiplexer; a first sense amplifier connected to the first multiplexer; a second multiplexer connected to the second signal lines; a second driver connected to the second multiplexer; a second sense amplifier connected to the second multiplexer; and a control circuit that controls the first multiplexer and the second multiplexer so that a connection state is switchable between a first connection state in which the first signal lines are connected to the first driver and the second signal lines are connected to the second sense amplifier, and a second connection state in which the first signal lines are connected to the first sense amplifier and the second signal lines are connected to the second driver.

With this feature, it is possible to switch over between a first connection state which connects the first signal lines with the first driver and connects the second signal lines with the second sense amplifier, and a second connection state which connects the first signal lines with the first sense amplifier and connects the second signal lines with the second driver. This allows for outputting the electric charges corresponding to the capacitances from both the first signal lines and the second signal lines. As a result, it is possible to eliminate the effect caused by electromagnetic noise that is inputted into the touch panel via the hands, fingers and the like and is superposed on the signal of the sense line.

Yet another capacitance value distribution detection circuit according to the present invention is a capacitance value distribution detection circuit that detects a distribution of capacitance values of a plurality of capacitances that are each formed on intersections of a plurality of first signal lines with a plurality of second signal lines; the capacitance value distribution detection circuit including: a first multiplexer connected to a portion of the plurality of first signal lines; a first driver connected to the first multiplexer; a first sense amplifier connected to the first multiplexer; a second multiplexer connected to another portion of the plurality of first signal lines; a second driver connected to the second multiplexer; a second sense amplifier connected to the second multiplexer; a third multiplexer connected to a portion of the plurality of second signal lines; a third driver connected to the third multiplexer; a third sense amplifier connected to the third multiplexer; a fourth multiplexer connected to another portion of the plurality of second signal lines; a fourth driver connected to the fourth multiplexer; a fourth sense amplifier connected to the fourth multiplexer; and a control circuit that controls the first to fourth multiplexers so that a connection state is switchable between (a) a first connection state in which the portion of the first signal lines is connected to the first driver, the another portion of the first signal lines is connected to the second driver, the portion of the second signal lines is connected to the third sense amplifier, and the another portion of the second signal lines is connected to the fourth sense amplifier, and (b) a second connection state in which the portion of the first signal lines is connected to the first sense amplifier, the another portion of the first signal lines is connected to the second sense amplifier, the portion of the second signal lines is connected to the third driver, and the another portion of the second signal lines is connected to the fourth driver.

With this feature, it is possible to switch between (a) a first connection state in which a portion of the first signal lines is connected to the first driver, another portion of the first signal lines is connected to the second driver, a portion of the second signal lines is connected to the third sense amplifier, and another portion of the second signal lines is connected to the fourth sense amplifier, and (b) a second connection state in which a portion of the first signal lines is connected to the first sense amplifier, another portion of the first signal lines is connected to the second sense amplifier, a portion of the second signal lines is connected to the third driver, and another portion of the second signal lines is connected to the fourth driver.

This allows for outputting the electric charges corresponding to the capacitances from both the first signal lines and the second signal lines. As a result, it is possible to eliminate the effect caused by electromagnetic noise that is inputted into the touch panel via the hands, fingers and the like and is superposed on the signal of the sense line.

A touch panel system according to the present invention includes: the capacitance value distribution detection circuit according to the present invention; and a touch panel including the plurality of first signal lines, the plurality of second signal lines, and the plurality of capacitances.

An information input/output device according to the present invention includes: the touch panel system according to the present invention; and a display panel (i) being superposed on a touch panel provided in the touch panel system or (ii) having the touch panel be built therein.

A method according to the present invention of detecting a capacitance value distribution drives first signal lines in a first timing to output from second signal lines electric charges that correspond to the capacitances, controls, in a second timing subsequent to the first timing, switching of connection of the first and second signal lines, and drives the second signal lines in a third timing subsequent to the second timing, to output from the first signal lines the electric charges that correspond to the capacitances. This allows for outputting the electric charges that correspond to the capacitances from both the first signal lines and the second signal lines. As a result, it is possible to eliminate the effect caused by electromagnetic noise that is inputted into the touch panel via the hands, fingers and the like and is superposed on the signal of the sense line.

With the capacitance value distribution detection method according to the present embodiment, it is preferable that the plurality of first signal lines, the plurality of second signal lines, and the plurality of capacitances constitute a touch panel, the touch panel being of a size allowing for a hand that holds a pen for input to be placed thereon.

According to the configuration, it is possible to eliminate an effect caused by electromagnetic noise inputted into a touch panel via a hand touched on the touch panel while holding a pen for input, and which electromagnetic noise is superposed on a signal of a sense line.

With the capacitance value distribution detection circuit according to the present embodiment, it is preferable that the plurality of first signal lines, the plurality of second signal lines, and the plurality of capacitances constitute a touch panel, the touch panel being of a size allowing for a hand that holds a pen for input to be placed thereon.

According to the configuration, it is possible to eliminate an effect caused by electromagnetic noise inputted into a touch panel via a hand touched on the touch panel while holding a pen for input, and which electromagnetic noise is superposed on a signal of a sense line.

With yet another capacitance value distribution detection circuit according to the present embodiment, it is preferable that the portion of the plurality of first signal lines and the another portion of the plurality of first signal lines share a signal line disposed on their common boundary, and the portion of the plurality of second signal lines and the another portion of the plurality of second signal lines share a signal line disposed on their common boundary.

With the foregoing configuration, it is possible to continuously carry out differential read-out of a sense line disposed on a common boundary of portions of adjacent multiplexers, exceeding the common boundary.

With a touch panel system according to the present embodiment, it is preferable that the capacitance value distribution detection circuit detects a distribution of capacitance values in accordance with an input with use of a pen.

With an information input/output device according to the present embodiment, it is preferable that the capacitance value distribution detection circuit detects a distribution of capacitance values in accordance with an input with use of a pen.

The present invention is not limited to the description of the embodiments above, but may be altered by a skilled person within the scope of the claims. An embodiment based on a proper combination of technical means disclosed in different embodiments is encompassed in the technical scope of the present invention. Namely, the embodiments above are just examples in all respects, and provide no limitations. The scope of the present invention is indicated by the claims, rather than by the descriptions of the embodiments. Any meanings equivalent to the claims and all modifications made in the scope of the claims are included within the scope of the present invention.

INDUSTRIAL APPLICABILITY

The present invention is applicable to various kinds of electronic devices including touch panels, for example, to televisions, personal computers, mobile phones, digital cameras, portable game devices, electronic photo frames, personal digital assistants, electronic books, home electronic appliances, ticket vending machines, automatic teller machines, and car navigation systems.

The present invention is applicable to a capacitance value distribution detection method, a capacitance value distribution detection circuit, a touch panel system, and an information input/output device, each of which detects a distribution of capacitance values of a plurality of capacitances each formed on intersections of a plurality of first signal lines with a plurality of second signal lines.

Moreover, the present invention can be used in a touch panel system including a large-sized touch panel in which a hand placing region would occur when entering with use of a pen, for example, a media blackboard, a tablet terminal, and the like, which is capable of receiving entry via handwriting on the blackboard by a plurality of persons.

REFERENCE SIGNS LIST

1 Touch panel system
1a Touch panel system
1b Touch panel system
1c Touch panel system
1d Touch panel system
1e Touch panel system
1f Touch panel system
1g Touch panel system
1h Touch panel system
1i Touch panel system
1j Touch panel system
1k Touch panel system
1m Touch panel system
1n Touch panel system
1o Touch panel system
2 Display device
3 Touch panel
3a Touch panel
3b Touch panel
3c Touch panel
4 Touch panel controller
31 Main sensor (main sensor section)
31a Main sensor group (main sensor section)
31b Main sensor group (sensor section)
32 Sub sensor (sub sensor section)
32a Sub sensor group (sub sensor section)
33 Sense line
34 Sub sense line
35 Drive line
41 Subtracting section
41a Subtracting section
46 Adding section
47 Electric charge integrator (calculation section)
48 Analog-to-digital converting section (first analog-to-digital converting section, second analog-to-digital converting section)
48a Analog-to-digital converting section (third analog-to-digital converting section, fourth analog-to-digital converting section)
49 Differential amplifier
50 Total differential amplifier
58 Decoding section
59 Judging section
61 Non-touch operation information storage section
62 Calibration section
71a Touch panel system
71b Touch panel system
71c Touch panel system
72 Capacitance value distribution detection circuit
73 Touch panel
HL1-HLM Signal line (first signal line)
VL1-VLM Signal line (second signal line)
C11-CMM Capacitance
DL1-DLM Drive line
SL1-SLM Sense line

The invention claimed is:

1. A touch panel system comprising,
a touch panel;
a touch panel controller for processing a signal supplied from the touch panel;
a capacitance value distribution detection circuit for detecting a distribution of capacitance values of a plurality of capacitances that are each formed on intersections of a plurality of first signal lines with a plurality of second signal lines; and
a drive line driving circuit for driving the first signal lines or the second signal lines as drive lines,
the touch panel including (i) the plurality of first signal lines, (ii) the plurality of second signal lines, (iii) the plurality of capacitances, and (iv) a sensor section for detecting a touch operation performed with respect to the touch panel,
the touch panel controller including a subtracting section for (i) receiving signals from the sensor section and (ii) finding differences in signal between, among the sense lines, respective pairs of sense lines adjacent to each other,
the drive line driving circuit driving the drive lines in parallel,
the capacitance value distribution detection circuit switching a connection state between a first connection state and a second connection state, the first connection state being a state in which the first signal lines are driven to make the first signal lines serve as the drive lines and the second signal lines are made to output electric charges corresponding to the capacitances to make the second signal lines serve as the sense lines, and the second connection state being a state in which the second signal lines are driven to make the second signal lines serve as the drive lines, and the first signal lines are made to output the electric charges corresponding to the capacitances to make the first signal lines serve as the sense lines,
the subtracting section, during the first connection state and the second connection state, receiving output signals from the sense lines, and finding differences between the capacitances on each of the drive lines in a direction in which the each of the drive lines extends, the differences being found as the differences in signal between the respective pairs of the sense lines adjacent to each other,
the touch panel system further comprising:
a decoding section for decoding the values of the differences between the capacitances, which differences are found by the subtracting section, the decoding being carried out in such a manner that an inner product of each of code sequences for driving the drive lines in parallel and each of difference output sequences of the sense lines, which difference output sequences correspond to the code sequences, is calculated; and
a switch for switching a signal to be supplied to the subtracting section so that the subtracting section finds a first difference which is expressed by $(S_{n+1})-S_n$ or a second difference which is expressed by $S_n-(S_{n-1})$,
the first difference corresponding to a difference between (i) a signal of a sense line $S_n$ which is selected from the plurality of sense lines and (ii) a signal of a sense line $S_{n+1}$, which is one of two sense lines adjacent to the sense line $S_n$, the two sense lines being the sense line $S_{n+1}$ and a sense line $S_{n-1}$ each of which is included in the plurality of sense lines, the second difference corresponding to a difference between (i) the signal of the sense line Sn and (ii) a signal of the sense line Sn−1, which is the other one of the two sense lines.

2. The touch panel system as set forth in claim 1, wherein:
the switch includes two terminals, the switch being arranged such that one of the two terminals is selected;
the code sequences for driving the drive lines in parallel are the following code sequences (a component is 1 or −1) for driving the first drive line through the Mth drive line in parallel, $d_1=(d_{11},d_{12},\ldots,d_{1N})$ $d_2=(d_{21},d_{22},\ldots,d_{2N})$

...

$d_M=(d_{M1},d_{M2},\ldots,d_{MN})$;

difference output sequences $S_{j,P}$ (j=1, ..., [L/2], P=1, 2) (L indicates the number of sense lines, [n]=an integer part of n) of the sense lines, which difference output sequences correspond to the code sequences, are defined as follows, $S_{j,1}$: an output sequence for $d_1$ through $d_M$ when the switches SW select one of the two terminals $S_{j,2}$: an output sequence for $d_1$ through $d_M$ when the switches SW select the other one of the two terminals; and the decoding section calculates an inner product of each of the code sequences for driving the drive lines in parallel and each of the difference output sequences of the sense line, which difference output sequences correspond to the code sequences.

3. The touch panel system as set forth in claim 2, wherein:
the subtracting section includes a first analog-to-digital converting section for converting, into digital signals, analog signals supplied from the sense lines to the subtracting section; and
the subtracting section uses, in order to find the differences in signal between the respective pairs of the sense lines adjacent to each other, the digital signals obtained by the first analog-to-digital converting section.

4. The touch panel system as set forth in claim 1, wherein:
the subtracting section includes a first analog-to-digital converting section for converting, into digital signals, analog signals supplied from the sense lines to the subtracting section; and
the first analog-to-digital converting section converts, into digital signals, the differences in signal between the respective pairs of the sense lines adjacent to each other, the differences being found by the subtracting section with use of the analog signals.

5. The touch panel system as set forth in claim 4, wherein:
the subtracting section includes a total differential amplifier for finding, with use of the analog signals, the differences in signal between the respective pairs of the sense lines adjacent to each other.

6. The touch panel system as set forth in claim 1, further comprising:
a non-touch operation information storage section for storing a first distribution of differences between the capacitances which differences are decoded by the decoding section when no touch operation is performed; and
a calibration section for subtracting (i) the first distribution stored in the non-touch operation information storage section from (ii) a second distribution of differences between the capacitances which differences are decoded by the decoding section when a touch operation is performed, so as to calibrate the second distribution.

7. The touch panel system as set forth in claim 4, further comprising:
a judging section for determining the presence or absence of a touch operation based on a comparison of (i) the differences in signal between the respective pairs of the sense lines adjacent to each other which differences are found by the subtracting section and (ii) positive and negative threshold values.

8. The touch panel system as set forth in claim 7, wherein:
the judging section creates, based on the comparison of (i) the differences in signal between the respective pairs of the sense lines adjacent to each other which differences are found by the subtracting section and (ii) the positive and negative threshold values, an increase and decrease table which indicates, in ternary, a distribution of differences between signals of the sense lines, and the judging section converts the increase and decrease table into a binary image, so as to extract touch information therefrom.

9. A touch panel system comprising,
a touch panel;
a touch panel controller for processing a signal supplied from the touch panel;
a capacitance value distribution detection circuit for detecting a distribution of capacitance values of a plurality of capacitances that are each formed on intersections of a plurality of first signal lines with a plurality of second signal lines; and
a drive line driving circuit for driving the first signal lines or the second signal lines as drive lines,
the touch panel including (i) the plurality of first signal lines, (ii) the plurality of second signal lines, (iii) the plurality of capacitances, and (iv) a sensor section for detecting a touch operation performed with respect to the touch panel,
the touch panel controller including a subtracting section for (i) receiving signals from the sensor section and (ii) finding differences in signal between, among the sense lines, respective pairs of sense lines adjacent to each other,
the drive line driving circuit driving the drive lines in parallel,
the capacitance value distribution detection circuit switching a connection state between a first connection state and a second connection state, the first connection state being a state in which the first signal lines are driven to make the first signal lines serve as the drive lines and the second signal lines are made to output electric charges corresponding to the capacitances to have the second signal lines serve as the sense lines, and the second connection state being a state in which the second signal lines are driven to make the second signal lines serve as the drive lines, and the first signal lines are made to output the electric charges corresponding to the capacitances to make the first signal lines serve as the sense lines,
the subtracting section, during the first connection state and the second connection state, receiving output signals from the sense lines, and finding differences between the capacitances on each of the drive lines in a direction in which the each of the drive lines extends, the differences being found as the differences in signal between the respective pairs of the sense lines adjacent to each other, the touch panel system further comprising:
a decoding section for decoding the values of the differences between the capacitances, which differences are found by the subtracting section, the decoding being carried out in such a manner that an inner product of each of code sequences for driving the drive lines in parallel and each of difference output sequences of the sense lines, which difference output sequences correspond to the code sequences, is calculated.

10. The touch panel system as set forth in claim 9, wherein:
the subtracting section finds a first difference which is expressed by (Sn+1)−Sn and a second difference which is expressed by Sn−(Sn−1),
the first difference corresponding to a difference between (i) a signal of a sense line Sn which is selected from the plurality of sense lines and (ii) a signal of a sense line Sn+1, which is one of two sense lines adjacent to the sense line Sn, the two sense lines being the sense line Sn+1 and a sense line Sn−1 each of which is included in the plurality of sense lines,
the second difference corresponding to a difference between (i) the signal of the sense line Sn and (ii) a signal of the sense line Sn−1, which is the other one of the two sense lines.

11. The touch panel system as set forth in claim 9, wherein:
the code sequences are orthogonal sequences or M sequences.

12. The touch panel system as set forth in claim 1, further comprising:
a display device,
the touch panel being provided to a front surface of the display device.

13. The touch panel system as set forth in claim 12, wherein:
the display device is a liquid crystal display, a plasma display, an organic electroluminescence display, or a field emission display.

14. An electronic device comprising:
a touch panel system as set forth in claim 1.

15. The touch panel system as set forth in claim 2, wherein:
the subtracting section includes a first analog-to-digital converting section for converting, into digital signals, analog signals supplied from the sense lines to the subtracting section; and
the fourth analog-to-digital converting section converts, into digital signals, the differences in signal between the respective pairs of the sense lines adjacent to each other, the differences being found by the subtracting section with use of the analog signals.

16. The touch panel system as set forth in claim 15, wherein:
the subtracting section includes a total differential amplifier for finding, with use of the analog signals, the differences in signal between the respective pairs of the sense lines adjacent to each other.

17. The touch panel system as set forth in claim 2, further comprising:
a non-touch operation information storage section for storing a first distribution of differences between the capacitances which differences are decoded by the decoding section when no touch operation is performed; and
a calibration section for subtracting (i) the first distribution stored in the non-touch operation information storage section from (ii) a second distribution of differences between the capacitances which differences are decoded by the decoding section when a touch operation is performed, so as to calibrate the second distribution.

18. The touch panel system as set forth in claim 15, further comprising:
a judging section for determining the presence or absence of a touch operation based on a comparison of (i) the differences in signal between the respective pairs of the sense lines adjacent to each other which differences are found by the subtracting section and (ii) positive and negative threshold values.

19. An electronic device comprising:
a touch panel system as set forth in claim 2.

* * * * *